(12) United States Patent
Kanaya

(10) Patent No.: US 9,970,506 B2
(45) Date of Patent: *May 15, 2018

(54) FLUID-FILLED VIBRATION DAMPING DEVICE

(71) Applicant: Sumitomo Riko Company Limited, Komaki, Aichi (JP)

(72) Inventor: Tomohiro Kanaya, Kasugai (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 923 days.

This patent is subject to a terminal disclaimer.

(21) Appl. No.: 14/142,516

(22) Filed: Dec. 27, 2013

(65) Prior Publication Data

US 2014/0175719 A1 Jun. 26, 2014

Related U.S. Application Data

(63) Continuation of application No. PCT/JP2012/004723, filed on Jul. 24, 2012.

(30) Foreign Application Priority Data

Dec. 27, 2011 (JP) ................................ 2011-284924
Jan. 23, 2012 (JP) ................................ 2012-010957

(Continued)

(51) Int. Cl.
   *F16F 13/08* (2006.01)
   *F16F 13/10* (2006.01)

(52) U.S. Cl.
   CPC .................................. *F16F 13/106* (2013.01)

(58) Field of Classification Search
   CPC ......... F16F 13/10; F16F 13/106; F16F 13/107
   See application file for complete search history.

(56) References Cited

U.S. PATENT DOCUMENTS

| 4,657,232 A | 4/1987 | West |
| 4,938,463 A * | 7/1990 | Miyamoto ............ F16F 13/106 267/140.13 |

(Continued)

FOREIGN PATENT DOCUMENTS

| CN | 101311577 A | 11/2008 |
| JP | U-2-24142 | 2/1990 |

(Continued)

OTHER PUBLICATIONS

International Search Report issued in International Application No. PCT/JP2013/003512 dated Aug. 6, 2013 (with translation).

(Continued)

*Primary Examiner* — Bradley T King
(74) *Attorney, Agent, or Firm* — Oliff PLC

(57) ABSTRACT

A fluid-filled vibration damping device including a hollow buffer body with an inner space. The hollow buffer body is housed in a housing space of a partition member to come in contact with wall inner surfaces of the housing space on sides of a pressure-receiving chamber and an equilibrium chamber, while stores a movable member in the inner space thereof. Liquid pressure of the pressure-receiving chamber is applied to a first face of the movable member by having a first window portion formed in the buffer body communicated with a first communication hole of the housing space while liquid pressure of the equilibrium chamber is applied to a second face of the movable member by having a second window portion formed in the buffer body communicated with a second communication hole of the housing space.

27 Claims, 58 Drawing Sheets

(30) Foreign Application Priority Data

Feb. 28, 2012 (JP) .................................. 2012-042498
Jun. 22, 2012 (JP) .................................. 2012-140988
Jul. 11, 2012 (JP) .................................. 2012-155624

(56) References Cited

U.S. PATENT DOCUMENTS

| | | | |
|---|---|---|---|
| 4,997,169 | A | 3/1991 | Nakamura et al. |
| 7,188,830 | B2 | 3/2007 | Kato et al. |
| 8,490,954 | B2 | 7/2013 | Saito et al. |
| 8,556,239 | B2 | 10/2013 | Okumura et al. |
| 2003/0080482 | A1 | 5/2003 | Desmoulins et al. |
| 2005/0206056 | A1 | 9/2005 | Maeno et al. |
| 2005/0258581 | A1 | 11/2005 | Tanaka |
| 2008/0290573 | A1 | 11/2008 | Katayama et al. |
| 2011/0006466 | A1* | 1/2011 | Ichikawa .............. F16F 13/105 267/140.13 |
| 2012/0018936 | A1* | 1/2012 | Ogasawara ........... F16F 13/106 267/140.13 |
| 2014/0175719 | A1 | 6/2014 | Kanaya |
| 2014/0232049 | A1 | 8/2014 | Kanaya |

FOREIGN PATENT DOCUMENTS

| | | |
|---|---|---|
| JP | A-2003-184939 | 7/2003 |
| JP | A-2004-003656 | 1/2004 |
| JP | A-2006-112607 | 4/2006 |
| JP | A-2006-144982 | 6/2006 |
| JP | A-2006-144983 | 6/2006 |
| JP | A-2006-250281 | 9/2006 |
| JP | A-2007-271001 | 10/2007 |
| JP | A-2008-196630 | 8/2008 |
| JP | A-2008-291969 | 12/2008 |
| JP | A-2009-85313 | 4/2009 |
| JP | A-2009-85344 | 4/2009 |
| JP | A-2009-222192 | 10/2009 |
| JP | A-2009-243510 | 10/2009 |
| WO | WO 2008/069131 A1 | 6/2008 |

OTHER PUBLICATIONS

Aug. 5, 2014 International Preliminary Report on Patentability issued in International Application No. PCT/JP2012/005409.
May 20, 2015 Office Action in U.S. Appl. No. 14/335,153.
Mar. 30, 2015 Office Action issued in Chinese Application No. 2012-80065671.5.
Jul. 29, 2015 Office Action issued in U.S. Appl. No. 14/259,799.
U.S. Appl. No. 14/335,153, filed Jul. 18, 2014 in the name of Kanaya.
International Search Report issued in International Application No. PCT/JP2012/005409 dated Nov. 27, 2012.
U.S. Appl. No. 14/259,799.
International Search Report issued in International Application No. PCT/JP2012/004723 dated Nov. 6, 2012 (with translation).
Jul. 1, 2014 International Preliminary Report on Patentability issued in International Application No. PCT/JP2012/004723.

* cited by examiner

FLUID-FILLED VIBRATION DAMPING DEVICE

INCORPORATED BY REFERENCE

The disclosure of Japanese Patent Applications No. 2011-284924 filed on Dec. 27, 2011, No. 2012-010957 filed on Jan. 23, 2012, No. 2012-042498 filed on Feb. 28, 2012, No. 2012-140988 filed on Jun. 22, 2012 and No. 2012-155624 filed on Jul. 11, 2012, each including the specification, drawings and abstract is incorporated herein by reference in its entirety. This is a Continuation of International Application No. PCT/JP2012/004723 filed on Jul. 24, 2012.

BACKGROUND OF THE INVENTION

1. Field of the Invention

The present invention relates to a vibration damping device to be used, for example, for an engine mount, a body mount, a member mount and so forth of an automobile, especially to a fluid-filled vibration damping device using the vibration effect based on the flow action of a fluid sealed therein.

2. Description of the Related Art

Conventionally, as a type of vibration damping connector or vibration damping support interposed between the members constituting a vibration transmission system, there has been known a vibration damping device. The vibration damping device has a structure where a first mounting member and a second mounting member to be mounted to each of the members constituting the vibration transmission system are elastically connected to each other by a main rubber elastic body. A fluid-filled vibration damping device using the fluid flow action is also known as a vibration damping device. This fluid-filled vibration damping device has a structure where a pressure-receiving chamber and an equilibrium chamber are formed facing each other across a partition member supported by the second mounting member, and a non-compressible fluid is sealed in these pressure-receiving chamber and equilibrium chamber that are communicated with each other via an orifice passage. For example, the one disclosed in Japanese Unexamined Patent Publication No. JP-A-2009-243510 is such a device.

Meanwhile, in the fluid-filled vibration damping device, the vibration damping effect based on the fluid flow action is effectively exerted corresponding to a frequency vibration to which the orifice passage is tuned, whereas a valid vibration damping effect corresponding to a vibration frequency beyond the tuning frequency is hard to obtain. Especially because the orifice passage is substantially shut off due to antiresonance at an input of vibration at a higher frequency than the tuning frequency, there is a problem of degraded vibration damping performance due to a higher dynamic spring constant.

Such being the case, a liquid pressure transmission mechanism is built in the structure described in JP-A-2009-243510 provided with a fluid flow channel that allows transmission of liquid pressure between the pressure-receiving chamber and the equilibrium chamber. More specifically, this liquid pressure transmission mechanism with a movable member (movable plate) stored in a housing space formed in the partition member has a structure where liquid pressures of the pressure-receiving chamber and the equilibrium chamber are each applied to either side of the movable member via a communication hole (fluid flow channel) formed through the wall of the housing space. Then, the movable member undergoes a slight displacement or deformation at an input of high-frequency small-amplitude vibration to allow transmission of liquid pressure between the pressure-receiving chamber and the equilibrium chamber, while the movable member blocks the communication hole to prevent transmission of liquid pressure between the two chambers when vibration is inputted at a frequency in the range of tuning frequency of the orifice passage. This makes it possible to obtain the vibration damping effect exerted by the fluid flow through the orifice passage and the vibration damping effect exerted by the liquid pressure absorption effect of the liquid pressure transmission mechanism selectively and in an effective way.

However, the fluid-filled vibration damping device equipped with such a liquid pressure transmission mechanism tends to have a problem of striking noise generated by the impact force when the movable member comes into contact with the inner surface of the housing space. In other words, by causing the impact energy to be exerted on the vehicle body via the partition member and the second mounting member that supports it, there was a risk of abnormal noise generated in the vehicular cabin.

SUMMARY OF THE INVENTION

The present invention was made against the background described above, and the problem to be solved thereby is to provide a fluid-filled vibration damping device with a novel structure that is capable of effectively reducing or preventing striking noise generated by contact of a movable member.

That is, a first aspect of the present invention provides a fluid-filled vibration damping device including: a first mounting member; a second mounting member; a main rubber elastic body elastically connecting the first and second mounting members; a partition member supported by the second mounting member; a pressure-receiving chamber whose wall portion is partially defined by the main rubber elastic body; an equilibrium chamber whose wall portion is partially defined by a flexible film, the pressure-receiving chamber and the equilibrium chamber being disposed on either side of the partition member and filled with a non-compressible fluid; an orifice passage through which the pressure-receiving chamber and the equilibrium chamber communicate with each other; a housing space formed within the partition member; a movable member housed in the housing space with liquid pressure of the pressure-receiving chamber applied to a first face of the movable member and liquid pressure of the equilibrium chamber applied to a second face of the movable member respectively through a first communication hole and a second communication hole formed in a wall of the housing space; and a hollow buffer body with an inner space housed in the housing space to come in contact with wall inner surfaces of the housing space on sides of the pressure-receiving chamber and the equilibrium chamber, while storing the movable member in the inner space thereof, wherein the liquid pressure of the pressure-receiving chamber is applied to the first face of the movable member by having a first window portion formed in the buffer body communicated with the first communication hole of the housing space while the liquid pressure of the equilibrium chamber is applied to the second face of the movable member by having a second window portion formed in the buffer body communicated with the second communication hole of the housing space.

According to the fluid-filled vibration damping device with the structure following the first aspect described above, the first and second window portions are maintained in a communicated state without being shut off by the movable member at an input of mid- to high-frequency small-amplitude vibration when the orifice passage is substantially shut off so that the pressure-receiving chamber and the equilibrium chamber are communicated with each other via the fluid flow channel comprising the first and second communication holes and the first and second window portions. Therefore, the liquid pressure within the pressure-receiving chamber is transmitted to the equilibrium chamber via the fluid flow channel to be absorbed by the volume change of the equilibrium chamber, thereby preventing an increase in the dynamic spring constant and effectively achieving the desired vibration damping effect (vibration isolation effect).

Meanwhile, once large-amplitude vibration in the range of tuning frequency of the orifice passage is inputted, the fluid flows between the pressure-receiving chamber and the equilibrium chamber via the orifice passage, thereby exerting the vibration effect based on the flow action of the fluid. Also, the liquid pressure within the pressure-receiving chamber is prevented from being transmitted and absorbed to the equilibrium chamber by letting the movable member come in close contact with the inner surface of the buffer body to shut off the first and second window portions. Thus, the amount of fluid flowing through the orifice passage is efficiently ensured, thereby effectively achieving the desired vibration damping effect.

In that situation, when the movable member comes in contact with either opening peripheral edge of the first or second window portion of the buffer body, the impact energy generated at the time of contact is reduced by the energy attenuation effect based on the internal friction of the buffer body. In other words, once the movable member is in contact with the wall inner surface of the buffer body on the pressure-receiving chamber side or the equilibrium chamber side, the impact energy inputted at the contact portion of the movable member of the buffer body is transmitted to a portion of the buffer body off the contact portion thereof. In that process, each wall of the buffer body made in a hollow structure undergoes an elastic deformation due to the impact energy so that the impact energy is converted into thermal energy by the internal friction and the like. This reduces the impact energy transmitted from the buffer body to the partition member, thereby reducing or preventing abnormal noise generated in the vehicular cabin caused by the transmission of the impact energy.

A second aspect of the present invention provides the fluid-filled vibration damping device described in the first aspect, wherein the buffer body comprises an integral band-like cylindrical body having a pair of facing plate portions placed in contact with each wall inner surface of the housing space on the sides of the pressure-receiving chamber and the equilibrium chamber and a pair of side plate portions that connect these pair of facing plate portions to each other.

According to the second aspect, when the impact energy generated by contact of the movable member is inputted to one of the facing plate portions of the buffer body, the energy attenuation effect is exerted based on the internal friction and the like by elastically deforming the pair of side plate portions and the other facing plate portion of the buffer body to prevent generation of striking noise. In addition, the elastic deformation of these pairs of side plate portions and the other facing plate portion are efficiently generated by making the buffer body into a band-like cylindrical body, thereby exerting the effect of preventing striking noise more favorably through the reduction in the impact energy.

A third aspect of the present invention provides the fluid-filled vibration damping device described in the first or second aspect, wherein the buffer body is formed with a protrusion that protrudes toward at least one of the sides of the pressure-receiving chamber and the equilibrium chamber to come in contact at the protrusion with the wall inner surface of the housing space.

According to the third aspect, flexural deformation is likely to occur at the walls of the buffer body on the sides of the pressure-receiving chamber and the equilibrium chamber around the protrusion working as a fulcrum by letting the buffer body partially come in contact at the protrusion with the wall inner surfaces on the sides of the pressure-receiving chamber and the equilibrium chamber. Therefore, the energy attenuation effect caused by elastic deformation of the buffer body is efficiently exerted, thereby preventing generation of striking noise caused by contact of the movable member more efficiently.

A fourth aspect of the present invention provides the fluid-filled vibration damping device described in the third aspect, wherein the protrusion extends continuously in an annular form, while the protrusion is provided to surround at least one of an opening of the first window portion on a side of the first communication hole and an opening of the second window portion on a side of the second communication hole.

According to the fourth aspect, reduction in striking noise based on the buffering effect of the protrusion is achieved even if the buffer body is deformed or displaced in the housing space to get hit against the wall inner surface of the housing space. Furthermore, since the protrusion that maintains the buffer body and the partition member in partial contact with each other is made in an annular form, the fluid is prevented from flowing into the space between the buffer body and the wall inner surface of the housing space at the connection between the first communication hole and the first window portion and between the second communication hole and the second window portion, thereby efficiently causing the desired flow of fluid.

A fifth aspect of the present invention provides the fluid-filled vibration damping device described in any one of the first to fourth aspects, wherein the buffer body is arranged away from a peripheral wall inner surface of the housing space.

According to the fifth aspect, elastic deformation of the buffer body is allowed without being restricted by the peripheral wall inner surface of the housing space to efficiently obtain the energy attenuation effect exerted based on the internal friction of the buffer body so that generation of striking noise caused by contact of the movable member can be effectively prevented.

A sixth aspect of the present invention provides the fluid-filled vibration damping device described in any one of the first to fifth aspects, wherein a locking protrusion is provided in the housing space to protrude therein, while a locking hole is formed in the buffer body and a first positioning member for positioning the buffer body relative to the partition member is configured by having the locking protrusion inserted into the locking hole and locked thereto.

According to the sixth aspect, since the buffer body is positioned in the housing space relative to the partition member to prevent from being rotated and so forth, the buffer body's first and second window portions are maintained in a state of communication with the first and second communication holes of the partition member, thereby achieving the desired vibration damping properties in a stable manner. Also, since the first positioning member is realized by inserting the locking protrusion that protrudes in the housing space into the locking hole formed in the buffer body, the structure is rather simple and easy to make, while the portion of the buffer body that comes in contact with the locking protrusion is limited to the inner periphery of the locking hole, which restricts the constraints of the buffer body by the locking protrusion, thereby effectively obtaining the preventive effect against striking noise exerted by elastic deformation of the buffer body.

A seventh aspect of the present invention provides the fluid-filled vibration damping device described in the sixth aspect, wherein the locking protrusion protrudes in a direction of facing of the pressure-receiving chamber and the equilibrium chamber, while the locking hole is formed through walls of the buffer body on the side of the pressure-receiving chamber and on the side of the equilibrium chamber, and the locking protrusion is inserted through the locking hole so as to penetrate through the buffer body.

According to the seventh aspect, a failure such as the movable member getting stuck with the locking protrusion to stop the normal operation can be avoided. In addition, because the space in the buffer body made in a hollow structure (inner space that contains the movable member) is congested by the locking protrusion, the movable member is prevented from displacing itself in the direction perpendicular to the direction of facing of the pressure-receiving chamber and the equilibrium chamber, thereby achieving the shut-off of the first and second window portions by the movable member in a stable manner.

An eighth aspect of the present invention provides the fluid-filled vibration damping device described in the sixth or seventh aspect, wherein the locking protrusion protrudes in the direction of facing of the pressure-receiving chamber and the equilibrium chamber, while the locking hole is formed through exclusively one of walls of the buffer body on the side of the pressure-receiving chamber and the side of the equilibrium chamber.

According to the eighth aspect, in arranging the buffer body in the housing space, the direction of the buffer body can easily be specified by inserting the locking protrusion into the locking hole to make the work easier to contain and arrange the buffer body in the housing space. For example, when the locking hole is provided along the outer periphery of the buffer body, the direction of the buffer body can be specified more certainly and easily, thereby favorably preventing assembly of the buffer body in a wrong direction.

A ninth aspect of the present invention provides the fluid-filled vibration damping device described in any one of the first to eight aspects, wherein the movable member comprises a movable plate independent from the partition member and the buffer body.

According to the ninth aspect, since the reactivity of characteristics switching in response to the inputted vibration is enhanced, and displacement of the movable plate enables a prompt switching between a lower dynamic spring constant at an input of small-amplitude vibration and the shut-off of the first and second window portions at an input of large-amplitude vibration, better vibration damping performance is achieved. Moreover, striking noise likely to be a problem with the movable plate at the time of contact is effectively prevented based on the energy attenuation effect exerted by elastic deformation of the buffer body.

A tenth aspect of the present invention provides the fluid-filled vibration damping device described in any one of the first to eighth aspects, wherein the movable member comprises a movable film supported by at least one of the partition member and the buffer body.

According to the tenth aspect, since the movable member is made to be a movable film supported by the partition member or the buffer body, the contact speed of the movable film against the buffer body is reduced based on the elasticity of the movable film itself to attenuate the energy of impact at the time of contact. Therefore, striking noise is effectively attenuated with additional help of the impact energy absorption effect due to elastic deformation of the buffer body.

An eleventh aspect of the present invention provides the fluid-filled vibration damping device described in the tenth aspect, wherein the movable film is integrally formed with the buffer body.

According to the eleventh aspect, the number of parts can be reduced by means of forming the movable film integral with the buffer body. In addition, no work is necessary to store the movable film in the buffer body, thereby reducing the number of production processes. The aspect of supporting the movable film by the buffer body is not particularly limited, but in order to realize an excellent reactivity of characteristics switching in response to the inputted vibration, a cantilever support is desirable where one end of the movable film is supported by the buffer body.

A twelfth aspect of the present invention provides the fluid-filled vibration damping device described in any one of the first to eleventh aspects, wherein a third communication hole is formed through the wall of the housing space on the side of the pressure-receiving chamber, while a gap is provided between the buffer body and the wall of the housing space, and a short-circuit hole is formed to always maintain communication between the pressure-receiving chamber and the inner space of the buffer body by means of connecting the third communication hole and the gap to each other.

According to the twelfth aspect, once pressure within the pressure-receiving chamber drops down relative to that within the equilibrium chamber due to an input of a large impact load, the movable member blocks the first window portion based on the relative pressure difference between the pressure-receiving chamber and the equilibrium chamber, while the pressure-receiving chamber and the equilibrium chamber are maintained in a state of communication with each other via the short-circuit hole, the inner space, the second window portion, and the second communication hole. This allows fluid to flow from the equilibrium chamber to the pressure-receiving chamber via the short-circuit hole to reduce or eliminate the pressure drop in the pressure-receiving chamber as quickly as possible, thereby reducing or avoiding abnormal noise caused by liquid-gas phase separation (cavitation) due to the lowered pressure within the pressure-receiving chamber. Moreover, the short-circuit hole is formed without making any hole and the like through the buffer body, which simplifies the structure thereof.

Meanwhile, under a positive pressure applied to the pressure-receiving chamber at an input of a large load, the movable member blocks the second window portion based on the relative pressure difference between the pressure-receiving chamber and the equilibrium chamber. This causes the short-circuit hole to be substantially shut off to prevent fluid flow therethrough between the pressure-receiving chamber and the equilibrium chamber. As a result, pressure fluctuations within the pressure-receiving chamber are efficiently triggered to ensure a sufficient amount of fluid flow through the orifice passage so that the vibration damping effect based on the fluid flow action is effectively exerted. Thus, under a positive pressure applied to the pressure-receiving chamber that can never generate cavitation noise, the desired vibration damping effect is exerted to achieve excellent vibration damping performance.

A thirteenth aspect of the present invention provides the fluid-filled vibration damping device described in any one of the first to twelfth aspects, wherein a third communication hole is formed through the wall of the housing space on the side of the pressure-receiving chamber, while a third window portion is formed on the wall of the buffer body on the side of the pressure-receiving chamber, and a short-circuit hole is formed to always maintain communication between the pressure-receiving chamber and the inner space of the buffer body by means of connecting the third communication hole and the third window portion to each other.

According to the thirteenth aspect, once pressure within the pressure-receiving chamber drops down relative to that within the equilibrium chamber at an input of a large impact load, the movable member blocks the first window portion based on the pressure difference between the pressure-receiving chamber and the equilibrium chamber, which are kept communicated with each other via the short-circuit hole, the inner space, the second window portion, and the second communication hole. This allows fluid to flow from the equilibrium chamber to the pressure-receiving chamber via the short-circuit hole so as to reduce or eliminate the pressure drop in the pressure-receiving chamber as quickly as possible, thereby reducing or avoiding abnormal noise caused by liquid-gas phase separation (cavitation) due to the lowered pressure within the pressure-receiving chamber.

Meanwhile, under a positive pressure applied to the pressure-receiving chamber at an input of a large load, the movable member blocks the second window portion based on the pressure difference between the pressure-receiving chamber and the equilibrium chamber. This causes the short-circuit hole to be substantially shut off to prevent fluid from flowing between the pressure-receiving chamber and the equilibrium chamber via the short-circuit hole. As a result, pressure fluctuations within the pressure-receiving chamber are efficiently triggered to ensure a sufficient amount of fluid flow through the orifice passage so that the vibration damping effect based on the fluid flow action is effectively exerted. Thus, under a positive pressure applied to the pressure-receiving chamber that can never generate cavitation noise, the desired vibration damping effect is exerted to achieve excellent vibration damping performance.

A fourteenth aspect of the present invention provides the fluid-filled vibration damping device described in any one of the first to thirteenth aspects, wherein a buffer protrusion is provided in at least one of the buffer body and the movable member that protrudes inward in a direction of facing of the buffer body and the movable member.

According to the fourteenth aspect, the contact area is initially made small to reduce the impact force at the time of contact by letting the movable member come in contact with the buffer body first at the formation of the buffer protrusion, thereby reducing striking noise caused by the contact of the movable member.

A fifteenth aspect of the present invention provides the fluid-filled vibration damping device described in the fourteenth aspect, wherein an allowance area for deformation is provided on the wall of the housing space, and formation of the buffer protrusion of the buffer body is arranged within the allowance area for deformation away from the wall of the housing space.

According to the fifteenth aspect, since the buffer body is allowed to deform elastically as if it moves away when contacted by the movable member by means of arranging the formation of the buffer protrusion of the buffer body within the allowance area for deformation away from the wall inner surface, the impact force at the time of contact is effectively attenuated to reduce generation of striking noise more effectively.

The specific structure of the allowance area for deformation is not particularly limited as long as elastic deformation of the buffer body is allowed at the formation of the buffer protrusion, but any of through-holes, depressions, or concave portions formed between a plurality of protrusions, for example, can be adopted as such structure.

A sixteenth aspect of the present invention provides the fluid-filled vibration damping device described in the fourteenth or fifteenth aspect, wherein the buffer protrusion extends continuously in an annular form, while one of an opening of the first window portion on the side of the inner space and an opening of the second window portion on the side of the inner space is surrounded by the buffer protrusion.

According to the sixteenth aspect, the buffer protrusion comes in contact with the movable member or the buffer body all around the circumference so that one of the first and second window portions enclosed by the buffer protrusion is shut off at the time of contact between the movable member and the buffer body. Therefore, at an input of large-amplitude vibration with a frequency to which the orifice passage is tuned, the liquid pressure within the pressure-receiving chamber is effectively prevented from escaping to the equilibrium chamber via the first and second window portions. As a result, the amount of fluid that flows through the orifice passage is efficiently ensured, thus favorably achieving the vibration effect based on the flow action of the fluid.

A seventeenth aspect of the present invention provides the fluid-filled vibration damping device described in any one of the first to sixteenth aspects, wherein the buffer body is provided with a positioning portion, while the partition member is provided with a positioning hole through the wall of the housing space, and a second positioning member for positioning the buffer body within the housing space is configured by means of arranging the positioning portion placed over the positioning hole.

According to the seventeenth aspect, the buffer body can easily be positioned relative to the partition member within the housing space by means of locating the positioning portion over the positioning hole. Especially, when adopted in combination with the fifteenth aspect, the buffer protrusion provided in the buffer body is positioned over the allowance area for deformation provided in the partition member to allow elastic deformation of the buffer body at the time of contact by the movable member against the buffer body, thereby effectively exerting the effect of reducing striking noise based on the buffering effect.

The structure of the positioning portion is not particularly limited, but also can be in a form of a protrusion that protrudes to the opposite side of the inner space, or otherwise a depression, a through-hole, or a marking (colored) or else that helps to confirm whether the buffer body is positioned in a prescribed place by visual observation through the positioning hole.

An eighteenth aspect of the present invention provides the fluid-filled vibration damping device described in any one of the first to seventeenth aspects, wherein a concave/convex portion is provided on at least one of the wall inner surfaces of the housing space on the side of the pressure-receiving chamber and the side of the equilibrium chamber, and a contact area is made small between the buffer body and the wall inner surface of the housing space provided with the concave/convex portion.

According to the eighteenth aspect, the contact area between the wall inner surface of the housing space and the buffer body is made small due to the concave/convex portion provided on the partition member, thereby attenuating striking noise by reducing the initial contact area even if the buffer body is deformed or displaced within the housing space to hit against the partition member.

A nineteenth aspect of the present invention provides the fluid-filled vibration damping device described in any one of the first to eighteenth aspects, wherein a communication passage is formed on the wall of the buffer body on the side of the pressure-receiving chamber for connecting to the first communication hole, and a first leak passage is formed to always maintain the pressure-receiving chamber and the housing space communicated with each other including the first communication hole and the communication passage.

According to the nineteenth aspect, a communication passage is formed in the buffer body, and the pressure-receiving chamber and the housing space are always communicated with each other via the first leak passage comprising the first communication hole and the communication passage. Therefore, the pressure-receiving chamber and the equilibrium chamber are communicated with each other via the first leak passage by separating the movable member away from the second window portion due to a significant pressure drop in the pressure-receiving chamber, thereby reducing or eliminating the pressure drop in the pressure-receiving chamber caused by the fluid flow thereto. As a result, abnormal noise can be prevented, which is caused by cavitation that can be a problem during a significant pressure drop within the pressure-receiving chamber.

In such a structure for preventing cavitation noise (short-circuit mechanism between the pressure-receiving chamber and the equilibrium chamber), the first communication hole formed in the partition member is used to obtain the liquid pressure absorption effect caused by the movable member, thereby enabling to prevent generation of cavitation noise without any need for special processing on the partition member.

A twentieth aspect of the present invention provides the fluid-filled vibration damping device described in the nineteenth aspect, wherein the buffer body comprises an integral band-like cylindrical body having a pair of facing plate portions placed in contact with each wall inner surface of the housing space on the sides of the pressure-receiving chamber and the equilibrium chamber and a pair of side plate portions that connect these pair of facing plate portions to each other, and the communication passage formed in the facing plate portion on the side of the pressure-receiving chamber extends in a direction perpendicular to a direction of facing of the pair of side plate portions to be communicated with the first communication hole via the first window portion.

According to the twentieth aspect, the buffer body is made to be elastically deformed rather easily by being made to be a band-like cylindrical body. Therefore, at the time of contact between the movable member and one of the facing plate portions, the pair of side plate portions as well as the other facing plate portion are elastically deformed by the inputted impact force in an efficient manner, thereby effectively exerting the striking-noise reduction effect based on the energy attenuation effect.

Also, since the communication passage is connected to the inner space of the buffer body via a short route to reduce flow friction and the like during a significant pressure drop in the pressure-receiving chamber, the fluid flows smoothly from the equilibrium chamber to the pressure-receiving chamber to reduce or eliminate the negative pressure within the pressure-receiving chamber as quickly as possible. This effectively restricts the liquid-gas separation (cavitation) in the pressure-receiving chamber, thereby preventing generation of abnormal noise caused by cavitation.

A twenty-first aspect of the present invention provides the fluid-filled vibration damping device described in the nineteenth or twentieth aspect, wherein the buffer body is arranged away from a peripheral wall inner surface of the housing space with a gap in between, while the communication passage is communicated with the gap.

According to the twenty-first aspect, the buffer body is arranged in an aspect where it can easily be subject to elastic deformation without being constrained due to the separation of the buffer body away from the peripheral wall inner surface of the housing space. Therefore, the striking-noise reduction effect based on the internal friction of the buffer body is exerted more efficiently resulting in improved quietness.

Also, a state of communication between the pressure-receiving chamber and the equilibrium chamber is stably maintained via the first leak passage by forming the gap between the buffer body and the peripheral wall inner surface of the housing space connected to the communication passage regardless of the position of the movable member and so forth within the inner space. Therefore, during a significant pressure drop in the pressure-receiving chamber that can pose a problem with the cavitation noise, the effect of alleviating the negative pressure is stably exerted due to the fluid flowing through the first leak passage, thereby preventing generation of abnormal noise.

A twenty-second aspect of the present invention provides the fluid-filled vibration damping device described in the nineteenth to twenty-first aspects, wherein a regulating member is provided that regulates a direction of the buffer body within the housing space so as to locate the communication passage formed in the buffer body on the side of the pressure-receiving chamber.

According to the twenty-second aspect, the direction of the buffer body is regulated by the regulating member at the time of arranging the buffer body in the housing space, which prevents the buffer body from being mounted in a wrong direction and, for example, a failure such as the communication passage being placed on the side of the equilibrium chamber can be avoided. This enables to obtain the desired vibration damping performance and the preventive effect against cavitation noise in an easy and stable manner.

A twenty-third aspect of the present invention provides the fluid-filled vibration damping device described in the twenty-second aspect, wherein a locking protrusion is provided in the partition member that protrudes from the wall of the housing space therein on the side of the equilibrium chamber to the side of the pressure-receiving chamber, while a locking hole is formed on the wall of the buffer body on the side of the equilibrium chamber, whereas the regulating member is constituted by having the locking protrusion inserted into the locking hole while the buffer body is positioned relative to the partition member using the regulating member.

According to the twenty-third aspect, the buffer body is positioned within the housing space by the regulating member so that any adverse impact of wrong positioning of the buffer body on the reduction effect of striking noise or cavitation noise can be prevented. In addition, the locking protrusion protrudes from the wall of the housing space on the side of the equilibrium chamber toward the pressure-receiving chamber, while a locking hole is formed on the wall of the buffer body on the side of the equilibrium chamber so that the regulating member is constituted to arrange the buffer body in a right direction by means of inserting the buffer body into the housing space so as to have the locking protrusion inserted into the locking hole.

Additionally, the regulating member is realized with a simple structure where the locking protrusion provided on the partition member is inserted into the locking hole provided in the buffer body, thereby preventing structural complexity and any increase in the number of parts.

A twenty-fourth aspect of the present invention provides the fluid-filled vibration damping device described in any one of the first to twenty-third aspects, wherein the buffer body is made in a cylindrical shape and a periphery wall thereof is overlapped with a hitting face of the movable member against the wall inner surface of the housing space, whereas a leak space is formed opening on a peripheral wall inner surface of the housing space that is overlapped with an opening end surface of the buffer body and extending outward from the housing space while a leak hole is formed to connect the leak space to the pressure-receiving chamber in such a way that a second leak passage is formed comprising the leak space and the leak hole so as to communicate the pressure-receiving chamber and the equilibrium chamber with each other under reduced pressure within the pressure-receiving chamber, and further, an opening of the leak space to the housing space is made smaller than the movable member in a length direction perpendicular to a thickness direction of the movable member of plate shape and to an axial direction of the buffer body.

According to the twenty-fourth aspect, when a significant negative pressure is applied to the pressure-receiving chamber, pressure drop therein can be alleviated by having fluid flowing from the equilibrium chamber into the pressure-receiving chamber via the second leak passage. As a result, generation of air bubbles due to cavitation is avoided, thereby preventing cavitation noise caused by shock waves and the like during bubble collapse.

Furthermore, the opening of the buffer body is arranged face to face with the opening of the leak space, and the second leak passage is formed with a sufficient cross-sectional area by the inner space of the buffer body being communicated with the leak space, thereby effectively reducing the cavitation noise.

In that situation, since the movable member is arranged in the inner space of the buffer body, the movable member is prevented from entering into the leak space formed outside the buffer body in the axial view by making the opening of the leak space smaller than the movable member. Therefore, the second leak passage is formed with sufficient cross-sectional area by connecting the central hole of the buffer body to the leak space, while unintended shut-off of the second leak passage by the insertion of the movable member into the leak space is prevented, thereby preventing cavitation noise in a stable and effective manner.

As evident from the arrangement of the movable member in the inner space, the buffer body is larger than the movable member in the length direction. Therefore, when the buffer body is arranged in the housing space by non-adhesive bonding and allowed to displace itself relative to the partition member, the buffer body is also prevented from entering into the leak space by making the opening of the leak space to the housing space smaller than the movable member in the length direction, thereby enabling to maintain the second leak passage in a communicated state.

Also, by making the buffer body in a hollow form where the movable member is arranged in the inner space therein, striking noise generated by the movable member hitting against the wall inner surface of the housing space is effectively reduced with a limited number of parts, thereby achieving excellent quietness with additional help of the preventive effect against the cavitation noise mentioned above.

A twenty-fifth aspect of the present invention provides the fluid-filled vibration damping device described in the twenty-fourth aspect, wherein an inside dimension of the leak space in the length direction is made smaller than an inside dimension of the housing space in the length direction.

According to the twenty-fifth aspect, the movable member arranged in the housing space can be made unlikely to enter into the leak space by making the leak space smaller than the housing space in the length direction.

A twenty-sixth aspect of the present invention provides the fluid-filled vibration damping device described in the twenty-fifth aspect, wherein the leak space is formed in a middle portion of the housing space in the length direction.

According to the twenty-sixth aspect, since a step is formed between the housing space and the leak space on both sides thereof in the length direction, the movable member is prevented more effectively from entering into the leak space by the contact against the step.

A twenty-seventh aspect of the present invention provides the fluid-filled vibration damping device described in any one of the twenty-fourth to twenty-sixth aspects, wherein a limiting protrusion is formed between the leak space and the housing space to separate them from each other, while the opening of the leak space to the housing space is divided into both sides of the limiting protrusion in the length direction, and each divided opening of the leak space to the housing space is made smaller than the movable member in the length direction.

According to the twenty-seventh aspect, the opening of the leak space to the housing space is divided by the limiting protrusion so that, even if a relatively large leak space is formed, each opening thereof in the length direction can be made smaller than the movable member. This prevents the movable member from entering into the leak space by the contact against the limiting protrusion, thereby enabling to maintain the second leak passage in a state of communication.

A twenty-eighth aspect of the present invention provides the fluid-filled vibration damping device described in any one of the twenty-fourth to twenty-seventh aspects, wherein the leak space is formed at a location closer to a communication opening of the orifice passage on the side of the pressure-receiving chamber than the housing space, and an opening of the leak hole to the pressure-receiving chamber is placed around the communication opening of the orifice passage on the side of the pressure-receiving chamber.

According to the twenty-eighth aspect, fluid flowing from the equilibrium chamber into the pressure-receiving chamber via the second leak passage during a pressure drop within the pressure-receiving chamber is supplied to an area around the communication opening of the orifice passage on the side of pressure-receiving chamber where air bubbles are likely to form due to cavitation. This results in quick reduction or elimination of the negative pressure within the pressure-receiving chamber around the communication opening of the orifice passage to reduce generation of air bubbles due to cavitation, thereby preventing generation of abnormal noise caused by cavitation.

According to the present invention, the buffer body in a hollow form is stored in the housing space, which is in contact with the wall inner surfaces of the housing space on the sides of the pressure-receiving chamber and the equilibrium chamber, while the movable member is housed in the inner space of the buffer body. According to this configuration, the impact energy generated at the time of contact of the movable member against the walls of the buffer body on the sides of the pressure-receiving chamber and the equilibrium chamber is attenuated based on the internal friction and the like during elastic deformation of the buffer body. As a result, striking noise generated by the impact energy transmitted to the partition member is either reduced or prevented, thereby ensuring the quietness of the device.

Moreover, since the buffer body is made in a hollow form, when the movable member comes in contact with the wall of the buffer body on the side of either the pressure-receiving chamber or the equilibrium chamber, the impact energy at the time of contact is transmitted to the other wall free from restrictions by the movable member so that the energy attenuation effect is exerted due to the elastic deformation of the other wall. Thus, an adverse impact of restricting the buffer body by the contact of the movable member on the energy attenuation effect is avoided, thereby exerting the preventive effect against striking noise in a stable manner.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
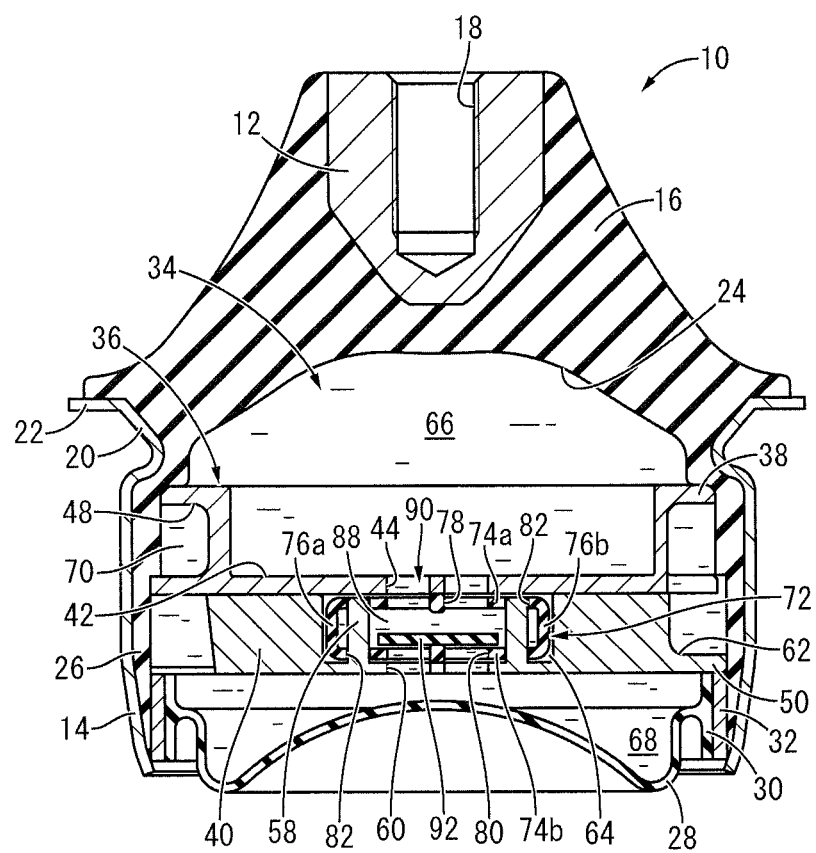
FIG. 1 is a longitudinal sectional view showing a fluid-filled vibration damping device in the form of an engine mount as a first embodiment of the present invention.

FIG. 1 shows an engine mount 10 for automobiles as a first embodiment of the fluid-filled vibration damping device with the structure according to the present invention. The engine mount 10 has a structure with a first mounting member 12 and a second mounting member 14 elastically connected by a main rubber elastic body 16, where the first mounting member 12 is mounted to a power unit, not shown in the drawing, while the second mounting member 14 is mounted to a vehicular body, not shown in the drawing, either. In the following descriptions, the phrase "up-down direction" basically means an up-down direction in FIG. 1.

More specifically, the first mounting member 12 is a high-rigidity member made of iron, aluminum alloy or the like in an approximate shape of a circular block as a whole with the upper portion in an approximate shape of a cylinder and the lower portion in an approximate shape of an inverted truncated cone so as to gradually reduce its diameter downward. Also, in the first mounting member 12, a bolt hole 18 is formed extending up and down along the central axis to open on the top face, and threads are formed on the inner peripheral surface thereof.

The second mounting member 14 is a high-rigidity member made of a similar material to the first mounting member 12 in an approximate shape of a thin cylinder with a large diameter. Also, along the top end of the second mounting member 14, a constricted portion 20 in a shape of a groove is provided opening outward, while a flange portion 22 protrudes from the top end of the constricted portion 20 toward the outer periphery.

Then, the first mounting member 12 and the second mounting member 14 are arranged with the first mounting member 12 above the second mounting member 14 separated from each other, which are elastically connected by the main rubber elastic body 16. The main rubber elastic body 16 is in an approximate shape of an inverted truncated cone with a large thickness and a large diameter, the smaller diameter end of which is bonded to the first mounting member 12 by vulcanization, while the constricted portion 20 of the second mounting member 14 is overlapped and bonded by vulcanization with the outer peripheral surface of the larger diameter end. In the present embodiment, the main rubber elastic body 16 is formed as an integrally molded and vulcanized component provided with the first mounting member 12 and the second mounting member 14.

In addition, a large-diameter concave portion 24 is formed in the main rubber elastic body 16. The large-diameter concave portion 24 is a concavity in an approximate shape of an inverted cone or dish opening up to the end surface of the main rubber elastic body 16 on the larger diameter side, which is formed at the center of the main rubber elastic body 16 in the radial direction.

Furthermore, a sealing rubber layer 26 extends out from the outer peripheral side of the large-diameter concave portion 24 in the main rubber elastic body 16. The sealing rubber layer 26 is a rubber elastic body in an approximate shape of a thin and large-diameter cylinder, which is integrally formed with the main rubber elastic body 16 fixed to the inner peripheral surface of the second mounting member 14.

Also, a flexible film 28 is attached to the integrally molded and vulcanized component of the main rubber elastic body 16. The flexible film 28 is a rubber film in a shape of a thin circular disc or dome having enough slack in the axial direction. In addition, along the outer peripheral edge of the flexible film 28, a fixing portion 30 in an annular shape is integrally formed, and the outer peripheral surface of the fixing portion 30 is bonded by vulcanization with the inner peripheral surface of a fixing member 32 in an annular shape.

Then, the fixing member 32 is inserted into the lower opening of the second mounting member 14, and by applying a diameter reducing processing such as all-around crimping to the second mounting member 14, the fixing member 32 is fitted to the second mounting member 14 so that the flexible film 28 is arranged so as to block the lower opening thereof. The sealing rubber layer 26 is interposed between the second mounting member 14 and the fixing member 32, which are fixed to each other in a fluid tight way.

Thus, by attaching the flexible film 28 to the integrally molded and vulcanized component of the main rubber elastic body 16, a fluid chamber 34 is formed where non-compressible fluid is sealed in tightly against the exterior space between the opposing faces of the main rubber elastic body 16 and the flexible film 28. The non-compressible fluid to be sealed in the fluid chamber 34 is not particularly limited, but, for example, water, alkylene glycol, polyalkylene glycol, silicone oil, and mixed solution thereof can be favorably adopted. Also, in order to efficiently obtain the vibration damping effect based on the fluid flow action, it is desirable to use a fluid of low viscosity at 0.1 Pa·s or lower.

Also, a partition member 36 is housed in the fluid chamber 34. The partition member 36, in an approximate shape of a thick circular disc as a whole, is configured to comprise an upper partition member 38 and a lower partition member 40.

Figure 2:
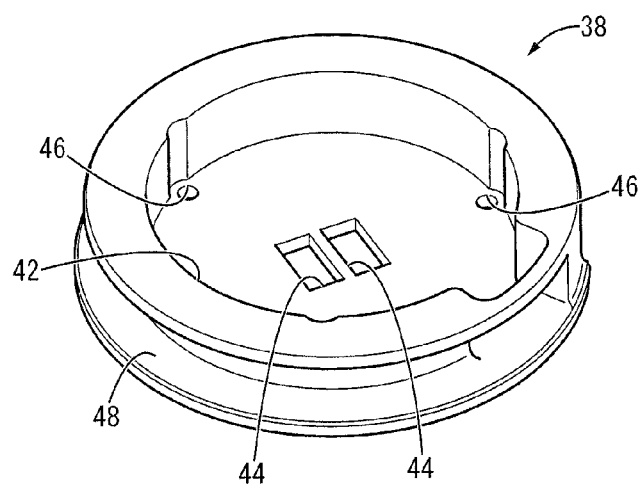
FIG. 2 is a perspective view of an upper partition member composing the engine mount shown in FIG. 1.
Figure 3:
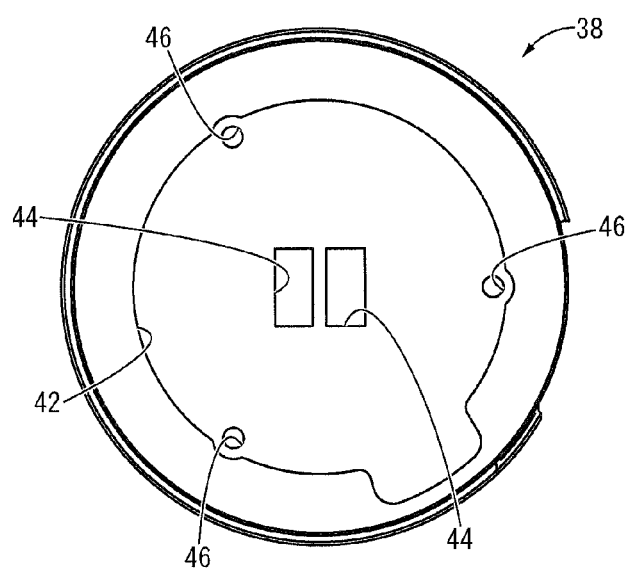
FIG. 3 is a plan view of the upper partition member shown in FIG. 2.
Figure 4:
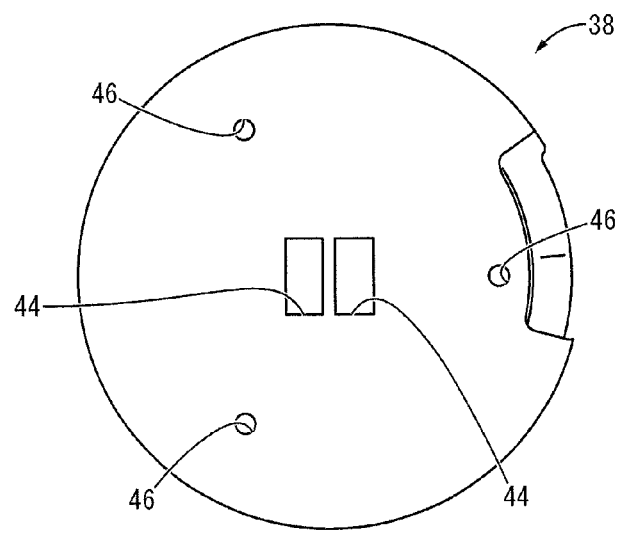
FIG. 4 is a bottom plan view of the upper partition member shown in FIG. 2.

As shown in FIGS. 2 to 4, the upper partition member 38 is in an approximate shape of a circular disc with a central concave 42 formed at the center in the radial direction opening upward to efficiently ensure the volume of a pressure-receiving chamber 66, which will be discussed later. In addition, a first communication hole 44 is formed penetrating through the middle of the bottom wall of the central concave 42. This first communication hole 44 is in an approximate shape of a rectangle in the axial view, and a pair of first communication holes 44, 44 are provided at a given distance from each other in the short-side direction. On the outer periphery of the bottom wall of the central concave 42, a plurality of upper fit-in holes 46 are formed along the circumference at a constant interval.

Moreover, at the edge of the outer periphery of the upper partition member 38, an upper groove 48 opening to the outer periphery is formed to extend in the circumferential direction for a given length, wherein one end of the upper groove 48 extends inward in the radial direction to be communicated with the central concave 42, while the other end thereof opens on the bottom face of the upper partition member 38.

Figure 5:
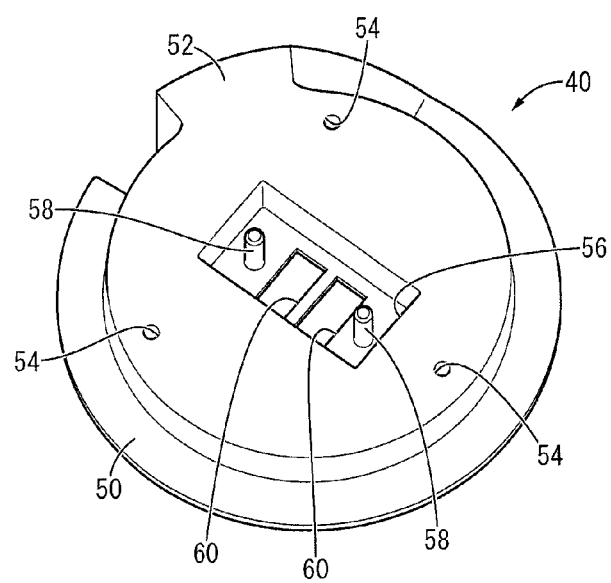
FIG. 5 is an axonometric view of a lower partition member composing the engine mount shown in FIG. 1.
Figure 6:
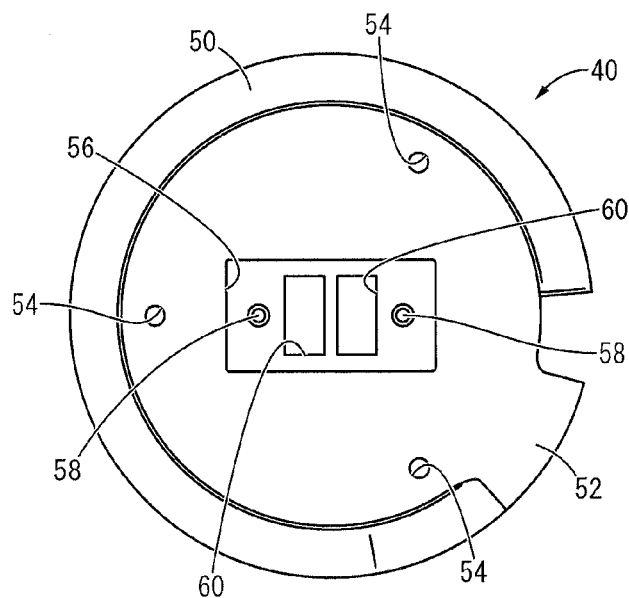
FIG. 6 is a plan view of the lower partition member shown in FIG. 5.
Figure 7:
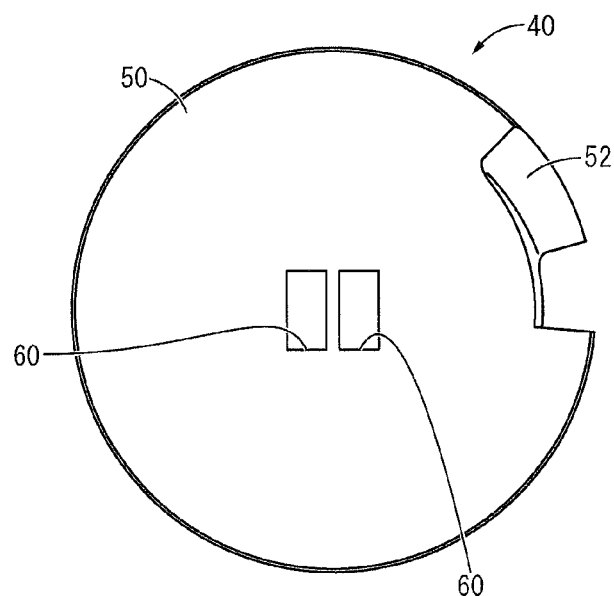
FIG. 7 is a bottom plan view of the lower partition member shown in FIG. 5.

As shown in FIGS. 5 to 7, the lower partition member 40 is in an approximate shape of a thick circular disc at the center portion, while a thin flange portion 50 protrudes from the bottom end along the outer periphery. This flange portion 50 extends in the circumferential direction for less than a full circumference for a given length, one end of which is made into a slope that gradually increases its thickness toward the edge in the circumferential direction, while the other end thereof opens downward in the axial direction. In addition, between both ends of the flange portion 50, a bulkhead portion 52 protrudes with the same thickness as the center portion. In the thick center portion, a plurality of lower fit-in holes 54 are formed along the periphery at a constant interval.

Also, at the center of the lower partition member 40 in the radial direction is formed a housing concave 56 opening upward. This housing concave 56 is in an approximate shape of a rectangle in the axial view, and a pair of insertion pins 58, 58 protrude upward as locking protrusions from the bottom wall at both ends in the long-side direction. The insertion pin 58 is in an approximate shape of a small-radius cylinder in a tapered form at the end portion gradually decreasing its diameter toward the tip end by means of chamfering the edge of the protrusion.

In addition, a pair of second communication holes 60, 60 are formed through the bottom wall of the housing concave 56. The second communication hole 60 extends up and down with almost the same rectangular cross-section as that of the first communication hole 44 and is provided in a pair away from each other at a given distance in the short-side direction, as is the case for the first communication hole 44. The second communication hole 60 is provided to have its long-side direction approximately aligned with the short-side direction of the housing concave 56 so that the long-side direction of the first communication hole 44 is approximately aligned with the long-side direction of the second communication hole 60 in a combined state of the upper and lower partition members 38, 40, which will be discussed later.

Then, the upper partition member 38 and the lower partition member 40 are overlapped on top of each other and fixed to each other by having a pin pressed in or a bolt screwed in and so forth to the upper fit-in hole 46 and the lower fit-in hole 54 positioned relative to each other. Also, a concave groove is formed opening toward the outer periphery and extending in the circumferential direction by having the bottom wall of the upper groove 48 in the upper partition member 38 placed face to face above the flange portion 50 at a distance, and by having these concave groove and the upper groove 48 communicated with each other at the end in the circumferential direction, a peripheral groove 62 is formed extending in a spiral form for less than two circumferences in the circumferential direction. In addition, a housing space 64 (i.e. housing portion) is formed between the upper and lower partition members 38, 40 by covering the opening of the housing concave 56 in the lower partition member 40 with the upper partition member 38. The first communication hole 44 is formed through the top wall of the housing space 64, while the second communication hole 60 is formed through the lower wall of the housing space 64.

The partition member 36 with the structure described above is housed in the fluid chamber 34 extending in the axis-perpendicular direction and is supported at the end of its outer periphery by the second mounting member 14. This divides the fluid chamber 34 into upper and lower portions across the partition member 36, and the walls thereof are partially composed of the main rubber elastic body 16 in the upper portion across the partition member 36 so as to form the pressure-receiving chamber 66 where pressure fluctuations are caused at an input of vibration. Meanwhile, in the lower portion across the partition member 36, an equilibrium chamber 68 is formed with its walls partially composed of the flexible film 28 wherein volume changes are readily allowed by deformation of the flexible film 28. The above-mentioned non-compressible fluid is sealed in within the pressure-receiving chamber 66 and the equilibrium chamber 68.

Also, by means of overlapping the outer periphery of the partition member 36 on the second mounting member 14 via the sealing rubber layer 26, the opening on the outer periphery of the peripheral groove 62 is covered with the second mounting member 14 in a fluid-tight way to form a tunnel-like flow channel in the circumferential direction. One end of this tunnel-like flow channel in the circumferential direction is communicated with the pressure-receiving chamber 66, while the other end in the circumferential direction is communicated with the equilibrium chamber 68, thereby forming an orifice passage 70 that communicates the pressure-receiving chamber 66 and the equilibrium chamber 68 with each other using the peripheral groove 62. The orifice passage 70 is tuned up at a low frequency around 10 Hz, which is equivalent to that of engine shake by means of adjusting the ratio of the passage section area A to the passage length L (A/L) in consideration of the spring stiffness of the walls of the pressure-receiving chamber 66 and the equilibrium chamber 68.

Figure 8:
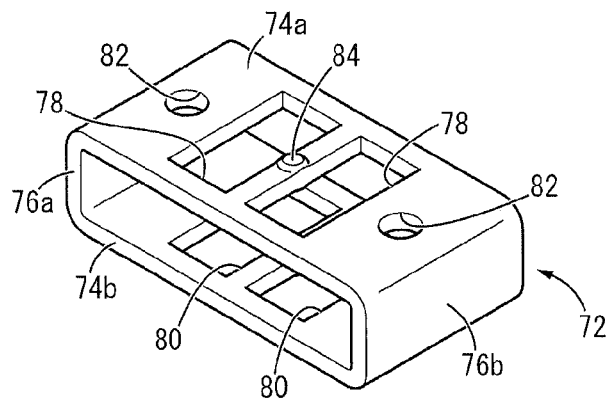
FIG. 8 is a perspective view of a rubber buffer composing the engine mount shown in FIG. 1.
Figure 9:
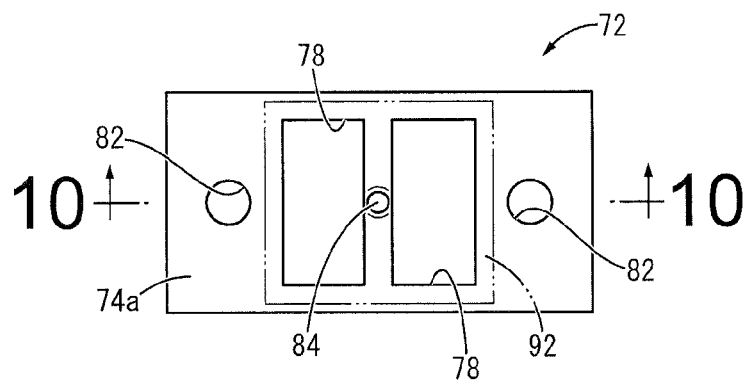
FIG. 9 is a plan view of the rubber buffer shown in FIG. 8.
Figure 10:
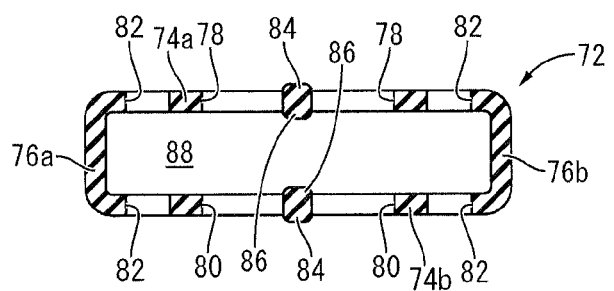
FIG. 10 is a cross-sectional view taken along line 10-10 of FIG. 9.

Also, a rubber buffer 72 is housed as a buffer body within the housing space 64. As shown in FIGS. 8 to 10, the rubber buffer 72 is made in a hollow structure formed with a rubber elastic body in an approximate shape of a rectangle in the axial view, and in the present embodiment, it is made nearly as a band-like cylindrical body with an inner space 88 penetrating therethrough in the short-side direction.

More specifically, the rubber buffer 72 is made nearly as a band-like cylindrical body by being integrally formed with a pair of facing plate portions 74a, 74b and a pair of side plate portions 76a, 76b that connect the pair of facing plate portions 74a, 74b.

The pair of facing plate portions 74a, 74b are plate-like bodies in an approximate shape of a rectangle corresponding to each other in the axial view and are arranged face to face with each other in the up-down direction at a given distance. Also, a pair of first window portions 78, 78 are formed on the facing plate portion 74a, while a pair of second window portions 80, 80 are formed on the facing plate portion 74b. The first window portion 78 and the second window portion 80 are through-holes having rectangular cross-sections similar to each other each formed in a pair away from each other at a given distance in the short-side direction. The long-side direction of the first window portion 78 is aligned with the short-side direction of the facing plate portion 74a, while the long-side direction of the second window portion 80 is aligned with the short-side direction of the facing plate portion 74b.

Furthermore, an insertion hole 82 is formed as a locking hole in each of the outside areas in the short-side direction of the pair of first window portions 78, 78 on the facing plate portion 74a and the outside areas in the short-side direction of the pair of second window portions 80, 80 on the facing plate portion 74b. The insertion hole 82 is an up and down through-hole with a small-diameter circular cross-section approximately corresponding to the insertion pin 58 being formed at a location where the pairs thereof on the facing plate portions 74a and 74b of the rubber buffer 72 correspond to each other.

Moreover, a protrusion 84 is provided on each of the facing plate portions 74a and 74b. The protrusion 84, in an approximately circular shape in the axial view, is formed at the center portion of the facing plate portions 74a, 74b to protrude outward in the facing direction thereof. Also, the protrusion 84 gradually reduces its diameter toward the tip of the protrusion, while the end face of the protrusion is made in an approximate shape of a disc. The protrusion 84 is formed on the facing plate portion 74a between the pair of first window portions 78, 78 as well as on the facing plate portion 74b between the second window portions 80, 80.

On each of the facing plate portions 74a, 74b of the present embodiment, an inward protrusion 86 is integrally formed as a buffer protrusion to protrude inward in the direction of facing of the facing plate portions 74a, 74b at a location corresponding to the protrusion 84. This inward protrusion 86 protrudes in a similar shape to that of the protrusion 84 in the opposite direction thereto.

Also, at both ends of the pair of facing plate portions 74a, 74b in the long-side direction, a pair of side plate portions 76a, 76b are integrally formed extending inward in the direction of facing of the pair of facing plate portions 74a, 74b. The pair of facing plate portions 74a, 74b are connected to each other by the pair of side plate portions 76a, 76b. By the pair of facing plate portions 74a, 74b being connected to each other by the pair of side plate portions 76a, 76b, formed is the band-like cylindrical rubber buffer 72 as well as the inner space 88 surrounded by the pair of facing plate portions 74a, 74b and the pair of side plate portions 76a, 76b.

Figure 11A:
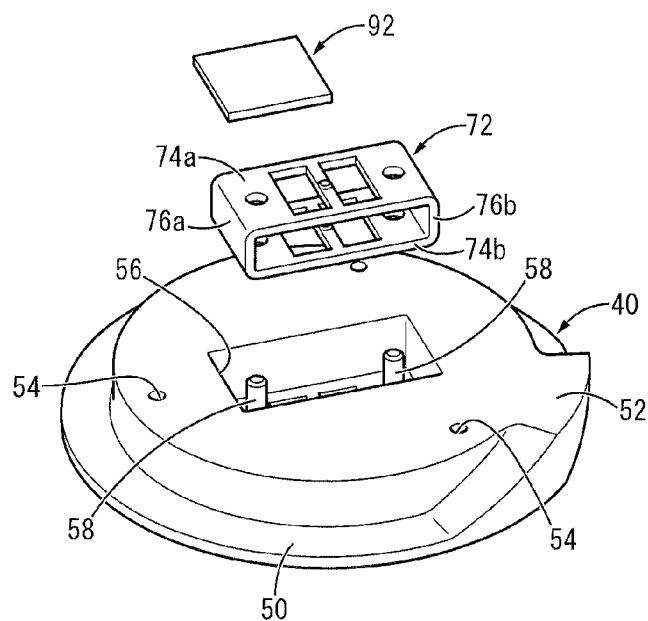
FIGS. 11A and 11B are perspective views for explaining mounting of the rubber buffer and a movable plate to the lower partition member where FIG. 11A indicates a state before the mounting of the rubber buffer and movable plate and FIG. 11B shows a state after the mounting the same, respectively.
Figure 11B:
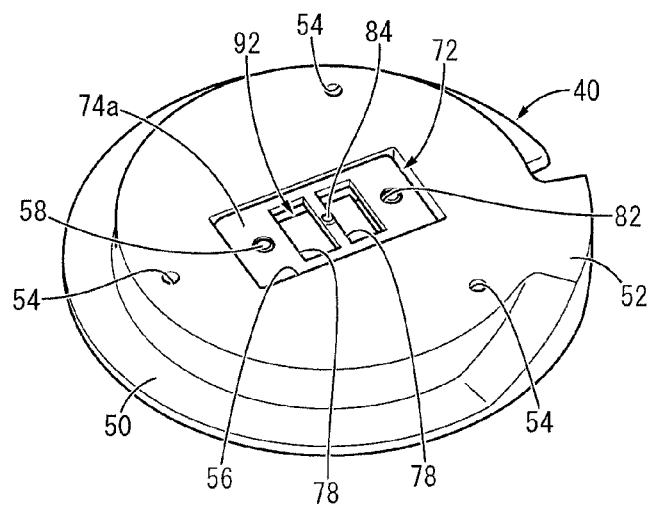

The rubber buffer 72 with the structure as described above, as shown in FIGS. 11A and 11B, is fitted into the housing concave 56 of the lower partition member 40. Then, the rubber buffer 72 is housed in the housing space 64 by having the upper partition member 38 overlapped and fixed to the lower partition member 40 so that the top wall inner surface of the housing space 64 is covered with the facing plate portion 74a, while the bottom wall inner surface of the housing space 64 is covered with the facing plate portion 74b.

Also, in the rubber buffer 72 arranged in the housing space 64, the facing plate portion 74a is in contact with the top wall inner surface of the housing space 64 configured by the upper partition member 38 at the protrusion 84, while the facing plate portion 74b is in contact with the bottom wall inner surface of the housing space 64 configured by the lower partition member 40 at the protrusion 84. By the provision of the protrusion 84, the facing plate portions 74a, 74b are separated from the top and bottom wall inner surfaces of the housing space 64 except at the protrusion 84 under a standstill condition. Therefore, the distance between the top face of the facing plate portion 74a and the bottom face of the facing plate portion 74b can be made larger than, smaller than, or equal to the distance between the opposing inner surfaces of the upper and lower walls of the housing space 64. However, since it is desirable to have the facing plate portions 74a, 74b separated by a given distance from the top and bottom wall inner surfaces of the housing space 64 except at the protrusion 84 under a standstill condition, the distance between the top face of the facing plate portion 74a and the bottom face of the facing plate portion 74b is made smaller than the distance between the opposing inner surfaces of the upper and lower walls of the housing space 64 in the present embodiment.

Furthermore, in an arranged state of the rubber buffer 72 in the housing space 64, the pair of side wall portions 76a, 76b are preferably arranged facing the peripheral wall inner surface of the housing space 64 (inner surface of the right and left walls in FIG. 1) with a given gap in between.

Moreover, at the time of inserting the rubber buffer 72 into the housing concave 56, the insertion pins 58, 58 are inserted into the rubber buffer 72 to penetrate up and down therethrough by means of inserting the pair of insertion pins 58, 58 integrally formed with the lower partition member 40 into the pair of insertion holes 82, 82. This constitutes the first positioning member for positioning the rubber buffer 72 relative to the partition member 36 within the housing space 64 by a locked contact between the outer periphery of the insertion pin 58 and the inner periphery of the insertion hole 82. The insertion pin 58 is made easily insertable into the insertion hole 82 by means of chamfering the edge of the protrusion of the insertion pin 58.

Also, the first window portion 78 of the rubber buffer 72 is positioned against the first communication hole 44 of the upper partition member 38 to be communicated with each other, while the second window portion 80 of the rubber buffer 72 is positioned against the second communication hole 60 to be communicated with each other. This allows a fluid flow channel 90 communicating the pressure-receiving chamber 66 with the equilibrium chamber 68 to be configured to comprise the first and second communication holes 44, 60, the first and second window portions 78, 80, the housing space 64, and the inner space 88.

On the fluid flow channel 90 is arranged a movable plate 92 as a movable member. The movable plate 92, a rectangular plate member formed with rubber elastic body, synthetic resin, metal or the like, is formed separately from the rubber buffer 72, and is arranged in the housing space 64 by being housed in the inner space 88 of the rubber buffer 72. Also, the movable plate 92, as shown by two dotted lines in FIG. 9, extends beyond the outer edge of the first window portions 78, 78 and the second window portions 80, 80 in both the long-side and short-side directions of the facing plate portions 74a, 74b. In addition, the movable plate 92 is formed shorter than the distance between the facing pair of insertion pins 58, 58 in the long-side direction of the facing plate portions 74a, 74b and also shorter than the short-side dimensions of the facing plate portions 74a, 74b in the short-side directions thereof.

Then, the movable plate 92 is arranged between the facing pair of insertion pins 58, 58 by being contained in the inner space 88 of the rubber buffer 72 to extend approximately in the axis-perpendicular direction. The movable plate 92 is formed in a size that can maintain its outer peripheral edge positioned outside the first window portions 78, 78 and the second window portions 80, 80 when displaced within the inner space 88 in the in-plane direction (direction perpendicular to the thickness direction), and the first window portions 78, 78 and the second window portions 80, 80 are entirely overlapped with the movable plate 92 in the axial projection.

Also, the movable plate 92 is arranged to spread out near perpendicular to the fluid flow channel 90 extending in the axial direction, and the liquid pressure within the pressure-receiving chamber 66 is applied to the top face of the movable plate 92 via the first communication hole 44 and the first window portion 78, while the liquid pressure within the equilibrium chamber 68 is applied to the bottom face of the movable plate 92 via the second communication hole 60 and the second window portion 80. This allows the movable plate 92 to be displaced up and down within the inner space 88 based on the relative pressure fluctuations between the pressure-receiving chamber 66 and the equilibrium chamber 68.

Then, at an input of mid-frequency small-amplitude vibration equivalent to idling vibration, the liquid pressure is transmitted between the pressure-receiving chamber 66 and the equilibrium chamber 68 by causing the movable plate 92 to be slightly displaced up and down within the inner space 88, whereas, at an input of low-frequency large-amplitude vibration, the movable plate 92 blocks either of the first window portion 78 or the second window portion 80 to shut off the fluid flow channel 90, thereby preventing transmission of liquid pressure via the fluid flow channel 90. In summary, in the present embodiment, the liquid pressure transmission mechanism whereby the liquid pressure within the pressure-receiving chamber 66 is transmitted to the equilibrium chamber 68 at an input of mid-frequency small-amplitude vibration is configured to comprise the movable plate 92. In the present embodiment, the inward protrusion 86 that protrudes toward the inner space 88 is provided on the pair of facing plate portions 74a, 74b where the movable plate 92 comes in contact with at an input of large-amplitude vibration so that the movable plate 92 first comes in contact with the inward protrusion 86 and then with the opening edge of the first window portion 78 or the second window portion 80 at an input of large-amplitude vibration. In the present embodiment, the tuning frequency of the fluid flow channel 90 is set in the mid-frequency range equivalent to the idling vibration, but it can also be set in the high-frequency range equivalent to the muffled sound of driving and the like.

The engine mount 10 with the structure described above is to be mounted to a vehicle in order to connect the power unit and the vehicular body to each other in a vibration damping manner by having the first mounting member 12 mounted to the power unit, not shown in the drawing, and the second mounting member 14 to the vehicular body, not shown in the drawing, either.

In such a vehicle-mounted state, the orifice passage 70 generates antiresonance to be substantially shut off at an input of vibration at a higher frequency than the tuning frequency once mid-frequency small-amplitude vibration equivalent to the idling vibration is inputted. Meanwhile, the movable plate 92 undergoes a slight displacement up and down without any contact against the pair of facing plate portions 74a, 74b within the inner space 88 based on the relative pressure fluctuations between the pressure-receiving chamber 66 and the equilibrium chamber 68. This enables to maintain the fluid flow channel 90 in a state of communication to cause the liquid pressure within the pressure-receiving chamber 66 to be transmitted to the equilibrium chamber 68 via the fluid flow channel 90, thereby exerting the liquid pressure absorption effect due to the volume change of the equilibrium chamber 68 to obtain the desired vibration damping (vibration isolation) effect. As evident from the above description, the liquid pressure transmission mechanism is configured by the fluid flow channel 90 with the movable plate 92 arranged thereon.

Also, once low-frequency large-amplitude vibration at about 10 Hz equivalent to that of engine shake is inputted, a fluid flow is caused via the orifice passage 70 based on the relative pressure fluctuations between the pressure-receiving chamber 66 and the equilibrium chamber 68. This makes it possible to exert the desired vibration damping (high attenuation) effect based on the fluid flow action including the fluid resonance effect.

Since the displacement of the movable plate 92 in the up-down direction increases at an input of low-frequency large-amplitude vibration, the movable plate 92 is pressed against the facing plate portions 74a, 74b to be substantially constrained. This allows either of the first and second window portions 78, 80 to be blocked by the movable plate 92 to shut off the fluid flow channel 90, preventing the liquid pressure within the pressure-receiving chamber 66 from being transmitted to the equilibrium chamber 68 via the fluid flow channel 90. Therefore, pressure fluctuations within the pressure-receiving chamber 66 are efficiently triggered to ensure a sufficient amount of fluid flow through the orifice passage 70 so that the vibration damping effect based on the fluid flow action is effectively exerted. In summary, according to the liquid pressure transmission mechanism of the present embodiment, transmission of liquid pressure by the liquid pressure transmission mechanism is switched on and off between the pressure-receiving chamber 66 and the equilibrium chamber 68 by means of switching the fluid flow channel 90 between a state of communication and a state of shut-off using the movable plate 92. Also, since the movable plate 92 is arranged between the pair of insertion pins 58, 58 facing each other, the amount of displacement of the movable plate 92 in the axis-perpendicular direction is restricted by the insertion pins 58, 58 so that the first and second window portions 78, 80 can be completely shut off by the relatively compact movable plate 92.

In that situation, the impact force generated by the movable plate 92 coming into contact with the top and bottom wall inner surfaces of the housing space 64 is to be absorbed by the rubber buffer 72. In other words, once the movable plate 92 comes in contact with the top wall inner surface of the housing space 64 via the facing plate portion 74a, the impact energy at the time of contact inputted to the facing plate portion 74a is transmitted to the facing plate portion 74b via the pair of side plate portions 76a, 76b. In this process, the pair of side plate portions 76a, 76b and the facing plate portion 74b are slightly deformed by the energy input of the impact so that the impact energy is converted into heat energy based on the internal friction and the like of the facing plate portion 74b and the pair of side plate portions 76a, 76b. This reduces the impact energy transmitted to the partition member 36 via the rubber buffer 72, thereby reducing or preventing striking noise caused by the impact energy. In case the movable plate 92 comes in contact with the bottom wall inner surface of the housing space 64 via the facing plate portion 74b, a similar energy attenuation effect is exerted by transmitting the impact energy inputted to the facing plate portion 74b to the facing plate portion 74a via the pair of side plate portions 76a, 76b, thereby preventing generation of striking noise.

Especially in the present embodiment, the protrusion 84 is provided on each of the facing plate portions 74a and 74b, which are partially in contact with and supported by the top and bottom wall inner surfaces of the housing space 64 at the protrusion 84. Therefore, at the input of the impact energy, the pair of facing plate portions 74a, 74b are slightly deformed without being restricted by the top and bottom wall inner surfaces of the housing space 64, thereby efficiently exerting the energy attenuation effect due to the internal friction and the like.

In addition, the pair of side plate portions 76a, 76b are also slightly deformed by being located away from the inner peripheral surface of the housing space 64 to allow efficient transmission of impact energy between the pair of facing plate portions 74a, 74b, while the energy attenuation effect of the side plate portions 76a, 76b is effectively exerted. Further, in the present embodiment, the rubber buffer 72 is positioned within the housing space 64 by having the pair of insertion pins 58, 58 inserted into the pair of insertion holes 82, 82, to maintain the gap between the pair of side plate portions 76a, 76b and the inner peripheral surface of the housing space 64, thereby obtaining the above-mentioned effects in a stable manner.

Also, on each of the pair of facing plate portions 74a, 74b, the inward protrusion 86 is provided to protrude inward in the direction of facing, and the inward protrusion 86 comes in contact preferentially with the movable plate 92 whenever the movable plate 92 comes in contact with the pair of facing plate portions 74a, 74b. This causes the movable plate 92 to contact with the inward protrusion first and then with the opening edge of the first window portion 78 or the second window portion 80 when coming in contact with the pair of facing plate portions 74a, 74b, which realizes step-by-step contacts, thereby reducing striking noise caused by the impact force at the time of contact. In addition, since the energy attenuation effect is exerted based on the internal friction and so forth due to compressive deformation of the inward protrusion 86 and the protrusion 84 as well as shear (flexural) deformation of the movable plate 92, the impact of contact against the opening edge of the first and second window portions 78, 80 is attenuated, thereby reducing striking noise more effectively.

Figure 12:
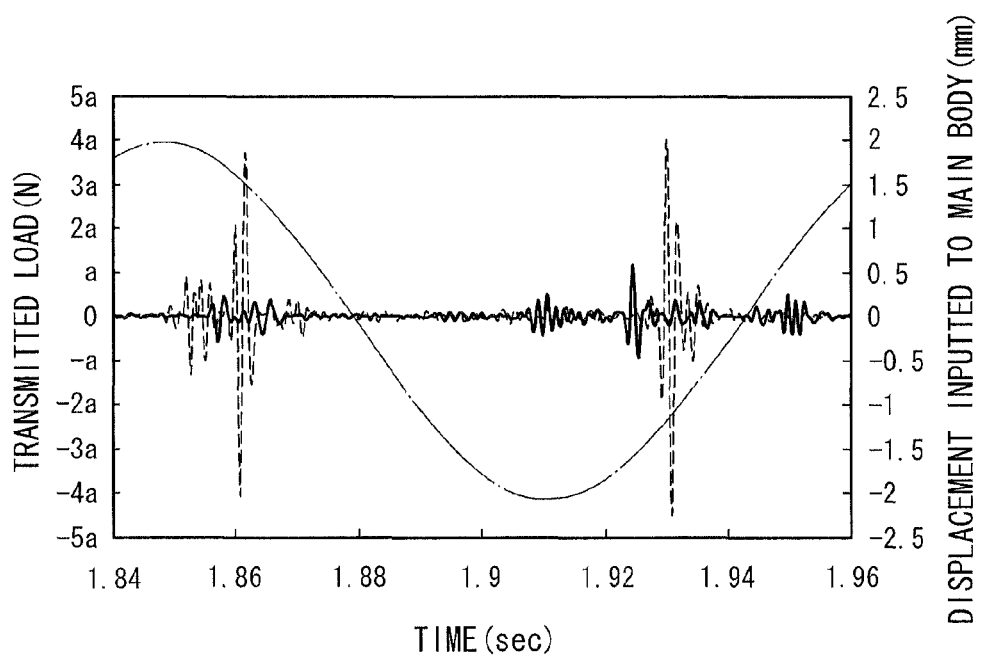
FIG. 12 is a graph plotting measurements of the contact loads between the movable plate and the partition member transmitted to the second mounting member in the engine mount shown in FIG. 1.

It is obvious from the result of measurements shown in FIG. 12 that, the transmission of the impact force to the vehicular body (second mounting member 14) is reduced at the time of contact by the movable plate 92. In the graph of FIG. 12, the solid line indicates measurement results of the engine mount 10 related to the present embodiment (Example), the dash line indicates those of the engine mount 10 related to the present embodiment with the rubber buffer 72 removed (Comparative Example), and the dashed-dotted line indicates those of the relative displacement (displacement inputted to the main body) between the first mounting member 12 and the second mounting member 14, respectively.

That is, according to the graph of FIG. 12, when a large-amplitude vibration load is inputted between the first mounting member 12 and the second mounting member 14, the Comparative Example confirms transmission of a large load to the second mounting member 14 due to the contact of the movable plate 92, whereas the Example shows that the load transmitted to the second mounting member 14 is reduced in a very effective way at the time of contact by the movable plate 92. Thus, because the amount of load transmitted to the second mounting member 14 attached to the vehicular body can be restricted, striking noise generated by contact of the movable plate 92 can be prevented from being transmitted to the vehicular cabin. Although not shown in the drawing, no difference in vibration damping performance is confirmed between the Example and the Comparative Example.

Figure 13:
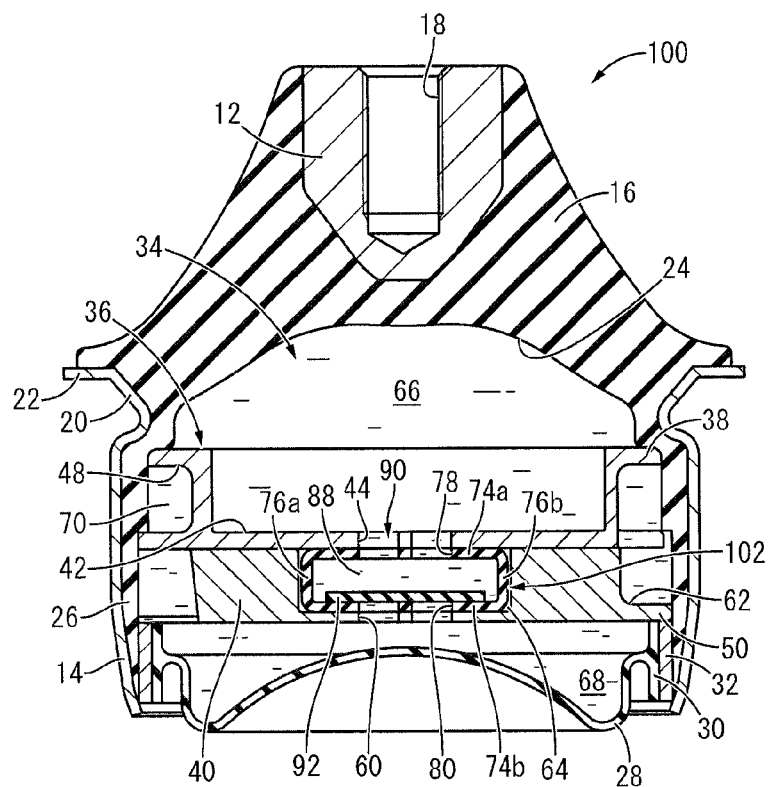
FIG. 13 is a longitudinal sectional view showing an engine mount as a second embodiment of the present invention.

FIG. 13 shows an engine mount 100 for automobiles as a second embodiment of the fluid-filled vibration damping device with the structure according to the present invention. In the following paragraphs, descriptions will be omitted by using the same numeric codes in the drawings for substantially the same members and parts as those of the first embodiment.

Figure 14:
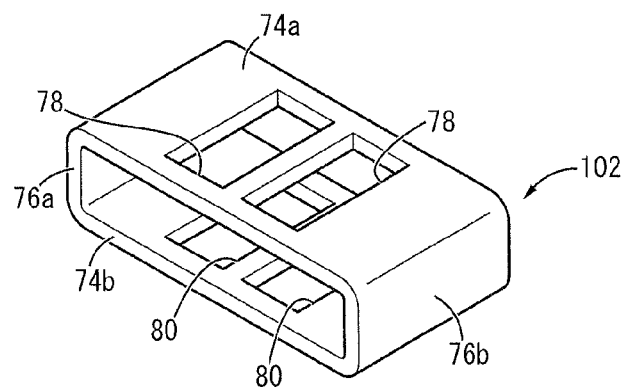
FIG. 14 is a perspective view of a rubber buffer composing the engine mount shown in FIG. 13.

In other words, the engine mount 100 is provided with a rubber buffer 102 as a buffer body. The rubber buffer 102, as is the rubber buffer 72 of the first embodiment, has the pair of facing plate portions 74a, 74b facing each other at a given distance in the thickness direction being made to be a band-like cylindrical body connected to each other at both ends by the pair of side plate portions 76a, 76b (see FIG. 14).

The pair of facing plate portions 74a, 74b are in an approximate shape of a rectangle corresponding to each other in a plan view, wherein the pair of first window portions 78, 78 are formed penetrating through the facing plate portion 74a, while the pair of second window portions 80, 80 are formed penetrating through the facing plate portion 74b. Meanwhile, the protrusion 84, inward protrusion 86, and insertion hole 82 provided on the pair of facing plate portions 74a, 74b of the first embodiment are not provided on the pair of facing plate portions 74a, 74b of the present embodiment. Since the rubber buffer 102 does not have the insertion hole 82, the insertion pin 58 is omitted in the lower partition member 40.

The rubber buffer 102 with the structure described above is housed in the housing space 64 of the partition member 36 wherein the facing plate portion 74a comes in contact with the top wall inner surface of the housing space 64, while the facing plate portion 74b comes in contact with the bottom wall inner surface of the housing space 64. The rubber buffer 102 of the present embodiment, as is the case with the first embodiment, is made slightly shorter than the housing space 64 in the long-side direction, and the pair of side plate portions 76a, 76b are arranged at a location away from the peripheral wall inner surface of the housing space 64 with a gap in between. Also, the pair of facing plate portions 74a, 74b are almost entirely in contact with the top and bottom wall inner surfaces of the housing space 64 and overlapped thereon in a non-adhesive way.

Even in the engine mount 100 with the structure according to the present embodiment, as is the case with the engine mount 10 of the first embodiment, the impact energy generated by the movable plate 92 contacting against the pair of facing plate portions 74a, 74b is reduced by the energy attenuation effect based on the internal friction at the time of slight deformation of the rubber buffer 102 to prevent generation of striking noise.

Also, since the insertion pin 58 is omitted in the lower partition member 40, while the protrusion 84, inward protrusion 86, and insertion hole 82 are omitted in the rubber buffer 102, the structure is further simplified, thereby improving the manufacturability and reliability and the like of the vibration damping device.

Figure 15:
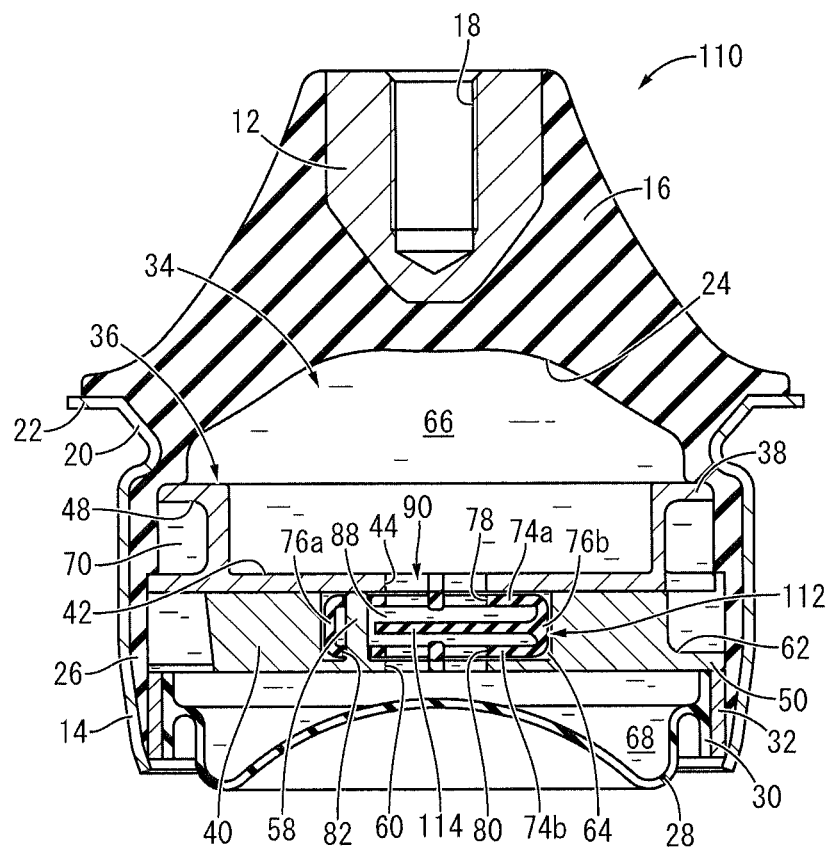
FIG. 15 is a longitudinal sectional view showing an engine mount as a third embodiment of the present invention.

FIG. 15 shows an engine mount 110 for automobiles as a third embodiment of the fluid-filled vibration damping device with the structure according to the present invention. The engine mount 110 is provided with a rubber buffer 112 as a buffer body.

Figure 16:
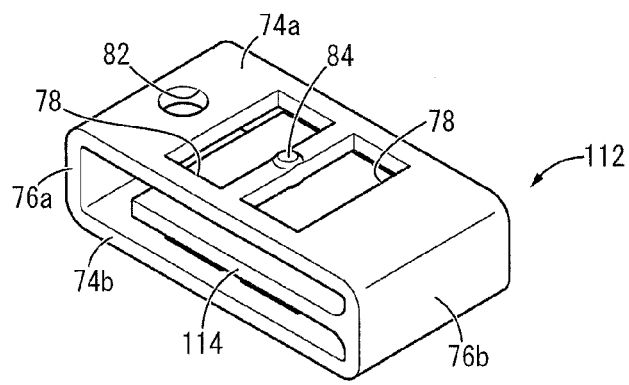
FIG. 16 is a perspective view of a rubber buffer composing the engine mount shown in FIG. 15.
Figure 17:
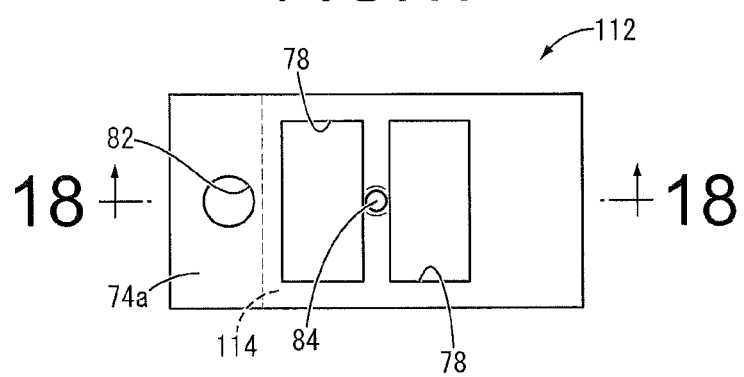
FIG. 17 is a plan view of the rubber buffer shown in FIG. 16.
Figure 18:
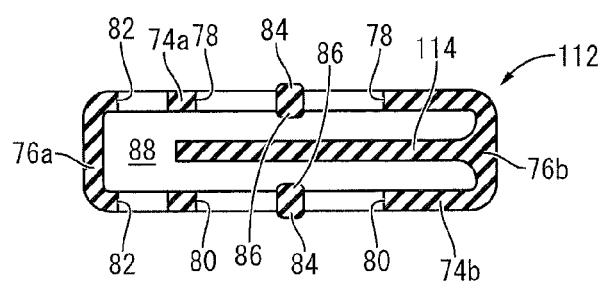
FIG. 18 is a cross-sectional view taken along line 18-18 of FIG. 17.

More specifically, the rubber buffer 112, as shown in FIGS. 16 to 18, is made to be a band-like cylindrical body wherein the pair of facing plate portions 74a, 74b each in an approximate shape of a rectangle in a plan view are arranged up and down facing each other at a given distance, while the pair of facing plate portions 74a, 74b are connected to each other at both ends in the long-side direction by the pair of side plate portions 76a, 76b.

In addition, a movable film 114 is integrally formed as a movable member with the side plate portion 76b at the near center in the up-down direction. This movable film 114 is a rubber elastic body in a plate form protruding into the inner space 88 toward the side plate portion 76a, the tip end of which is extended toward the side plate portion 76a beyond the first and second window portions 78, 80 in a length short of reaching the side plate portion 76a. On the pair of facing plate portions 74a, 74b of the present embodiment, a single insertion hole 82 is formed at a location off the tip end of the movable film 114, and only one insertion pin 58 is formed on the lower partition member 40 at a location corresponding to the insertion hole 82.

Then, the rubber buffer 112 is housed in the housing space 64 of the partition member 36, whereas, as shown in FIG. 15, the facing plate portion 74a is in contact with the top wall inner surface of the housing space 64 at the protrusion 84, while the facing plate portion 74b is in contact with the lower wall inner surface of the housing space 64 at the protrusion 84. Also, the movable film 114 integrally formed with the rubber buffer 112 extends in the direction perpendicular to the flowing direction of the fluid flow channel 90 (up-down direction in FIG. 15), the tip end of which reaches beyond the first window portions 78, 78 and the second window portions 80, 80 to the outside in the axial projection (to the side of the side plate portion 76a).

In the engine mount 110 with the structure described above, the orifice passage 70 is substantially blocked by antiresonance at an input of mid-frequency small-amplitude vibration, while the liquid pressure within the pressure-receiving chamber 66 is transmitted and absorbed to the equilibrium chamber 68 by having the movable film 114 slightly deformed up and down without being pressed against the pair of facing plate portions 74a, 74b. This prevents the pressure-receiving chamber 66 from increasing its dynamic spring constant to exert the vibration damping (vibration isolation) effect due to the lowered dynamic spring constant.

Meanwhile, at the input of low-frequency large-amplitude vibration, the movable film 114 undergoes a large elastic deformation up and down so as to cover the pair of first window portions 78, 78 or the second window portions 80, 80. This prevents transmission of liquid pressure between the pressure-receiving chamber 66 and the equilibrium chamber 68 via the fluid flow channel 90, thereby efficiently causing pressure fluctuations within the pressure-receiving chamber 66. This allows the amount of fluid flowing through the orifice passage 70 to be efficiently provided, thus effectively achieving the vibration damping (vibration isolation) effect based on the fluid flow action.

According to the engine mount 110 of the present embodiment described above, since the movable member comprises the movable film 114 integrally formed with the rubber buffer 112, the number of parts can be reduced, while the process of setting the movable member in the inner space 88 of the rubber buffer 112 can be omitted, thereby improving the manufacturability of the engine mount 110. In addition, the movable film 114 is supported by the side plate portion 76b on one side in a cantilever manner separated from the other side plate portion 76a so as to be deformed enough to shut off the first window portions 78, 78 and the second window portions 80, 80 in a stable manner.

Figure 19A:
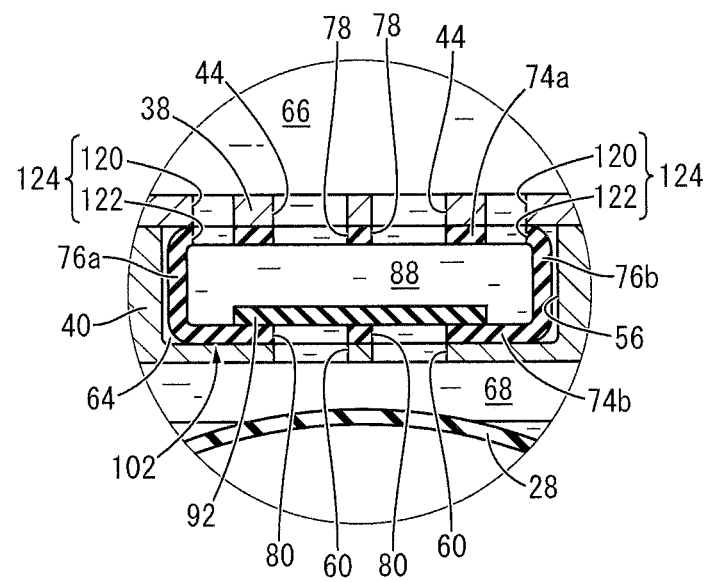
FIGS. 19A and 19B are partial cross-section views showing an enlarged key portion of an engine mount as a fourth embodiment of the present invention where FIG. 19A indicates a state of a pressure-receiving chamber under positive pressure at an input of a large load, and FIG. 19B indicates a state of the same under negative pressure at an input of a large load, respectively.
Figure 19B:
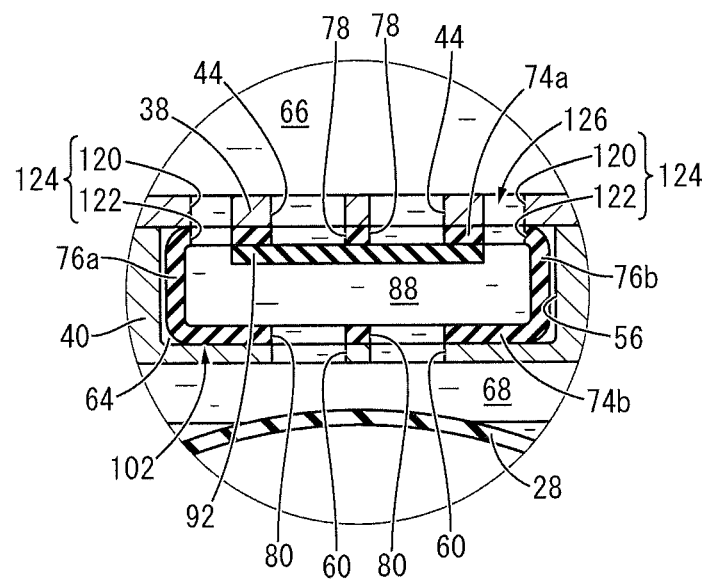

FIGS. 19A and 19B show an enlarged key portion of the engine mount as a fourth embodiment of the fluid-filled vibration damping device with the structure according to the present invention. As to the parts not shown in the drawing, similar configurations to those of the first embodiment are basically adopted.

In other words, in the structure of the present embodiment shown in FIGS. 19A and 19B, a plurality of third communication holes 120 are formed in the upper partition member 38. These third communication holes 120 are provided in the area outside of the movable plate 92 in the long-side direction and penetrate up and down through the bottom wall of the central concave 42, which is the top wall portion of the housing space 64. This allows the housing space 64 to be communicated with the pressure-receiving chamber 66 not only by the first communication hole 44 but also by the third communication hole 120.

Also, a plurality of third window portions 122 are formed in the rubber buffer 102. The third window portion 122 is formed in penetration through the facing plate portion 74a overlapped with the wall inner surface of the housing space 64 on the side of the pressure-receiving chamber 66 and is provided outside the pair of first window portions 78, 78 of the facing plate portion 74a in the long-side direction. In the present embodiment, the number and cross-section form of the third window portions 122 are made similar to those of the third communication holes 120.

By having this rubber buffer 102 housed in the housing space 64, the third communication hole 120 and the third window portion 122 are positioned and communicated up and down with each other. This enables to form a plurality of short-circuit holes 124 that maintain the pressure-receiving chamber 66 and the inner space 88 always communicated with each other by the third communication hole 120 and the third window portion 122.

Then, when a positive pressure is applied to the pressure-receiving chamber 66 at an input of a large load of impact in a vehicle-mounted state, the pair of second window portions 80, 80 are shut off by the movable plate 92 coming in contact with the facing plate portion 74b as shown in FIG. 19A. This causes the fluid flow channel 90 to be shut off and the inner space 88 to be closed fluid-tight against the equilibrium chamber 68, thereby substantially shutting off the short-circuit holes 124.

Meanwhile, at the time of applying a negative pressure to the pressure-receiving chamber 66 at an input of a large load of impact, the pair of first window portions 78, 78 are shut off by the movable plate 92 coming in contact with the facing plate portion 74a as shown in FIG. 19B. This causes the fluid flow channel 90 to be shut off and the short-circuit hole 124 to be communicated with the equilibrium chamber 68 via the inner space 88, the second window portions 80, 80, and the second communication holes 60, 60. As a result, a short-circuit passage 126 is configured to comprise the short-circuit hole 124 to communicate the pressure-receiving chamber 66 and the equilibrium chamber 68 with each other, and the negative pressure within the pressure-receiving chamber 66 is reduced or eliminated as quickly as possible due to the fluid flowing from the equilibrium chamber 68 to the pressure-receiving chamber 66 via the short-circuit passage 126. Therefore, cavitation noise caused by an excessive pressure drop in the pressure-receiving chamber 66 can be reduced or avoided.

Figure 20:
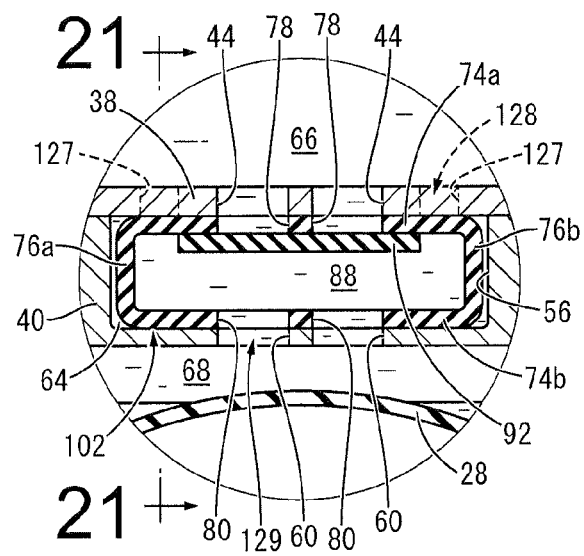
FIG. 20 is a partial cross-section showing an enlarged key portion of an engine mount as a fifth embodiment of the present invention, indicating a state of a pressure-receiving chamber under negative pressure at an input of a large load.
Figure 21:
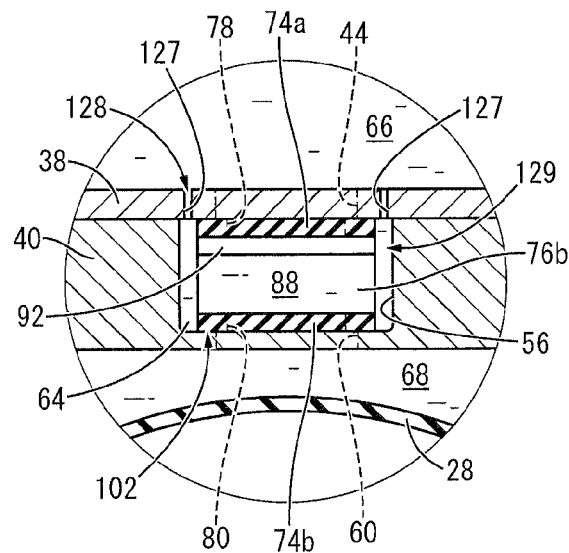
FIG. 21 is a cross-sectional view taken along line 21-21 of FIG. 20.

FIGS. 20 and 21 show enlarged key portions of the engine mount as a fifth embodiment of the fluid-filled vibration damping device with the structure according to the present invention. FIG. 20 shows the pressure-receiving chamber 66 under negative pressure at an input of a large load of impact.

In other words, in the structure of the present embodiment shown in FIG. 20, a plurality of third communication holes 127 are formed in the upper partition member 38. The third communication hole 127 is a slit-like hole with its longitudinal side aligned with the long-side direction (left-right direction in FIG. 20) of the housing space 64 penetrating up and down through the bottom wall of the central concave 42, which is the top wall portion of the housing space 64. This allows the housing space 64 to be communicated with the pressure-receiving chamber 66 not only by the first communication hole 44 but also by the third communication hole 127. The third communication hole 127 is formed at each end of the housing space 64 in the short-side direction (left-right direction in FIG. 21).

Also, in the present embodiment, as shown in FIG. 21, the short-side dimension of the rubber buffer 102 (left-right direction in FIG. 21) is made smaller than that of the inside dimension of the housing space 64 in the same direction, and each end of the rubber buffer 102 in the short-side direction is separated from the peripheral wall inner surface of the housing space 64 by a given gap. Then, the inner space 88 of the rubber buffer 102 opening on both sides thereof in the short-side direction is communicated with the gap.

Furthermore, the third communication holes 127 are formed on both sides beyond the rubber buffer 102 in the short-side direction, and the lower opening of the third communication hole 127 is communicated with the gap mentioned above. This enables to form a short-circuit hole 128 that maintains the pressure-receiving chamber 66 and the inner space 88 always communicated with each other using the third communication hole 127 and the gap.

Moreover, in a state where the pressure within the pressure-receiving chamber 66 drops down to separate the movable plate 92 from the facing plate portion 74b, the pressure-receiving chamber 66 and the equilibrium chamber 68 are communicated with each other via the short-circuit hole 128, inner space 88, second window portion 80, and second communication hole 60. This allows a short-circuit passage 129 to be formed by including the short-circuit hole 128 to communicate the pressure-receiving chamber 66 and the equilibrium chamber 68 with each other.

Even in the engine mount of the present embodiment with the structure described above, as is the case for the engine mount shown in the fourth embodiment, a valid vibration damping effect at an input of normal vibration can be obtained, while the cavitation noise likely to be a problem when excessive negative pressure is applied to the pressure-receiving chamber 66 is reduced by the fluid flow via the short-circuit passage 129.

Figure 22:
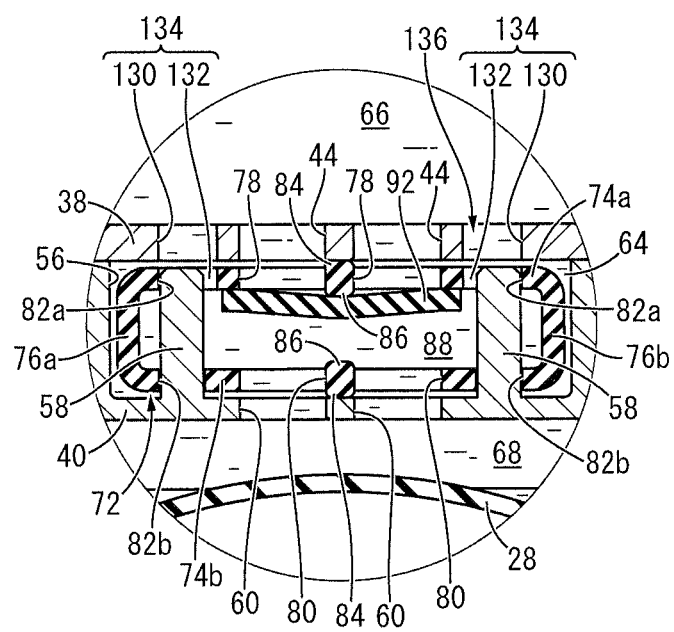
FIG. 22 is a partial cross-section showing an enlarged key portion of an engine mount as a sixth embodiment of the present invention, indicating a state of a pressure-receiving chamber under negative pressure at an input of a large load.

FIG. 22 shows an enlarged key portion of the engine mount as a sixth embodiment of the fluid-filled vibration damping device with the structure according to the present invention. FIG. 22 also shows the pressure-receiving chamber 66 under negative pressure at an input of a large impact load.

In other words, in the engine mount of the present embodiment, a plurality of third communication holes 130 are formed in the upper partition member 38. The third communication holes 130 are provided outside the pair of first communication holes 44, 44 in the short-side direction and are formed penetrating up and down through the top wall portion of the housing space 64 (bottom wall portion of the central concave 42). This allows the housing space 64 to be communicated with the pressure-receiving chamber 66 not only via the first communication hole 44 but also via the third communication hole 130.

Also, in the rubber buffer 72, the cross-section area of the insertion hole 82a formed in the facing plate portion 74a on the side of the pressure-receiving chamber 66 is made larger than the axis-perpendicular cross-section area of the insertion pin 58, and a gap 132 is formed between the inner peripheral surface of the insertion hole 82a and the outer peripheral surface of the insertion pin 58. In the present embodiment, the insertion hole 82a works both as the locking hole constituting the first positioning member and as the third window portion constituting the short-circuit hole.

The gap 132 can be formed by having the diameter of the insertion hole 82a made larger than that of the insertion pin 58, but in order to effectively achieve the positioning effect, it is desirable to form the insertion hole 82a with an irregular cross-section, for example, that is partially enlarged along the periphery so as to form the gap 132 at the enlarged portion. Also, the shape of the insertion hole 82b formed in the facing plate portion 74b on the side of the equilibrium chamber 68 is roughly corresponding to the cross-sectional shape of the insertion pin 58, as is the case with the first embodiment.

Then, the gap 132 formed by having the rubber buffer 72 arranged in the housing space 64 is positioned and communicated up and down with the third communication hole 130 formed in the upper partition member 38. And a short-circuit hole 134 is formed to maintain the pressure-receiving chamber 66 and the inner space 88 always communicated with each other.

According to the engine mount with the structure described above, once pressure within the pressure-receiving chamber 66 drops down at an input of a large impact load, the movable plate 92 comes in contact with the facing plate portion 74a to cover the first window portions 78, 78 so that the fluid flow channel 90 is shut off. Meanwhile, the inner space 88 is communicated with the equilibrium chamber 68 via the second window portions 80, 80 and the second communication holes 60, 60, while being communicated with the pressure-receiving chamber 66 via the gap 132 and the third communication hole 130, thus a short-circuit passage 136 that communicates the pressure-receiving chamber 66 and the equilibrium chamber 68 with each other is formed using the short-circuit hole 134. This allows the pressure drop in the pressure-receiving chamber 66 to be alleviated by having fluid flowing from the equilibrium chamber 68, thereby preventing generation of cavitation noise.

Once a positive pressure is applied to the pressure-receiving chamber 66 at an input of a large impact load, the movable plate 92 comes in contact with the facing plate portion 74b to cover the second window portions 80, 80 so that the fluid flow channel 90 as well as the short-circuit passage 136 are shut off. Since this triggers pressure fluctuations within the pressure-receiving chamber 66 in an efficient manner, the vibration damping effect is effectively achieved in the orifice passage 70 based on the fluid flow action, thereby achieving the desired vibration damping effect (high attenuation effect).

Figure 23:
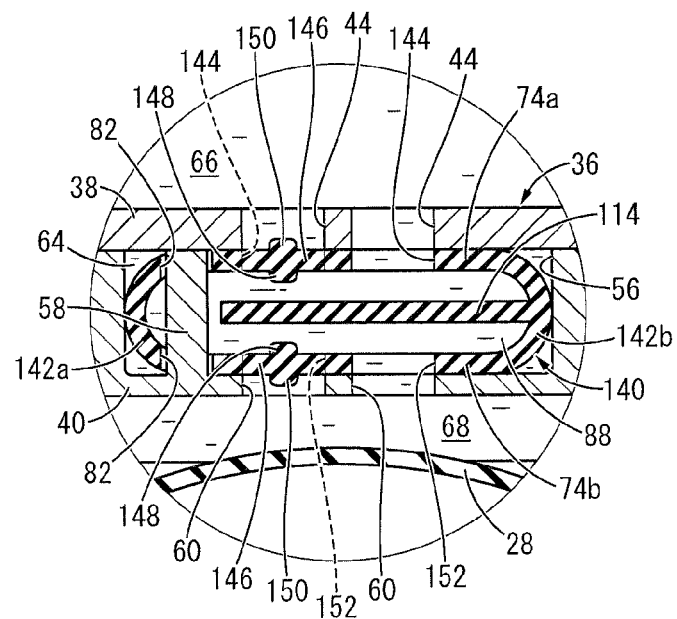
FIG. 23 is a partial cross-section showing an enlarged key portion of an engine mount as a seventh embodiment of the present invention.

FIG. 23 shows an enlarged key portion of the engine mount as a seventh embodiment of the fluid-filled vibration damping device with the structure according to the present invention. The engine mount has a structure where a rubber buffer 140 is arranged as a buffer body in the housing space 64 of the partition member 36. The rubber buffer 140 is made to be a band-like cylindrical body having a pair of facing plate portions 74a, 74b facing each other up and down in the axial direction connected to each other by the pair of side plate portions 142a, 142b.

Figure 24:
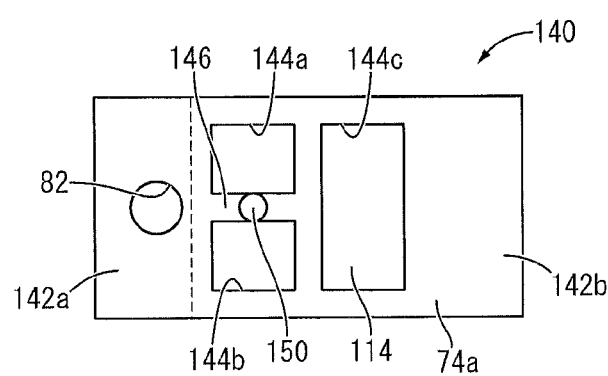
FIG. 24 is a plan view of a rubber buffer composing the engine mount shown in FIG. 23.

More specifically, the facing plate portion 74a, as shown in FIG. 24, is in an approximate shape of a thin rectangular plate having three first window portions 144a, 144b and 144c that penetrate therethrough in the thickness direction. The first window portions 144a, 144b, each being a hole with a rectangular cross-section, are formed in the short-side direction of the facing plate portion 74a (up-down direction in FIG. 24) at a given distance to each other, and a crossbar portion 146 is provided between the first window portions 144a, 144b. The first window portion 144c is made larger than the first window portions 144a, 144b in the short-side direction and formed at a given distance to the first window portions 144a, 144b in the long-side direction (left-right direction in FIG. 24).

Furthermore, an inward protrusion 148 is integrally formed as a buffer protrusion with the crossbar portion 146 of the facing plate portion 74a. The inward protrusion 148 is a protrusion that protrudes between the facing surfaces of the facing plate portion 74*a* and the movable film 114 (inner space 88), and more specifically, protrudes from the bottom face of the facing plate portion 74*a* toward the movable film 114 to be arranged thereabove at a given distance.

Moreover, an outward protrusion 150 is integrally formed as a positioning portion with the crossbar portion 146 of the facing plate portion 74*a*. The outward protrusion 150 is a circular protrusion in a similar shape to the inward protrusion 148 protruding from the top face of the facing plate portion 74*a* toward the opposite (upper) side of the movable film 114 and facing plate portion 74*b*. In the present embodiment, the outward protrusion 150 and the inward protrusion 148 protrude up and down respectively at the same location of the facing plate portion 74*a*.

Descriptions of the facing plate portion 74*b* will be omitted since it has the same shape as the facing plate portion 74*a* with second window portions 152*a*, 152*b*, 152*c* in the same shape as the first window portions 144*a*, 144*b*, 144*c*. The inward protrusion 148 of the facing plate portion 74*b* protrudes from the top face thereof to the side of the movable film 114 and arranged below the movable film 114 at a given distance. Also, the outward protrusion 150 of the facing plate portion 74*b* protrudes from the bottom face of the facing plate portion 74*b* toward the opposite (down) side of the facing plate portion 74*a*.

Side plate portions 142*a*, 142*b* are integrally formed with the facing plate portions 74*a*, 74*b* in such a way that the ends of the facing plate portions 74*a* and 74*b* in the long-side direction are connected to each other. Then, the side plate portions 142*a*, 142*b* of the present embodiment are curved in convex outward in the long-side direction and shaped in an arc in the longitudinal section. The movable film 114 is integrally formed with the side plate portion 142*b* at the center in the up-down direction protruding toward the side plate portion 142*a*.

Then, as shown in FIG. 23, the rubber buffer 140 is arranged in the housing space 64 wherein the facing plate portion 74*a* is overlapped in contact with the wall inner surface of the housing space 64 on the side of the pressure-receiving chamber 66, while the facing plate portion 74*b* is overlapped in contact with the wall inner surface of the housing space on the side of the equilibrium chamber 68. In such a state of arrangement of the rubber buffer 140, the first window portions 144*a*, 144*b*, 144*c* are open to the pressure-receiving chamber 66 via the first communication holes 44, 44, while the second window portions 152*a*, 152*b*, 152*c* are open to the equilibrium chamber 68 via the second communication holes 60, 60.

Also, the crossbar portion 146 of the facing plate portion 74*a* is located above the opening of the first communication hole 44, thus the formation of the inward protrusion 148 is arranged on the communication hole 44 away from the wall of the housing space 64. In addition, the crossbar portion 146 of the facing plate portion 74*b* is located over the opening of the second communication hole 60, thus the formation of the inward protrusion 148 is arranged on the second communication hole 60 away from the wall of the housing space 64 on the side of the equilibrium chamber 68. This allows the formation of the inward protrusion 148 of the facing plate portion 74*a* to elastically deform into the first communication hole 44 in the thickness direction, while allowing the formation of the inward protrusion 148 of the facing plate portion 74*b* to elastically deform into the second communication hole 60 in the thickness direction. As evident from the above, an allowance area for deformation is configured by the first and second communication holes 44, 60 in the present embodiment.

In addition, the outward protrusion 150 of the facing plate portion 74*a* protrudes into the first communication hole 44, while the outward protrusion 150 of the facing plate portion 74*b* protrudes into the second communication hole 60. And, whether the inward protrusions 148, 148 are arranged on the communication holes 44, 60 or not can be confirmed by visually observing the location of the outward protrusions 150, 150 after the arrangement of the rubber buffer 140 in the housing space 64. This constitutes the second positioning member that positions the rubber buffer 140 against the partition member 36 at a given location. Also, as evident from the above, the positioning holes of the present embodiment are configured by using the first and second communication holes 44, 60 formed through the walls of the housing space 64 on the sides of the pressure-receiving chamber 66 and the equilibrium chamber 68. In the present embodiment, both the first and second positioning member are provided, but either one alone can be provided therein.

In the engine mount with the rubber buffer 140 described above, when the movable film 114 is elastically deformed to come in contact with the facing plate portion 74*a* or 74*b* at an input of large-amplitude vibration such as engine shake, the movable film 114 first touches the inward protrusion 148. This allows the contact area of the movable film 114 against the facing plate portions 74*a*, 74*b* to be smaller, thereby restricting striking noise caused by the impact force at the time of contact.

Furthermore, since the inward protrusion 148 is located over the opening of the first communication hole 44, the facing plate portion 74*a* is elastically deformed as if being pressed into the first communication hole 44 as the amount of elastic deformation of the movable film 114 increases. This prevents the movable film 114 from abruptly hitting against the facing plate portion 74*a* at a location off the inward protrusion 148 to gradually increase the area of contact centered around the contact portion against the inward protrusion 148, thereby effectively exerting the striking-noise reduction effect due to the alleviated impact force.

Figure 25:
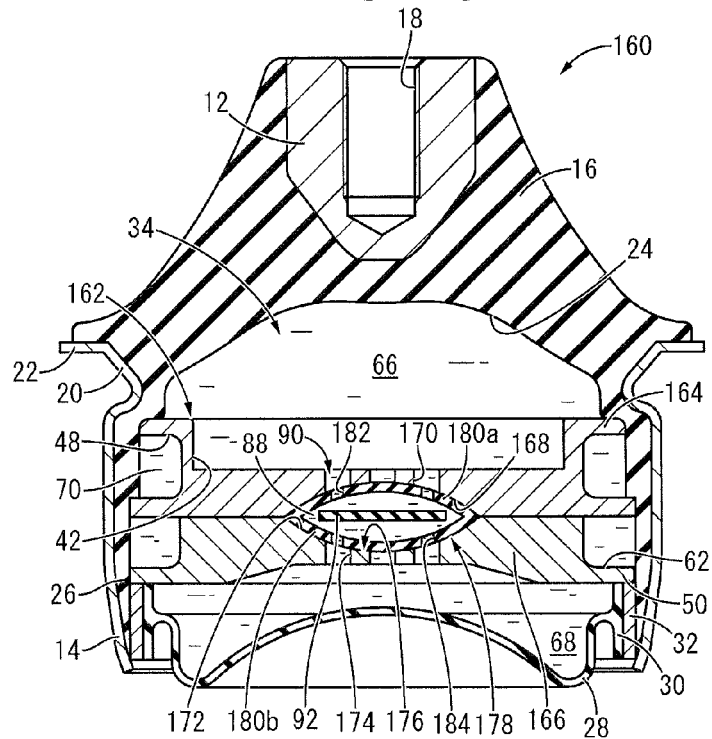
FIG. 25 is a longitudinal sectional view showing an engine mount as an eighth embodiment of the present invention.

FIG. 25 shows an engine mount 160 as an eighth embodiment of the fluid-filled vibration damping device with the structure according to the present invention. The engine mount 160 has a partition member 162.

The partition member 162 is provided with an upper partition member 164 and a lower partition member 166. The upper partition member 164 is in an approximate shape of a circular disc with its inner periphery (bottom wall portion of the central concave 42) thicker as compared to the upper partition member 38 of the first embodiment. Also, an upper housing concave 168 is formed at the center of the upper partition member 164 in the radial direction. The upper housing concave 168 is a concavity provided with a curved bottom surface that gradually deepens toward the center in the left-right direction extending in the front-back direction (perpendicular to the paper plane in FIG. 25) with a near-constant arched cross-section and opening downward from the upper partition member 164. For better understanding, the direction perpendicular to the paper plane in FIG. 25 is called "front-back direction," and the left-right direction in FIG. 25 is called "left-right direction," but these directions are not necessarily consistent with the front-back and left-right directions of the vehicle in the vehicle-mounted state of the engine mount 160.

Furthermore, a plurality of first communication holes 170 are formed in the upper partition member 164. The first communication hole 170 is formed penetrating up and down through the top wall of the upper housing concave 168 with a near-constant rectangular cross-section, and a plurality of first communication holes 170 are arranged in a grid pattern. The number of the first communication holes 170 is not particularly limited, but in the present embodiment, nine of them are formed in rows and columns at a given distance from each other.

The lower partition member 166 is in an approximate shape of a thick circular disc as is the lower partition member 40 of the first embodiment, and at the center in the radial direction is formed a lower housing concave 172. The lower housing concave 172 has the same shape as the upper housing concave 168 but flipped upside down, opening upward from the lower partition member 166. In addition, a plurality of second communication holes 174 are formed in the bottom wall of the lower housing concave 172 of the lower partition member 166. The second communication hole 174 is formed penetrating through the bottom wall of the lower housing concave 172 with almost the same cross-section as that of the first communication hole 170, and is arranged in plurality in a grid pattern. In the present embodiment, the second communication holes 174 are formed at a location corresponding to the first communication holes 170 in the same number.

Then, the upper partition member 164 and the lower partition member 166 are overlapped on top of each other. This allows a housing space 176 to be formed between the upper partition member 164 and the lower partition member 166 using the upper and lower housing concaves 168, 172.

Also, a rubber buffer 178 is housed as a buffer body within the housing space 176. The rubber buffer 178 has a pair of facing plate portions 180*a*, 180*b*. The facing plate portion 180*a* is in a shape of a curved plate extending in the front-back direction with an arched cross-section that is convex upward where a plurality of first window portions 182 are formed penetrating therethrough up and down in the axial direction. The facing plate portion 180*b* is in a shape of a curved plate extending in the front-back direction with an arched cross-section that is convex downward where a plurality of second window portions 184 are formed penetrating therethrough up and down in the axial direction. Then, the facing plate portion 180*a* and the facing plate portion 180*b* are integrated at both ends in the left-right direction, thereby constituting the rubber buffer 178 in a band-like cylindrical form. Between the pair of facing plate portions 180*a*, 180*b*, the inner space 88 is formed extending all the way across in the front-back direction. The inner space 88 gradually increases its up-down dimension toward the center in the left-right direction.

The rubber buffer 178 is arranged in the housing space 176. Then, the facing plate portion 180*a* of the rubber buffer 178 is overlapped in contact with the wall inner surface of the housing space 176 on the side of the pressure-receiving chamber 66 (top wall surface of the upper housing concave 168), while the facing plate portion 180*b* is overlapped in contact with the wall inner surface of the housing space 176 on the side of the equilibrium chamber 68 (bottom wall surface of the lower housing concave 172). Also, a first window portion 182 is positioned against the lower opening of the first communication hole 170 opening up to the pressure-receiving chamber 66 via the first communication hole 170, while the second window portion 184 is positioned against the upper opening of the second communication hole 174 opening up to the equilibrium chamber 68 via the second communication hole 174. Then, the liquid pressure within the pressure-receiving chamber 66 is applied to the top face of the movable plate 92 contained in the inner space 88 of the rubber buffer 178 via the first communication hole 170 and the first window portion 182, while the liquid pressure within the equilibrium chamber 68 is applied to the bottom face of the movable plate 92 via the second communication hole 174 and the second window portion 184.

Even in the engine mount 160 with the structure described above, similar effects to those of the first embodiment can be obtained. That is, by elastically deforming the rubber buffer 178 at the time of contact with the movable plate 92, the impact energy from the contact is reduced by the energy attenuation effect based on the internal friction, thereby preventing generation of striking noise.

As evident from the engine mount 160 of the present embodiment, the buffer body is not necessarily limited to the one structured with a pair of facing plate portions and a pair of side plate portions but the structure such as that of the rubber buffer 178 comprising only the pair of facing plate portions 180*a*, 180*b* can be adopted.

Figure 26:
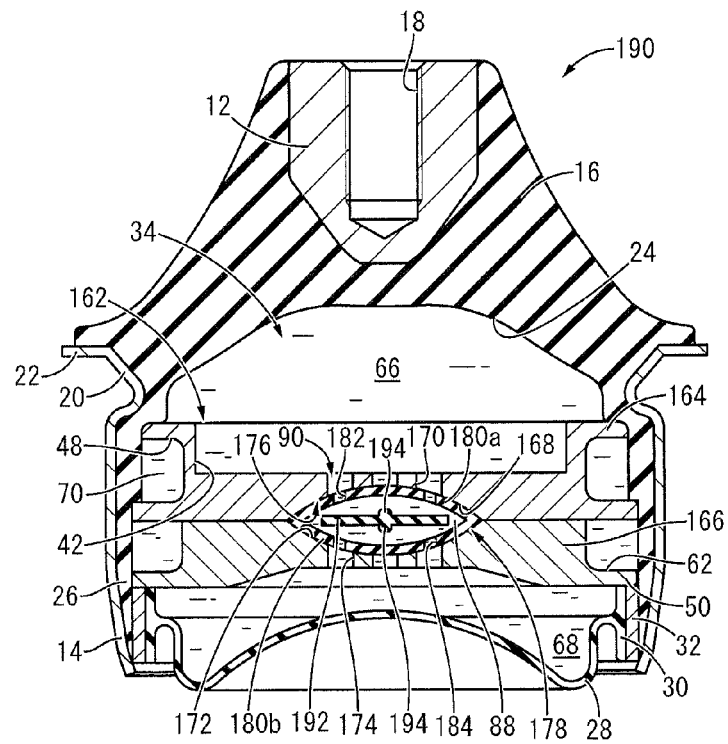
FIG. 26 is a longitudinal sectional view showing an engine mount as a ninth embodiment of the present invention.

FIG. 26 shows an engine mount 190 as a ninth embodiment of the fluid-filled vibration damping device with the structure according to the present invention. The engine mount 190 has almost the same structure as that of the engine mount 160 shown in the eighth embodiment, while a movable plate 192 is arranged as a movable member in the inner space 88 of the rubber buffer 178.

The movable plate 192 is formed with a rubber elastic body in an approximate shape of a flat plate where a pair of buffer protrusions 194, 194 are provided at the center in the axis-perpendicular direction. The buffer protrusion 194 is in an approximate shape of a rectangle smaller in size than the first and second communication holes 170, 174 formed in the partition member 162 in the axial view and is integrally formed with the movable plate 192 protruding to both sides in the thickness direction thereof. The shape of the buffer protrusion 194 in the axial view is not limited to a rectangle but can be a circle or an irregular shape, for example.

The movable plate 192 with the structure described above is housed in the inner space 88 of the rubber buffer 178. In such a state of arrangement of the movable plate 192, the upper buffer protrusion 194 is positioned over the opening of one of the first communication holes 170 at the center of the rubber buffer 178, while the lower buffer protrusion 194 is positioned over the opening of one of the second communication holes 174 at the center of the rubber buffer 178. And, at the time of contact of the buffer protrusion 194 with the rubber buffer 178, which will be described later, the rubber buffer 178 is allowed to undergo elastic deformations into the first and second communication holes 170, 174. Thus, in the present embodiment, the allowance area for deformation is configured by the first and second communication holes 170, 174.

Then, at the input of large-amplitude vibration such as engine shake, both left and right ends (left and right ends in FIG. 26) of the movable plate 192 of the present embodiment first comes in contact with the rubber buffer 178. Next, the movable plate 192 curves along the thickness direction with each contacted end working as a fulcrum to allow the center portion provided with the buffer protrusion 194 to get in contact with the rubber buffer 178. Thus, the contact area is initially made small limited to the contacts at the left and right tip ends, which gradually increases in steps by the deformation of the movable plate 192 caused by the subsequent contact of the buffer protrusion 194, thereby avoiding generation of striking noise caused by a rapid increase in the hitting contact area and so forth.

In addition, the formations of the buffer protrusions 194, 194 are arranged over the openings of the first and second communication holes 170, 174, allowing deformation of the rubber buffer 178 (facing plate portions 180*a*, 180*b*) into the first and second communication holes 170, 174 at the time of contact by the buffer protrusions 194, 194. This causes the impact force at the time of contact of the buffer protrusion 194 with the rubber buffer 178 to be reduced more effectively, thereby reducing striking noise caused by the impact force more favorably.

Figure 27:
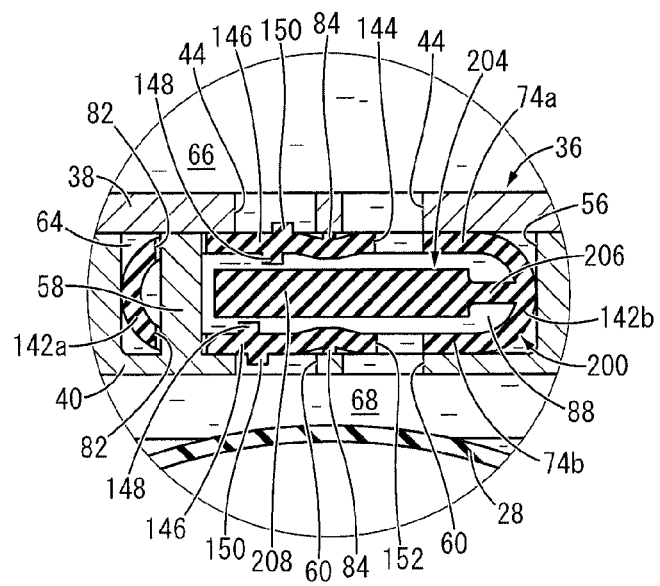
FIG. 27 is a partial cross-section showing an enlarged key portion of an engine mount as a tenth embodiment of the present invention.

FIG. 27 shows an enlarged key portion of the engine mount as a tenth embodiment of the fluid-filled vibration damping device according to the present invention. The engine mount has a structure where a rubber buffer 200 is arranged as a buffer body in the housing space 64 of the partition member 36. The rubber buffer 200 is made to be a band-like cylindrical body having the pair of facing plate portions 74a, 74b facing each other up and down in the axial direction connected to each other by the pair of side plate portions 142a, 142b.

Also, the inward protrusion 148 is formed on each of the facing plate portions 74a, 74b. The inward protrusion 148 is integrally formed with each crossbar portion 146 of the facing plate portions 74a, 74b protruding inward in the direction of facing of the facing plate portions 74a, 74b. In the present embodiment, the inward protrusion 148 formed on the facing plate portion 74a and the inward protrusion 148 formed on the facing plate portion 74b are formed at locations shifted from each other in the left-right direction (left and right direction in FIG. 27), thereby being provided at different locations without overlapping with each other in an up-down projection.

In addition, the outward protrusion 150 is formed as a positioning portion on each of the facing plate portions 74a, 74b. The outward protrusion 150 is integrally formed with the facing plate portions 74a, 74b protruding outward in the facing direction thereof. In the present embodiment, the outward protrusion 150 formed on the facing plate portion 74a and the outward protrusion 150 formed on the facing plate portion 74b are formed at locations shifted from each other in the left-right direction, thereby being provided at different locations without overlapping with each other in the up-down projection. Also, in the present embodiment, the inward protrusion 148 and the outward protrusion 150 formed on the facing plate portion 74a are provided at locations shifted from each other in the left-right direction, while being partially overlapped with each other in the up-down projection. Similarly, the inward protrusion 148 and the outward protrusion 150 formed on the facing plate portion 74b are provided at locations shifted from each other in the left-right direction, while being partially overlapped with each other in the up-down projection.

Furthermore, the protrusion 84 is formed on each of the facing plate portions 74a, 74b. The protrusion 84, integrally formed with the facing plate portions 74a, 74b, has a protrusion height and a cross-section area both smaller than those of the outward protrusion 150, while protruding outward in the thickness direction at the center of the facing plate portions 74a, 74b in the in-plane direction.

The pair of facing plate portions 74a, 74b are connected to each other at the left and right ends in the long-side direction (left and right direction in FIG. 27) by the pair of side plate portions 142a, 142b. The pair of side plate portions 142a, 142b are integrally formed with the pair of facing plate portions 74a, 74b.

Also, a movable film 204 is integrally formed as a movable member with the side plate portion 142b. The movable film 204 is in a plate form extending in the direction near perpendicular to the direction of facing of the pair of facing plate portions 74a, 74b protruding from the side plate portion 142b toward the side plate portion 142a to be formed in a length short of reaching the side plate portion 142a. In addition, the movable film 204 has a base portion (toward the side plate portion 142b) made to be a deforming portion 206 in rather a thin plate shape, while the tip portion (toward the side plate portion 142a) is made to be a valve body portion 208 in a thick flat plate shape as compared to the deforming portion 206. The valve body portion 208 is made to have higher rigidity than that of the deforming portion 206 by being made thicker so that the elastic deformation of the deforming portion 206 is preferentially generated by the action of the liquid pressure differential between the pressure-receiving chamber 66 and the equilibrium chamber 68, which will be described later. Also, the valve body portion 208 is arranged between the opposite surfaces of the facing plate portions 74a, 74b keeping away therefrom at a given distance, which is partially narrowed at the formation of the inward protrusion 148.

The rubber buffer 200 integrally provided with the movable film 204 with the structure described above is arranged in the housing space 64 of the partition member 36. Also, in an arranged state of the rubber buffer 200 in the housing space 64, the formations of the inward protrusion 148 and the outward protrusion 150 on the facing plate portion 74a are positioned over the opening of the first communication hole 44, while the formations of the inward protrusion 148 and the outward protrusion 150 on the facing plate portion 74b are positioned over the opening of the second communication hole 60. By confirming the outward protrusion 150 protruding into the first and second communication holes 44, 60 by visual observation and the like, the location of the inward protrusion 148 can be found to position it over the first and second communication holes 44, 60.

Moreover, due to the arrangement of the rubber buffer 200 in the housing space 64, the protrusion 84 of the facing plate portion 74a is pressed against the wall inner surface of the housing space 64 on the side of the pressure-receiving chamber 66, while the protrusion 84 of the facing plate portion 74b is pressed against the wall inner surface of the housing space 64 on the side of the equilibrium chamber 68. This allows the formation of the protrusion 84 on the facing plate portions 74a, 74b to be curved in convex inward in the direction of facing of the facing plate portions 74a, 74b to protrude into the inner space 88.

Then, at an input of large-amplitude vibration such as engine shake and the like, a force based on the liquid pressure differential between the pressure-receiving chamber 66 and the equilibrium chamber 68 is applied to the movable film 204, which is pressed against either of the facing plate portions 74a, 74b. In that process, with the present embodiment, since the base portion of the movable film 204 is made to be the deforming portion 206 thicker than the tip portion, the up-down displacement of the comparatively thick and rigid valve body portion 208 is sufficiently allowed due to the elastic deformation of the deforming portion 206 so that either of the first and second window portions 144, 152 is shut off by the hardly deformable valve body portion 208.

Also, when the valve body portion 208 is displaced up and down to come in contact with the facing plate portions 74a, 74b, the contact areas between the valve body portion 208 and the facing plate portions 74a, 74b are initially made small to be increased in steps.

In other words, when the valve body portion 208 is displaced up and down, it comes in contact first with the inward protrusion 148. This makes the initial contact area small resulting in reduction of the impact force, thereby preventing generation of striking noise at the initial contact.

In addition, since the formations of the inward protrusion 148 on the facing plate portions 74a, 74b are positioned against the first and second communication holes 44, 60, the clearance is allowed by deformation of the facing plate portions 74a, 74b when the inward protrusion 148 comes in contact with the valve body portion 208, thereby effectively reducing the impact force at the time of contact.

Then, when the valve body portion 208 is further displaced in the up-down direction, it comes in contact with the formation of the protrusion 84 on the facing plate portions 74a, 74b. This enables to avoid a rapid increase in the contact area of the valve body portion 208, thereby preventing generation of striking noise based on the buffering effect caused by a step-by-step increase in the contact area. Although the protrusion 84 comes in contact with the wall inner surface of the housing space 64, the shutting off of the first and second window portions 144, 152 by the valve body portion 208 cannot be prevented by the protrusion 84, which is made smaller than the inward protrusion 148.

Figure 28:
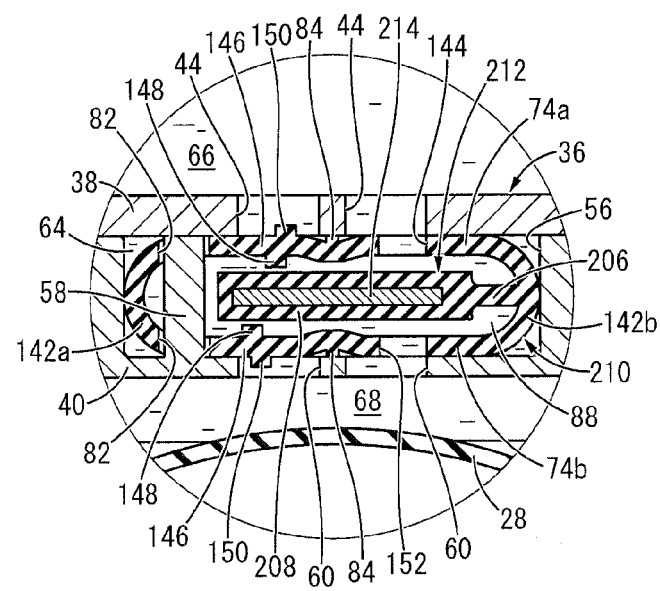
FIG. 28 is a partial cross-section showing an enlarged key portion of an engine mount as an eleventh embodiment of the present invention.

FIG. 28 shows an enlarged key portion of the engine mount as an eleventh embodiment of the fluid-filled vibration damping device according to the present invention. The engine mount has a structure where a rubber buffer 210 is arranged as a buffer body in the housing space 64 of the partition member 36. The rubber buffer 210 is provided integrally with a movable film 212.

The movable film 212 is formed so as to protrude from the side plate portion 142b toward the side plate portion 142a wherein the thin deforming portion 206 constituting the base portion and the valve body portion 208 constituting the tip portion are integrally formed by a rubber elastic body, as is the case with the movable film 204 of the ninth embodiment.

In addition, a reinforcing member 214 is fixed to the valve body portion 208 of the movable film 212. The reinforcing member 214, in an approximate shape of a thin rectangular plate, is formed with metal such as iron and aluminum alloy or hard synthetic resin such as acrylic resin. And, the reinforcing member 214 is bonded in an embedded state to the center of the valve body portion 208 in the thickness direction, thereby achieving an improvement in rigidity of the valve body portion 208. The reinforcing member 214 is made in a size of reaching the outside of the first and second communication holes 44, 60 as well as the outside of the second window portions 144, 152 in the left-right direction, and the bonded portion of the reinforcing member 214 covers the first and second communication holes 44, 60 and the first and second window portions 144, 152 due to the up-down displacement of the valve body portion 208.

Thus, the movable film is not necessarily limited to the one entirely formed with an elastic body but can be formed partially with a rigid body (hard body) at the tip portion. Also, in the present embodiment, the reinforcing member 214, which is a rigid body, is bonded in an embedded state to the valve body portion 208, and the surface of the reinforcing member 214 is covered with the rubber elastic body, but the movable film can be composed only of the reinforcing member 214 and the deforming portion 206 that supports it.

Figure 29:
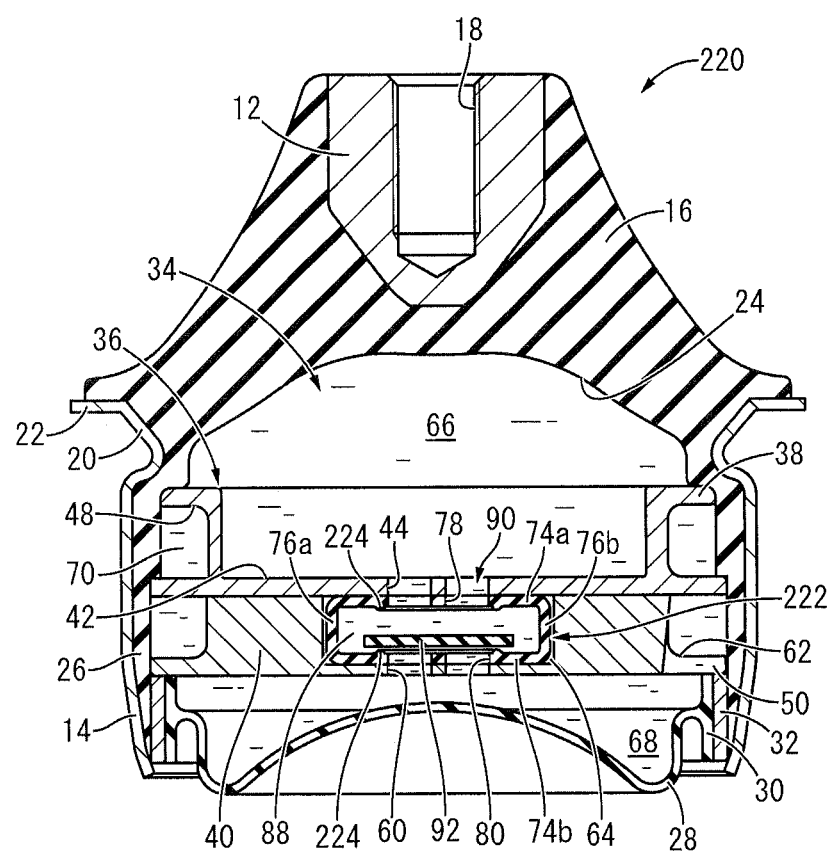
FIG. 29 is a longitudinal sectional view showing an engine mount as a twelfth embodiment of the present invention.

FIG. 29 shows an engine mount 220 for automobiles as a twelfth embodiment of the fluid-filled vibration damping device with the structure according to the present invention. The engine mount 220 has a structure where a rubber buffer 222 is arranged as a buffer body in the housing space 64 of the partition member 36.

Figure 30:
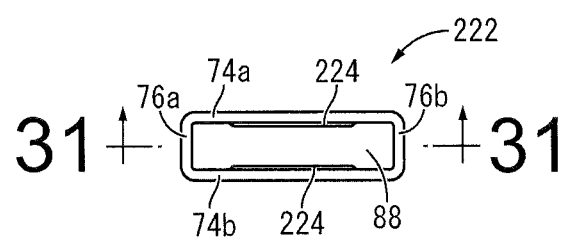
FIG. 30 is a front view of a rubber buffer composing the engine mount shown in FIG. 29.

The rubber buffer 222 has a structure of the rubber buffer 72 of the first embodiment wherein the protrusion 84, inward protrusion 86 and the insertion hole 82 are omitted, and is made to be a band-like cylindrical body integrally provided with the pair of facing plate portions 74a, 74b and the pair of side plate portions 76a, 76b, as shown in FIG. 30.

Figure 31:
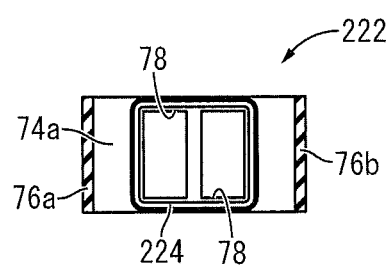
FIG. 31 is a cross-sectional view taken along line 31-31 of FIG. 30.

Also, the rubber buffer 222 has an upper inward protrusion 224 formed as a buffer protrusion on the facing plate portion 74a, while a lower inward protrusion 224 is formed as a buffer protrusion on the facing plate portion 74b. The inward protrusion 224, as shown in FIG. 31, is a ridged protrusion extending in an approximate shape of a rectangular annulus formed on each inner surface of the facing plate portions 74a, 74b that protrude into the inner space 88, while being arranged to surround the opening of the first and second window portions 78, 80 on the side of the inner space 88. In addition, each inward protrusion 224 of the present embodiment has an approximately semicircular cross-section which reduces its width toward the tip of the protrusion.

The rubber buffer 222 with the structure described above, as shown in FIG. 29, is arranged in the housing space 64 of the partition member 36, whose facing plate portions 74a, 74b are overlapped in contact with the top and bottom wall inner surfaces of the housing space 64, while the side plate portions 76a, 76b are arranged against the peripheral wall inner surfaces of the housing space 64 with a gap in between. Also, the movable plate 92 is contained in the inner space 88 of the rubber buffer 222 with the outer edge reaching beyond the inward protrusion 224 toward the outer periphery.

Then, when the movable plate 92 is significantly displaced up and down in the thickness direction at an input of low-frequency large-amplitude vibration to come in contact with either of the facing plate portions 74a, 74b, striking noise is reduced by the buffering effect of the inward protrusion 224. In addition, since the upper and lower inward protrusions 224, 224 are each made to be a ridged protrusion extending in an annular form to surround each of the first and second window portions 78, 80, the movable plate 92 continuously comes in contact with the ridged protrusion all around the circumference so that the first and second window portions 78, 80 are shut off by the movable plate 92. Thus, according to the structure of the present embodiment, the striking-noise reduction effect and switching of the fluid flow channel 90 to a shut-off state are both effectively achieved.

The first and second window portions 78, 80 can be shut off by means of forming a buffer protrusion in an annular shape on the movable plate at each of the contact portions against the edges of the first and second window portions 78, 80 to cause the buffer protrusion to come in contact with the facing plate portions 74a, 74b to surround the edges of the first and second window portions 78, 80. In summary, it will suffice for the protrusion to be provided between the opposite surfaces of the movable member and the rubber buffer, thus the protrusion can be provided on either side of the movable member or the rubber buffer.

Figure 32:
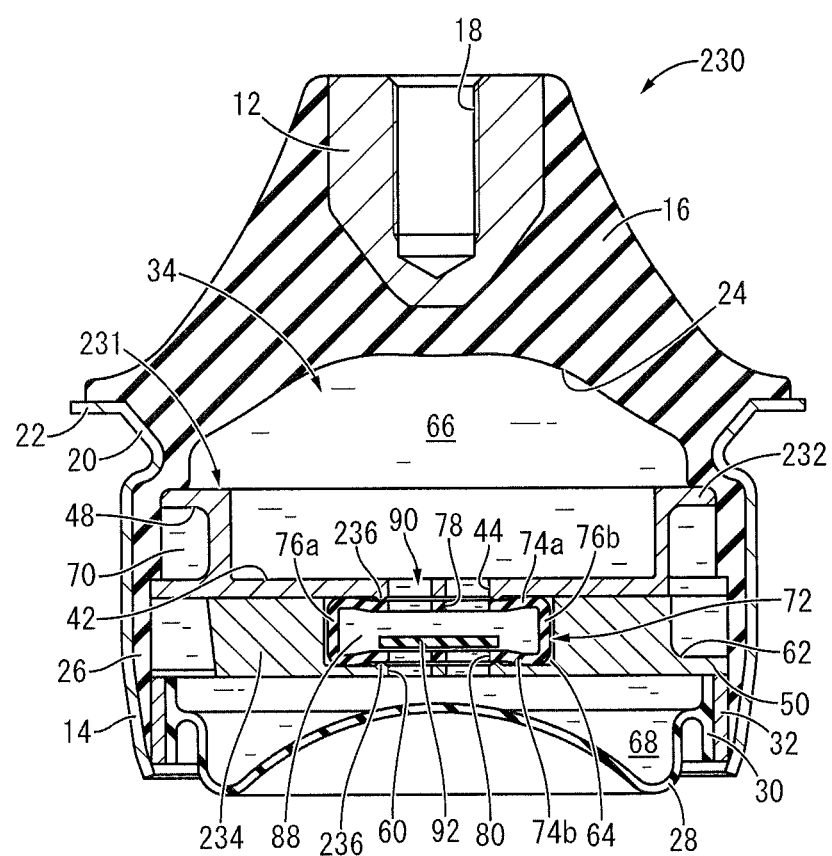
FIG. 32 is a longitudinal sectional view showing an engine mount as a thirteenth embodiment of the present invention.

FIG. 32 shows an engine mount 230 for automobiles as a thirteenth embodiment of the fluid-filled vibration damping device with the structure according to the present invention. The engine mount 230 has a structure where the rubber buffer 72 is arranged in the housing space 64 of a partition member 231.

The partition member 231 is configured by an upper partition member 232 and a lower partition member 234, wherein the upper partition member 232 has a structure where an upper convex portion 236 is provided as a concave/convex portion to surround the first communication hole 44 of the upper partition member 38 of the first embodiment. Meanwhile, the lower partition member 234 has a structure where a lower convex portion 236 arranged as a concave/ convex portion to surround the second communication hole 60 of the lower partition member 40 of the first embodiment is formed to protrude from the bottom wall of the housing concave 56.

Figure 33:
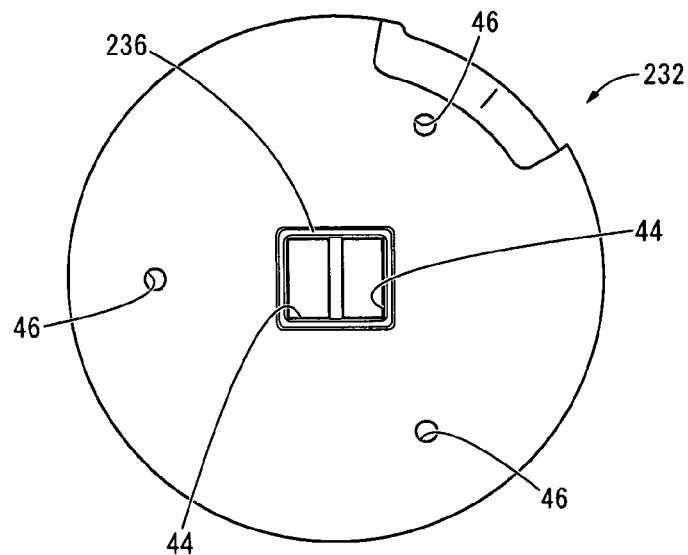
FIG. 33 is a bottom plan view of an upper partition member composing the engine mount shown in FIG. 32.
Figure 34:
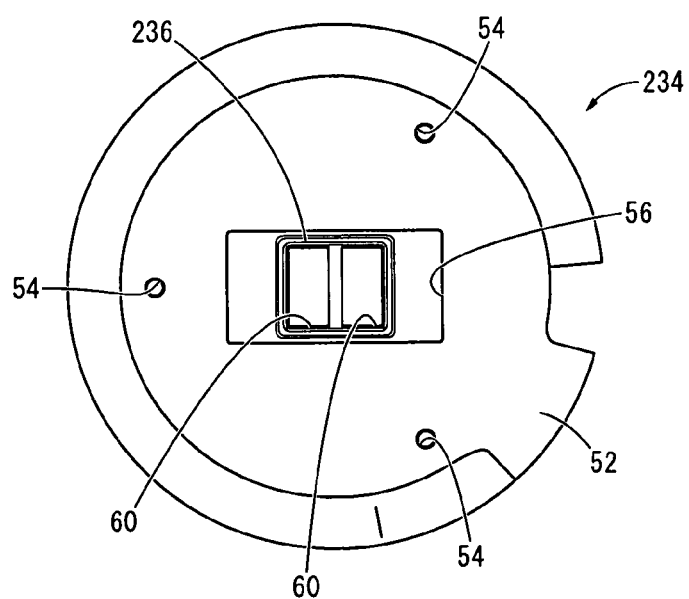
FIG. 34 is a plan view of a lower partition member composing the engine mount shown in FIG. 32.

As shown in FIGS. 33 and 34, the convex portion 236 is a ridged protrusion in an approximate shape of a rectangular annulus in the axial view and is formed in the upper and lower partition members 232, 234 where the top and bottom wall inner surfaces of the housing space 64 are configured in an arrangement up and down facing each other. Also, the upper and lower convex portions 236, 236 in an annular form are provided so as to surround the first communication holes 44, 44 and the second communication holes 60, 60, respectively.

The partition member 231 is formed by having the upper partition member 232 and the lower partition member 234 structured as described above overlapped up and down and fixed with each other. In addition, as shown in FIG. 32, the rubber buffer 72 is arranged in the housing space 64 of the partition member 231. In that situation, the rubber buffer 72 has the first and second window portions 78, 80 of the facing plate portions 74a, 74b in contact with the respective upper and lower convex portions 236, 236 along the edge of the openings with the facing plate portions 74a, 74b protruding inward in the direction of facing at the center in the long-side direction. In addition, the facing plate portions 74a, 74b are overlapped with the top and bottom wall surfaces of the housing space 64 inside the contact portion with the upper and lower convex portions 236, 236 with a gap in between, and the contact areas between the facing plate portions 74a, 74b and the top and bottom wall inner surfaces of the housing space 64 are made smaller by the formation of the convex portions 236, 236.

Then, at the input of low-frequency large-amplitude vibration, the initial contact area between the movable plate 92 and the wall inner surface of the housing space 64 via the rubber buffer 72 is made smaller by the formation of the convex portions 236, 236, thereby reducing striking noise at the time of contact. In addition, since the convex portion 236 is integrally formed with the hard partition member 231, any variation in the shape thereof is restricted, thereby enabling to form the convex portion 236 with excellent precision in size.

Figure 35:
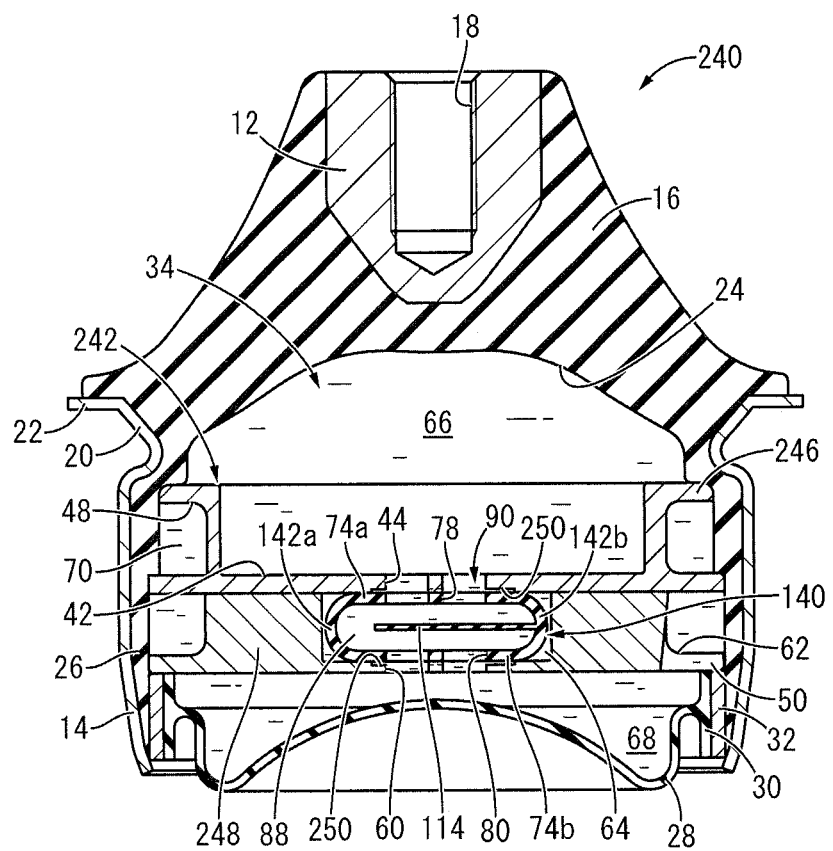
FIG. 35 is a longitudinal sectional view showing an engine mount as a fourteenth embodiment of the present invention.

FIG. 35 shows an engine mount 240 for automobiles as a fourteenth embodiment of the fluid-filled vibration damping device with the structure according to the present invention. The engine mount 240 has a structure where the rubber buffer 140 is arranged in the housing space 64 of a partition member 242.

The partition member 242 is configured to comprise an upper partition member 246 and a lower partition member 248, and the upper partition member 246, as compared to the upper partition member 38 of the first embodiment, is provided with an upper concave portion 250 as a concave/convex portion on both sides of the first communication hole 44 in the short-side direction thereof. Meanwhile, the lower partition member 248, as compared to the lower partition member 40 of the first embodiment, is provided with a lower concave portion 250 as a concave/convex portion on both sides of the second communication hole 60 in the short-side direction thereof.

Figure 36:
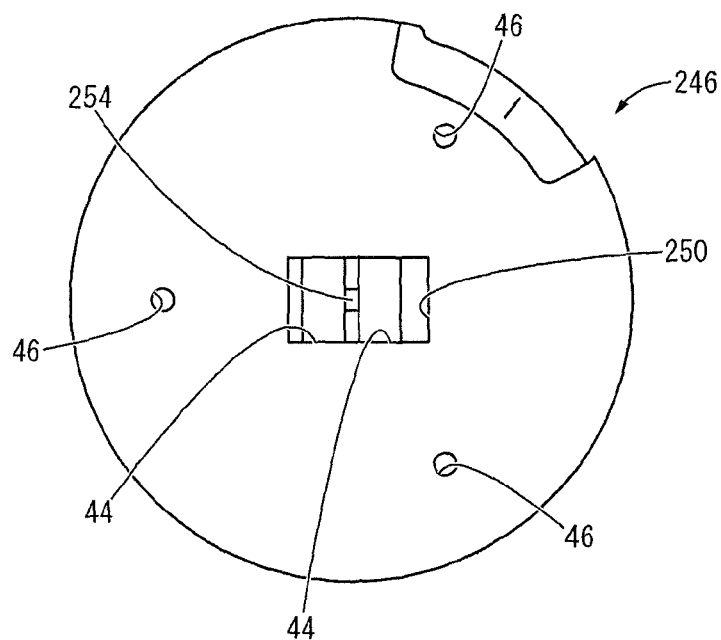
FIG. 36 is a bottom plan view of an upper partition member composing the engine mount shown in FIG. 35.

The upper concave portion 250, as shown in FIG. 36, is configured by concave portions with a stepped flat bottom each formed on the outside and inside, in the short-side direction, of the pair of first communication holes 44, 44 formed adjacent to each other in the short-side direction. In addition, between the pair of first communication holes 44, 44, an upper protrusion 254 is provided protruding downward, by which the portion located between the first communication holes 44, 44 is divided into two sections.

Figure 37:
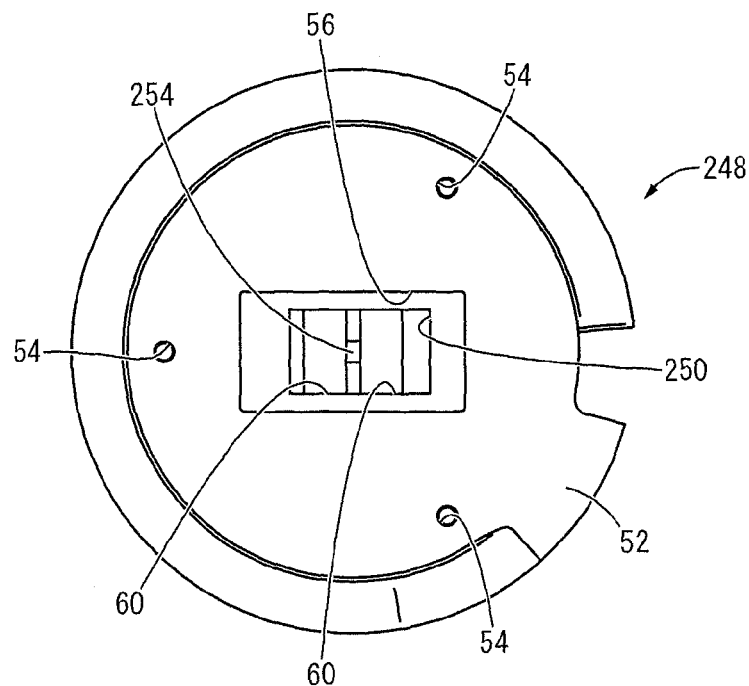
FIG. 37 is a plan view of a lower partition member composing the engine mount shown in FIG. 35.

Meanwhile, the lower concave portion 250, as shown in FIG. 37, is in almost the same shape as the upper concave portion 250, which is configured by the concave portions formed on the outside and inside of the pair of second communication holes 60, 60 in the short-side direction opening on the bottom face of the housing concave 56. In addition, between the pair of second communication holes 60, 60, a lower protrusion 254 is provided protruding upward, by which the portion located between the second communication holes 60, 60 is divided into two sections.

The partition member 242 is configured by having the upper partition member 246 and the lower partition member 248 with the structure described above overlapped and fixed with each other. Also, the rubber buffer 140 is arranged in the housing space 64 of the partition member 242 with the opening edge of the first and second window portions 78, 80 of the rubber buffer 140 overlapped with the upper and lower concave portions 250, 250. This allows the rubber buffer 140 to be arranged partially away from the top and bottom wall inner surfaces of the housing space 64 along the opening edge of the first and second window portions 78, 80, thereby reducing the contact area of the housing space 64 with the top and bottom wall inner surfaces.

Then, when the movable film 114 comes in contact with the partition member 242 via the rubber buffer 140 at an input of low-frequency large-amplitude vibration, the contact area between the rubber buffer 140 and the partition member 242 is made small by the formation of the concave portion 250, thereby reducing striking noise caused by the contact between the facing plate portions 74a, 74b and the wall inner surfaces of the housing space 64. Especially in the present embodiment, the center portion of the facing plate portions 74a, 74b are in contact with the protrusion 254 in advance so that the deformation of the facing plate portions 74a, 74b at the center is restricted where hitting against the wall inner surfaces caused by deformation can be a problem, thereby preventing generation of striking noise more effectively.

Figure 38:
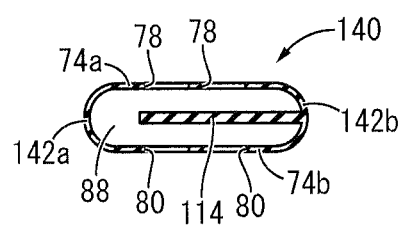
FIG. 38 is a front view of a rubber buffer composing an engine mount as another embodiment of the present invention.

In the present embodiment, the movable film 114 is made thinner than the facing plate portions 74a, 74b, and making the movable film 114 in light weight reduces the impact of contact, thereby preventing striking noise more favorably. However, as shown in FIG. 38, elastic deformation of the movable film 114 can be restricted by making the movable film 114 thicker than the facing plate portions 74a, 74b. In this way, any loss of liquid pressure at the input of low-frequency large-amplitude vibration is reduced, thereby favorably obtaining the vibration damping effect by the orifice passage 70.

Thus, in order to reduce striking noise at the time of contact between the buffer body and the partition member, it is effective to reduce the contact area between the buffer body and the partition member in the hitting direction of the movable member, but a means for reducing the contact area between the buffer body and the partition member is not limited to the formation of the concave/convex portion on the side of the partition member as shown in the thirteenth and fourteenth embodiments.

Figure 39:
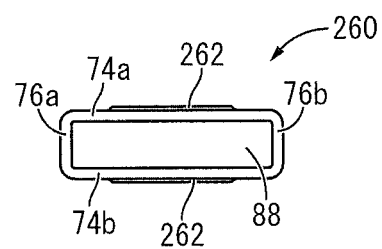
FIG. 39 is a front view of a rubber buffer composing an engine mount as still another embodiment of the present invention.
Figure 40:
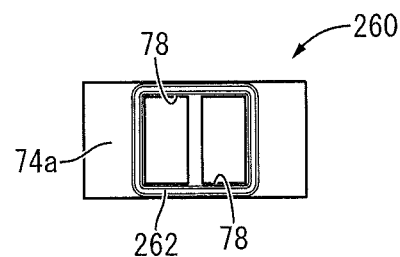
FIG. 40 is a plan view of the rubber buffer shown in FIG. 39.

More specifically, as is the case with a rubber buffer 260 as a buffer body shown in FIGS. 39 and 40, for example, the contact area between the buffer body and the partition member can be made smaller by means of forming an upper protrusion 262 on the facing plate portion 74a while forming a lower protrusion 262 on the facing plate portion 74b.

Describing in more detail, the protrusion 262 is a ridged protrusion continuously extending in an approximate shape of a rectangular annulus formed to protrude from each outer face of the facing plate portions 74a, 74b and arranged to surround the openings of the first and second window portions 78, 80 on the side of connections with the first and second communication holes 44, 66. In addition, the protrusion 262 of the present embodiment is with a cross-section in an approximate shape of a semicircle which reduces its width toward the tip of the protrusion.

The rubber buffer 260 with the structure described above is arranged in the housing space 64 of the partition member 36 with the facing plate portions 74a, 74b overlapped with the top and bottom wall inner surfaces of the housing space 64. In that situation, the upper and lower protrusions 262, 262 are pressed against the opening edges of the first and second communication holes 44, 60 on the top and bottom wall inner surfaces of the housing space 64 of the partition member 36. And the first and second communication holes 44, 60 and the first and second window portions 78, 80 are communicated with each other along the inner periphery of the upper and lower protrusions 262, 262 while being arranged away from each other in the axial direction. Any portion outside the upper and lower protrusions 262, 262 on the facing plate portions 74a, 74b is facing the wall inner surface of the housing space 64 with a gap in between.

According to this configuration, even if the rubber buffer 260 is hit against the top and bottom wall inner surfaces of the housing space 64 of the partition member 36 by deformation or displacement, the striking noise is reduced since the initial contact area between the rubber buffer 260 and the partition member 36 is made smaller by the protrusion 262. Moreover, in an arranged state of the rubber buffer 260, the protrusion 262 is made in an annular form continuously in contact with the partition member 36 all around the circumference, any increase in the leak of fluid is prevented at the contact portion between the first and second communication holes 44, 60 and the first and second window portions 78, 80 by the formation of the protrusions 262, 262, thereby effectively triggering the fluid flow via the fluid flow channel 90.

Figure 41:
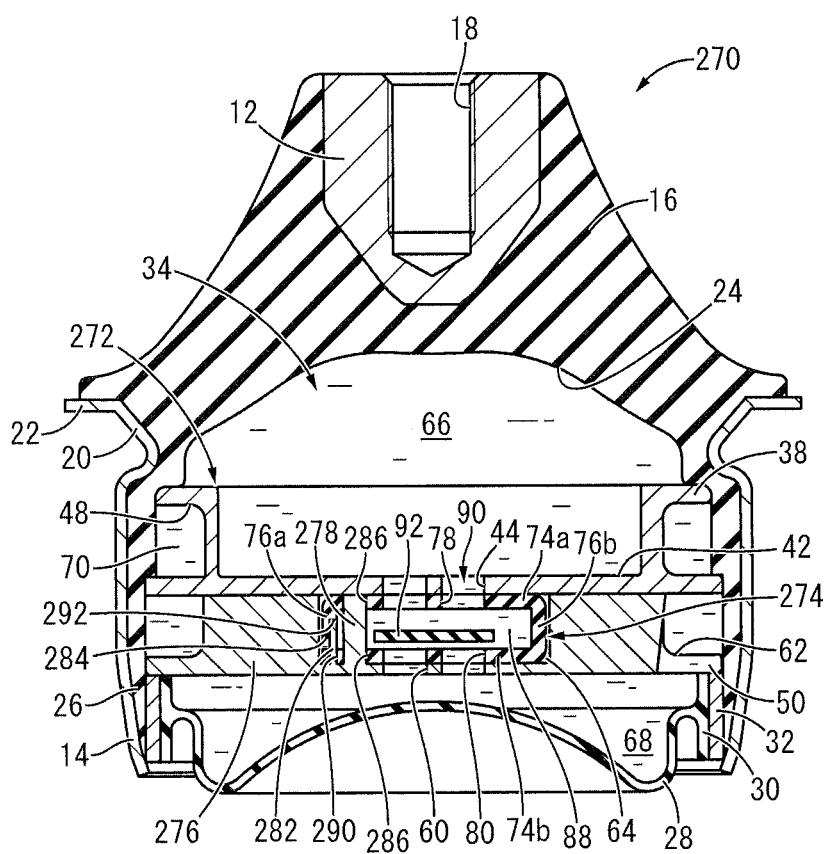
FIG. 41 is a longitudinal sectional view showing an engine mount as a fifteenth embodiment of the present invention.

FIG. 41 shows an engine mount 270 for automobiles as a fifteenth embodiment of the fluid-filled vibration damping device with the structure according to the present invention. The engine mount 270 has a structure where a rubber buffer 274 is arranged as a buffer body in the housing space 64 of a partition member 272.

Figure 42:
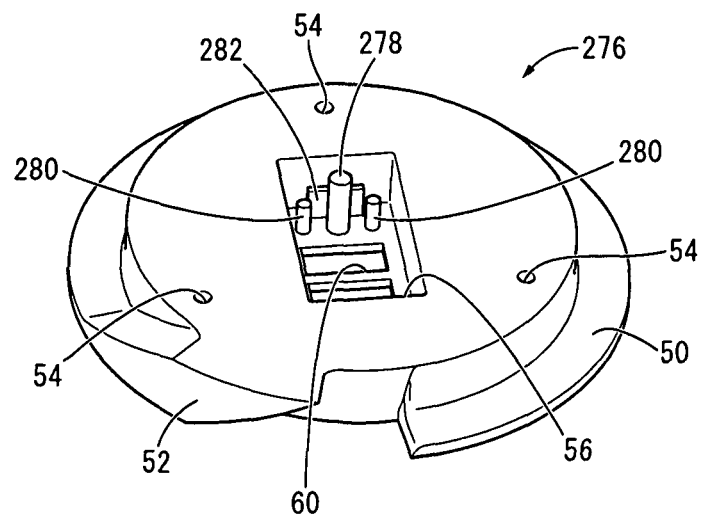
FIG. 42 is a perspective view of a lower partition member composing the engine mount shown in FIG. 41.
Figure 43:
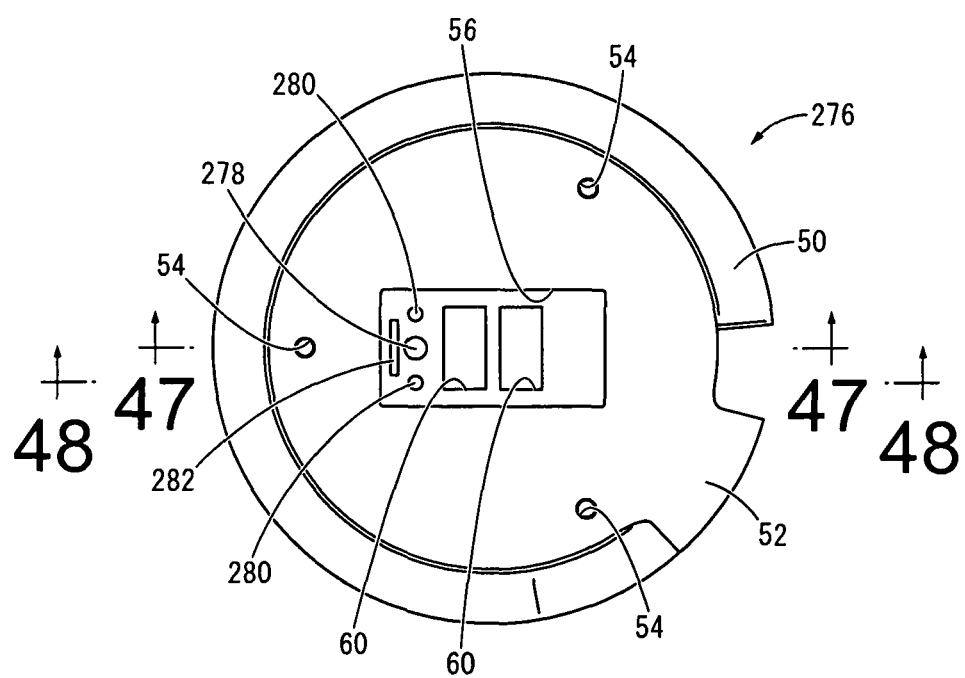
FIG. 43 is a plan view of the lower partition member shown in FIG. 42.

The partition member 272 is configured to comprise the upper partition member 38 and a lower partition member 276. The lower partition member 276 is provided with the housing concave 56 where a first insertion pin 278 as a locking protrusion, second insertion pins 280, 280 as locking protrusions arranged on both sides of the first insertion pin 278, and a protruded support piece 282 as a locking protrusion arranged adjacent to the insertion pins 278, 280, 280 are all provided to protrude upward from the bottom wall, as shown in FIGS. 42 and 43. The first insertion pin 278 is in an approximate shape of a cylinder protruding from about the center in the short-side direction near the end portion in the long-side direction of the housing concave 56. The second insertion pins 280 are in an approximate shape of a cylinder smaller in diameter and shorter in length than the first insertion pin 278 and are provided on both sides in the short-side direction of the housing concave 56 each away from the first insertion pin 278 at a given distance. The protruded support piece 282 is in an approximate shape of a rectangular flat plate and arranged on the outside of the first and second insertion pins 278, 280, 280 in the long-side direction of the housing concave 56.

Figure 44:
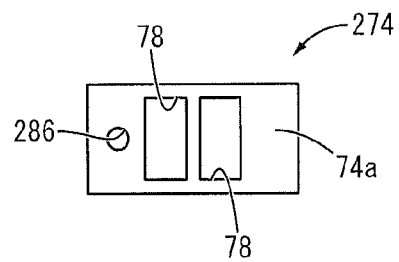
FIG. 44 is a plan view of a rubber buffer composing the engine mount shown in FIG. 41.
Figure 45:
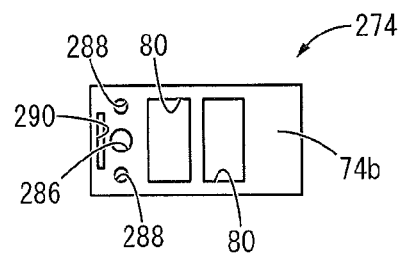
FIG. 45 is a bottom plan view of the rubber buffer shown in FIG. 44.
Figure 46:
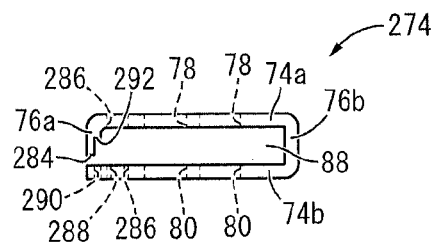
FIG. 46 is a front view of the rubber buffer shown in FIG. 44.

The partition member 272 provided with the housing space 64 is configured by having the upper partition member 38 and the lower partition member 276 with the structures described above overlapped and fixed with each other. Also, the rubber buffer 274 is arranged in the housing space 64. The rubber buffer 274, as shown in FIGS. 44 to 46, is made to be a hollow band-like cylindrical body as a whole, while the connection between the side plate portion 76a and the facing plate portion 74b is severed to form a severed portion 284. Also, a first insertion hole 286 as a circular locking hole is formed penetrating through the facing plate portion 74a in the thickness direction, whereas a second insertion hole 288 is formed, in addition to the first insertion hole 286, as a small-diameter locking hole on both sides in the short-side direction, while a third insertion hole 290 is formed as an elongated rectangular locking hole on the outside in the long-side direction. In summary, the first insertion hole 286 is formed on each of the facing plate portions 74a and 74b, while the second insertion holes 288, 288 and the third insertion hole 290 are formed only on the facing plate portion 74b. In addition, at the basal end of the side plate portion 76a, a latching concave 292 is formed at the center in the short-side direction opening toward the bottom end and the inner space 88.

Figure 47:
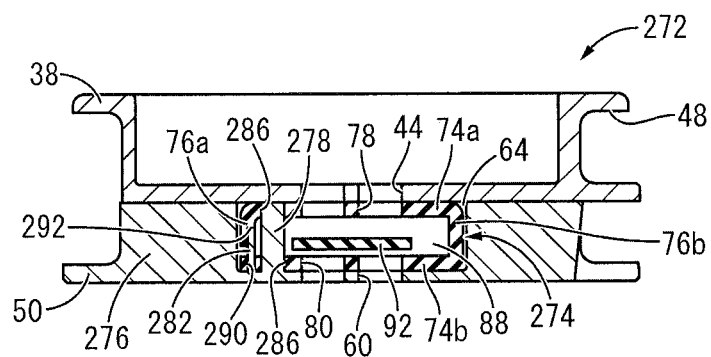
FIG. 47 is a longitudinal sectional view of a partition member composing the engine mount shown in FIG. 41, taken along line 47-47 of FIG. 43.
Figure 48:
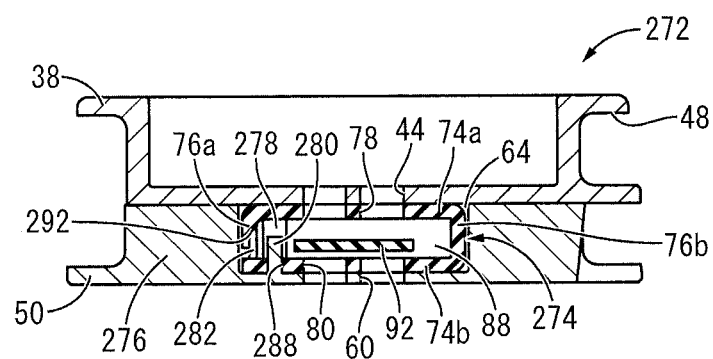
FIG. 48 is a longitudinal sectional view of a partition member composing the engine mount shown in FIG. 41, taken along line 48-48 of FIG. 43.

Then, the rubber buffer 274, as shown in FIGS. 47, 48, is arranged in the housing space 64 of the partition member 272. In that situation, the rubber buffer 274 has the first insertion pin 278 inserted into the first insertion hole 286 formed on the facing plate portions 74a, 74b as well as the second insertion pins 280, 280 inserted into the second insertion holes 288, 288 formed on the facing plate portion 74b. In addition, the protruded support piece 282 is inserted into the third insertion hole 290 formed on the facing plate portion 74b, and the tip of the protruded support piece 282 is fitted into the latching concave 292 of the side plate portion 76b. By these arrangements, the rubber buffer 274 is positioned against the partition member 272, while the facing plate portion 74a and the side plate portion 76a of the rubber buffer 274 are supported by the protruded support piece 282 to make the facing plate portion 74a come in contact with the wall inner surface of the housing space 64 on the side of the pressure-receiving chamber 66.

Moreover, since the second and third insertion holes 288, 288, 290 are formed only on the facing plate portion 74b, the rubber buffer 274 cannot be inadvertently placed in the housing space 64 in a wrong direction, thereby making it easier to arrange the rubber buffer 274 in the housing space 64 in the right direction. In the present embodiment, the first positioning member is constituted by the three sets including the first insertion pin 278 and the first insertion hole 286, the second insertion pins 280 and the second insertion holes 288, as well as the protruded support piece 282 and the third insertion hole 290. Especially, the second insertion pins 280 and the second insertion holes 288 as well as the protruded support piece 282 and the third insertion hole 290 identify the upper and lower portions of the rubber buffer 274 within the housing space 64.

Thus, the buffer body can be divided in the middle as long as it is made in a hollow form as a whole when arranged in the housing space, or the band-like cylindrical body can be divided on part of the circumference to form a gap at the severed portion 284, as is the case with the rubber buffer 274 of the present embodiment.

The first positioning member does not necessarily require the first insertion pin 278 and the first insertion hole 286, the second insertion pin 280, 280 and the second insertion holes 288, 288, the protruded support piece 282, and the third insertion hole 290, but one or more of these can be adopted, or even another positioning means can be provided. Also, as a means for identifying the upper and lower portions of the rubber buffer 274, either insertion of the second insertion pins 280, 280 into the second insertion holes 288, 288 or insertion of the protruded support piece 282 into the third insertion hole 290 alone can be adopted, or another identifying means in lieu of or in addition to these means can be provided.

Figure 49:
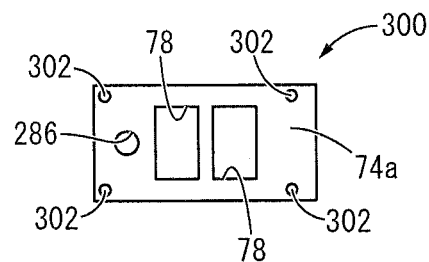
FIG. 49 is a plan view of a rubber buffer composing an engine mount as another embodiment of the present invention.
Figure 50:
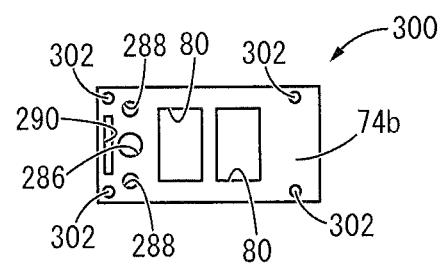
FIG. 50 is a bottom plan view of the rubber buffer shown in FIG. 49.
Figure 51:
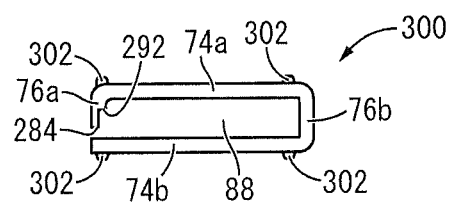
FIG. 51 is a front view of the rubber buffer shown in FIG. 49.

Or otherwise, upper and lower protrusions 302, 302 can be formed at four corners of the facing plate portions 74a, 74b as shown in FIGS. 49 to 51 as rubber buffers 300. The specific shape of these protrusions 302 is not particularly limited, but for example, shapes such as those that protrude with an approximately circular cross-section of small diameter, which gradually reduces its diameter toward the tip end of the protrusion, is favorably adopted. According to the structure with such upper and lower protrusions 302, 302, the initial contact area at the time of contact of the facing plate portions 74a, 74b against the partition member 36 is made smaller, thereby reducing striking noise.

Figure 52:
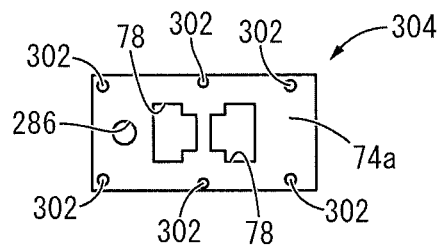
FIG. 52 is a plan view of a buffer rubber composing an engine mount as still another embodiment of the present invention.
Figure 53:
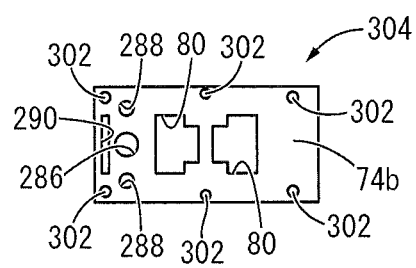
FIG. 53 is a bottom plan view of the rubber buffer shown in FIG. 52.
Figure 54:
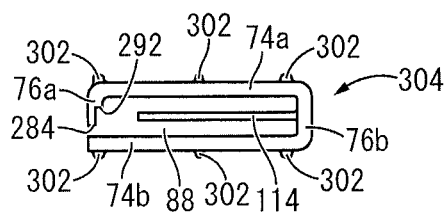
FIG. 54 is a front view of the rubber buffer shown in FIG. 52.

Similarly, upper and lower protrusions 302, 302 can be formed at four corners and at the center in the long-side direction of the facing plate portions 74a, 74b as shown in FIGS. 52 to 54 as rubber buffers 304. By forming these six each of these upper and lower protrusions, the free length of each of the facing plate portions 74a, 74b in the long-side direction is made smaller, thereby effectively preventing generation of ponding noise caused by the hitting of the partition member 36. The first and second window portions 78, 80 of the rubber buffer 304 has a pore cross-section in the shape of stepped projection made narrower on the inside than the outside in the long-side direction of the facing plate portions 74a, 74b. Evident from the above, the pore cross-section shape of the first and second window portions is not particularly limited.

Figure 55:
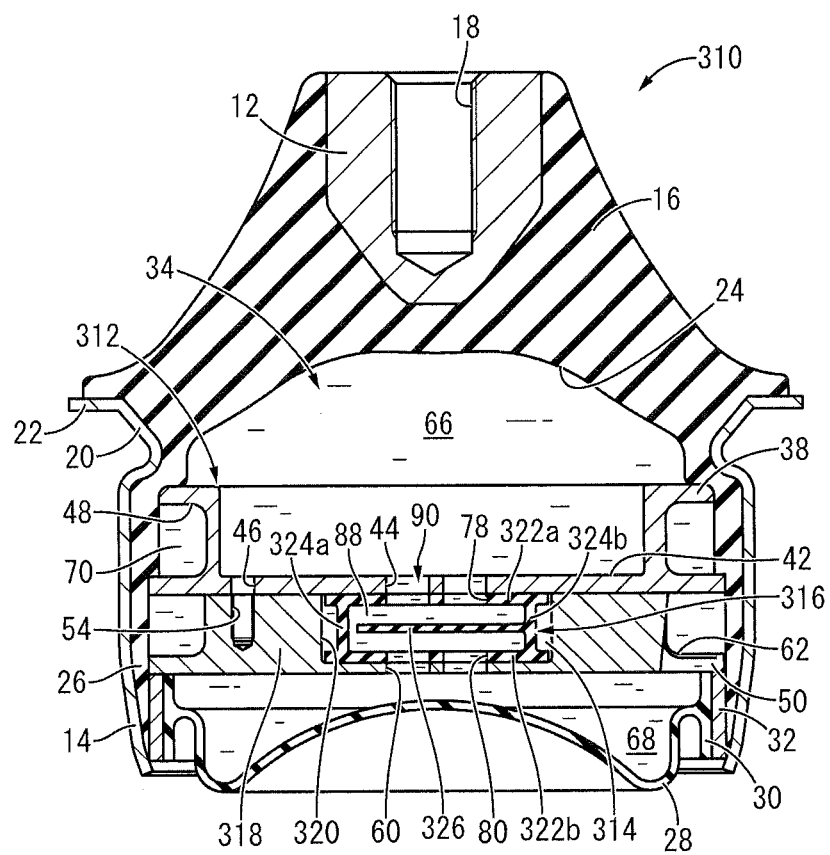
FIG. 55 is a longitudinal sectional view showing an engine mount as a sixteenth embodiment of the present invention, taken along line 55-55 of FIG. 57.
Figure 56:
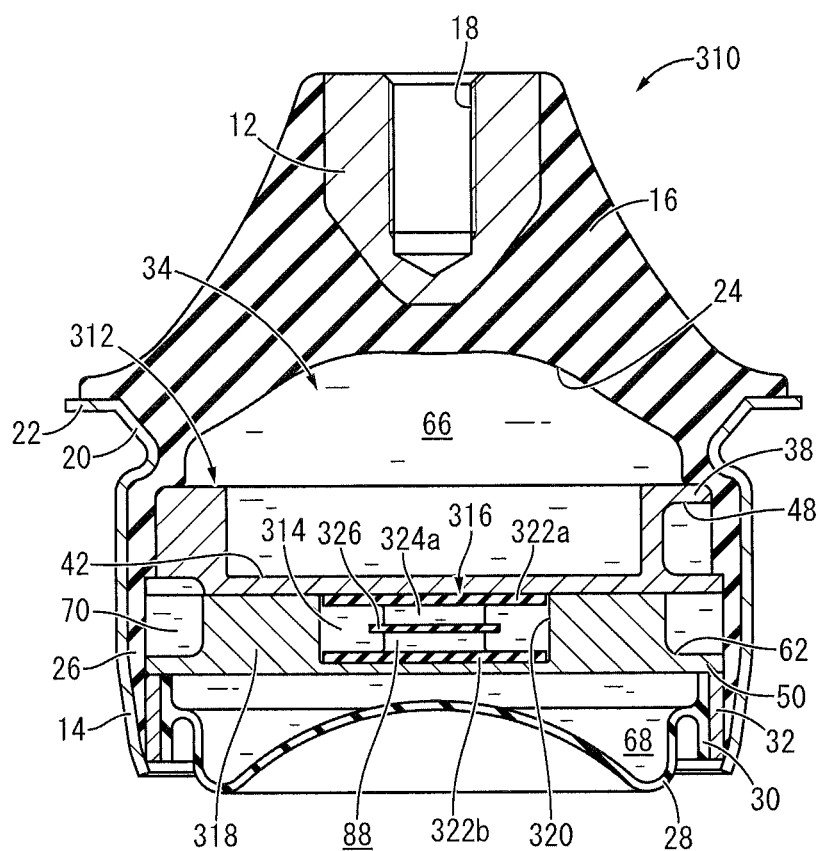
FIG. 56 is a longitudinal sectional view of the engine mount shown in FIG. 55, taken along line 56-56 of FIG. 57.

FIGS. 55, 56 show an engine mount 310 for automobiles as a sixteenth embodiment of the fluid-filled vibration damping device with the structure according to the present invention. The engine mount 310 has a structure where a rubber buffer 316 is arranged as a buffer body in a housing space 314 of a partition member 312.

Figure 57:
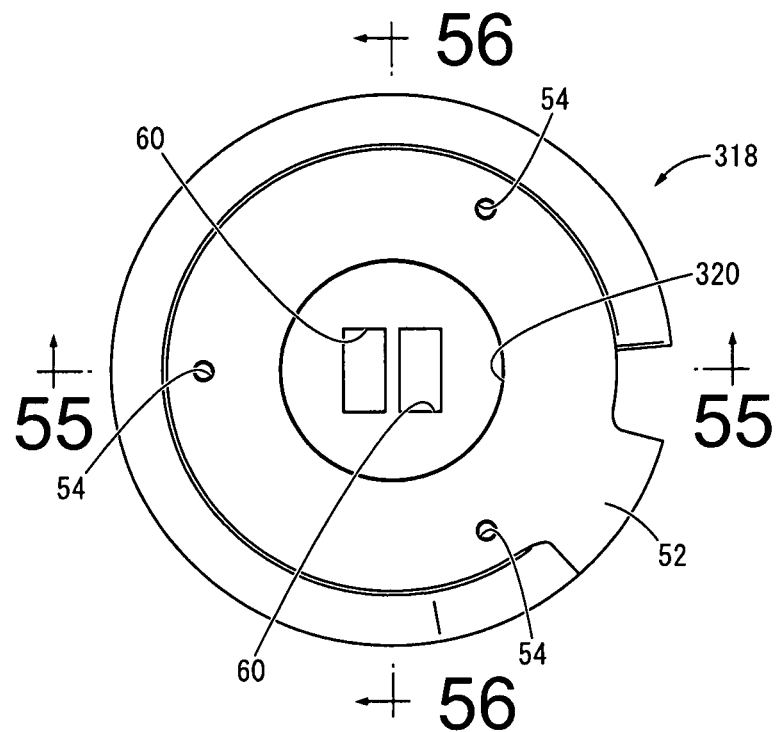
FIG. 57 is a plan view of a lower partition member composing the engine mount shown in FIG. 55.

The partition member 312 is configured to comprise the upper partition member 38 and a lower partition member 318. The lower partition member 318 is in an approximate shape of a thick circular disc where a housing concave 320 is formed at the center in the radial direction. The housing concave 320, as shown in FIG. 57, is a concavity in an approximately circular shape in the axial view opening on the top face of the lower partition member 318 where the pair of communication holes 60, 60 are formed through the bottom wall portion thereof.

The lower partition member 318 with the structure described above is overlapped from above with the upper partition member 38 to constitute the partition member 312. In addition, the housing space 314 is formed by covering the opening of the housing concave 320 formed in the lower partition member 318 by the upper partition member 38.

Figure 58:
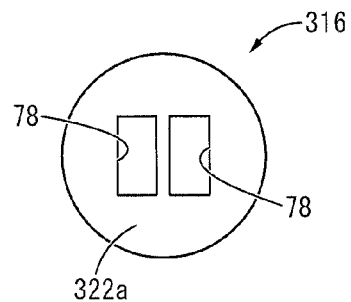
FIG. 58 is a plan view of a rubber buffer composing the engine mount shown in FIG. 55.
Figure 59:
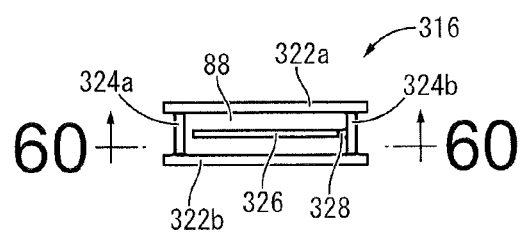
FIG. 59 is a front view of the rubber buffer shown in FIG. 58.
Figure 60:
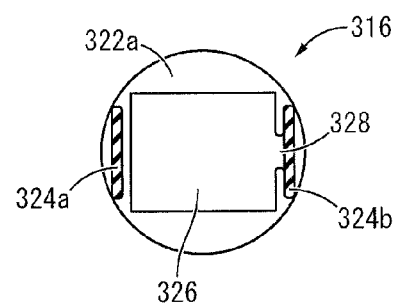
FIG. 60 is a cross-sectional view taken along line 60-60 of FIG. 59.

Also, the rubber buffer 316 is arranged in the housing space 314. The rubber buffer 316, as shown in FIGS. 58 to 60, has a structure where a pair of facing plate portions 322a, 322b in an approximate shape of a circular disc are connected to each other by a pair of side plate portions 324a, 324b, which are made in a hollow form as a whole to form the inner space 88. The pair of window portions 78, 78 are formed in the facing plate portion 322a, while the pair of window portions 80, 80 are formed in the facing plate portion 322b.

In addition, a movable plate 326 is arranged as a movable member in the inner space 88 of the rubber buffer 316. The movable plate 326 is in an approximate shape of a rectangular flat plate connected to the rubber buffer 316 and elastically supported by a connected base portion 328 integrally formed with the side plate portion 324b. The connected base portion 328 is made narrower than the movable plate 326 constituting a portion with a lower spring constant that is more deformable than the movable plate 326. The connected base portion can be made more deformable than the movable plate by being made thin or formed with a different material and the like.

Then, the elastic deformation of the connected base portion 328 allows the movable plate 326 to be displaced in the up-down direction, thereby effectively achieving the liquid pressure absorption effect due to a slight displacement exerted at an input of a mid- or high-frequency small-amplitude vibration or the shut-off of the fluid flow channel 90 at an input of low-frequency large-amplitude vibration.

Even in the engine mount 310 with the structure according to the present embodiment, the effect of reducing striking noise is achieved as effectively as in the engine mount shown in each of the previous embodiments. Also, as evident from the shape of the rubber buffer 316, the buffer body is not particularly limited to the band-like cylindrical body, but can be acceptable as long as it is made in a hollow form as a whole provided with an inner space.

Figure 61:
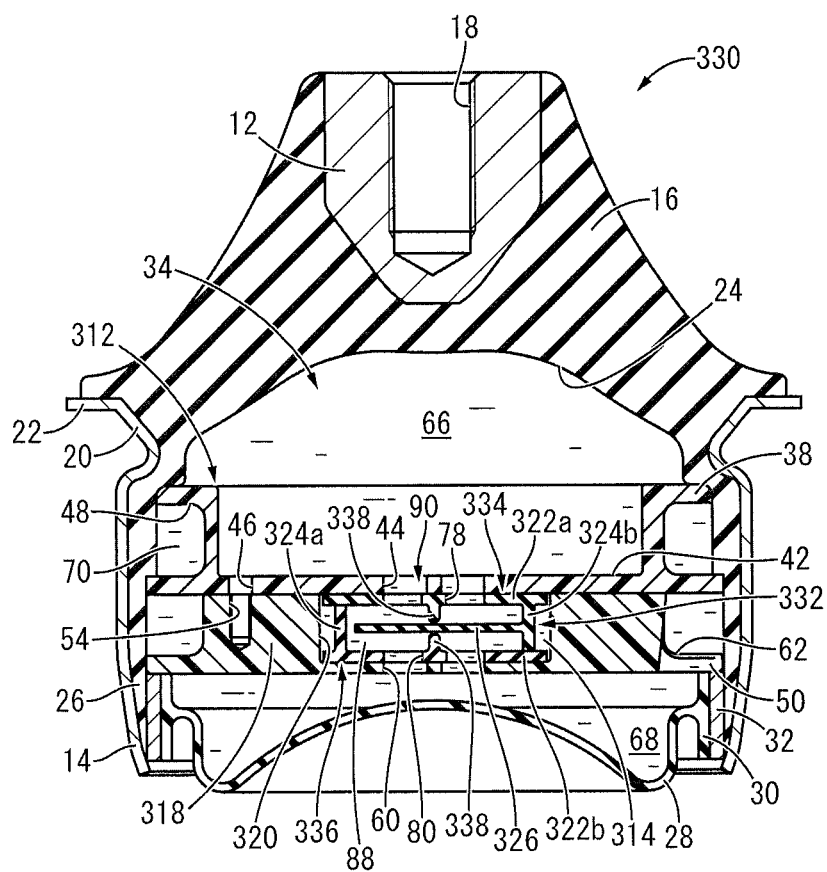
FIG. 61 is a longitudinal sectional view showing an engine mount as a seventeenth embodiment of the present invention.

FIG. 61 shows an engine mount 330 for automobiles as a seventeenth embodiment of the fluid-filled vibration damping device with the structure according to the present invention. The engine mount 330 has a structure where a rubber buffer 332 is arranged as a buffer body in the housing space 314 of the partition member 312.

Describing in more detail, the rubber buffer 332 is configured by combining a first buffer body 334 and a second buffer body 336 formed separately from each other. The first buffer body 334 is provided integrally with the facing plate portion 322a, side plate portion 324b and movable plate 326, while being provided with an upper inward protrusion 338 as a buffer protrusion that protrudes downward from the center of the facing plate portion 322a. Meanwhile, the second buffer body 336 is provided integrally with the facing plate portion 322b and side plate portion 324a, while being provided with a lower inward protrusion 338 as a buffer protrusion that protrudes upward from the center of the facing plate portion 322b. The upper and lower inward protrusions 338, 338 are provided at a location corresponding to each other, while being arranged up and down at a given distance from each other. Also, the tip end of the inward protrusion 338 has chamfered corners to make it in an approximate crown shape tapered down toward the tip.

Then, the first and second buffer bodies 334, 336 are arranged in the housing space 314 of the partition member 312 under a condition where the bottom face of the side plate portion 324b of the first buffer body 334 comes in contact with the upper face of the facing plate portion 322b of the second buffer body 336, while the top face of the side plate portion 324a of the second buffer body 336 comes in contact with the bottom face of the facing plate portion 322a of the first buffer body 334. This allows the rubber buffer 332 in a hollow form to be configured by the first and second buffer bodies 334, 336 to form the inner space 88 surrounded by the facing plate portions 322a, 322b and the side plate portions 324a, 324b.

Furthermore, the height dimension of the upper and lower inward protrusions 338, 338 is made relatively large in the rubber buffer 332 so that the end surfaces of the upper and lower inward protrusions 338, 338 are facing the movable plate 326 with a small gap in between or in contact with it. This causes displacement of the movable plate 326 to be more restricted, thereby preventing striking noise more effectively.

Even in the engine mount 330 with the structure described above, generation of striking noise caused by the contact of movable plate 326 is effectively prevented based on the internal friction of the rubber buffer 332 or the like. Evident from the above, the buffer body in a hollow form is not necessarily limited to the one integrally formed as a whole, but it can be formed by a combination of multiple buffer bodies independent from each other.

Also, in case of providing a buffer protrusion between the buffer body and the movable member, the gap between the tip of the buffer protrusion and the buffer body or the movable member is not particularly limited, but it can be at a given distance or even no gap from the beginning.

Figure 62:
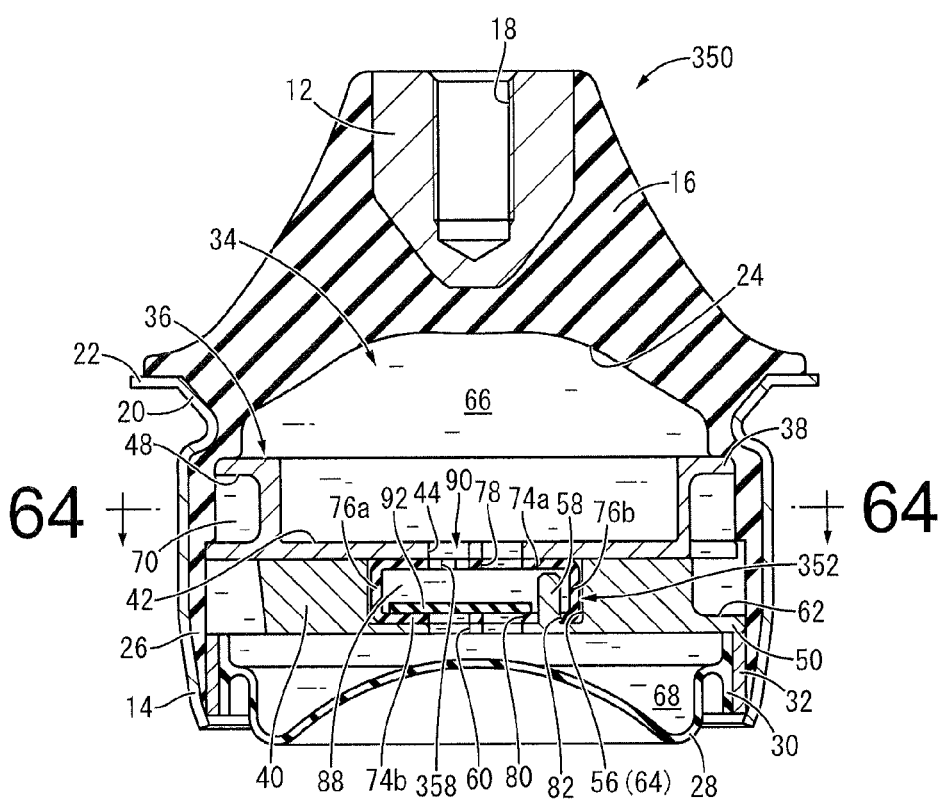
FIG. 62 is a longitudinal sectional view showing an engine mount as an eighteenth embodiment of the present invention, taken along line 62-62 of FIG. 64.
Figure 63:
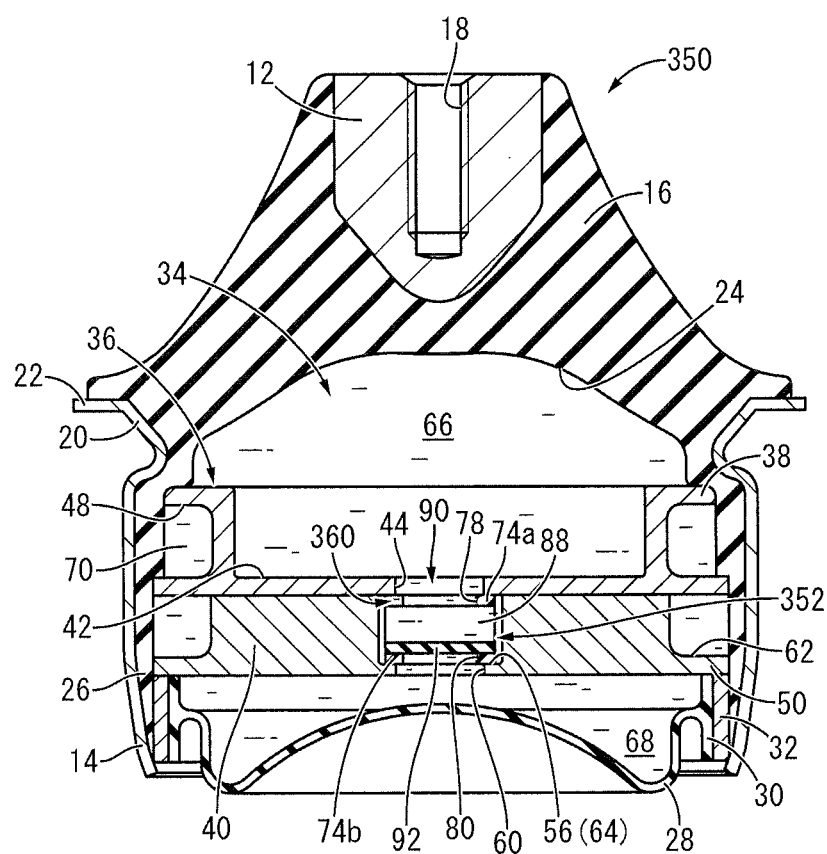
FIG. 63 is another longitudinal sectional view of the engine mount shown in FIG. 62, taken along line 63-63 of FIG. 64.
Figure 64:
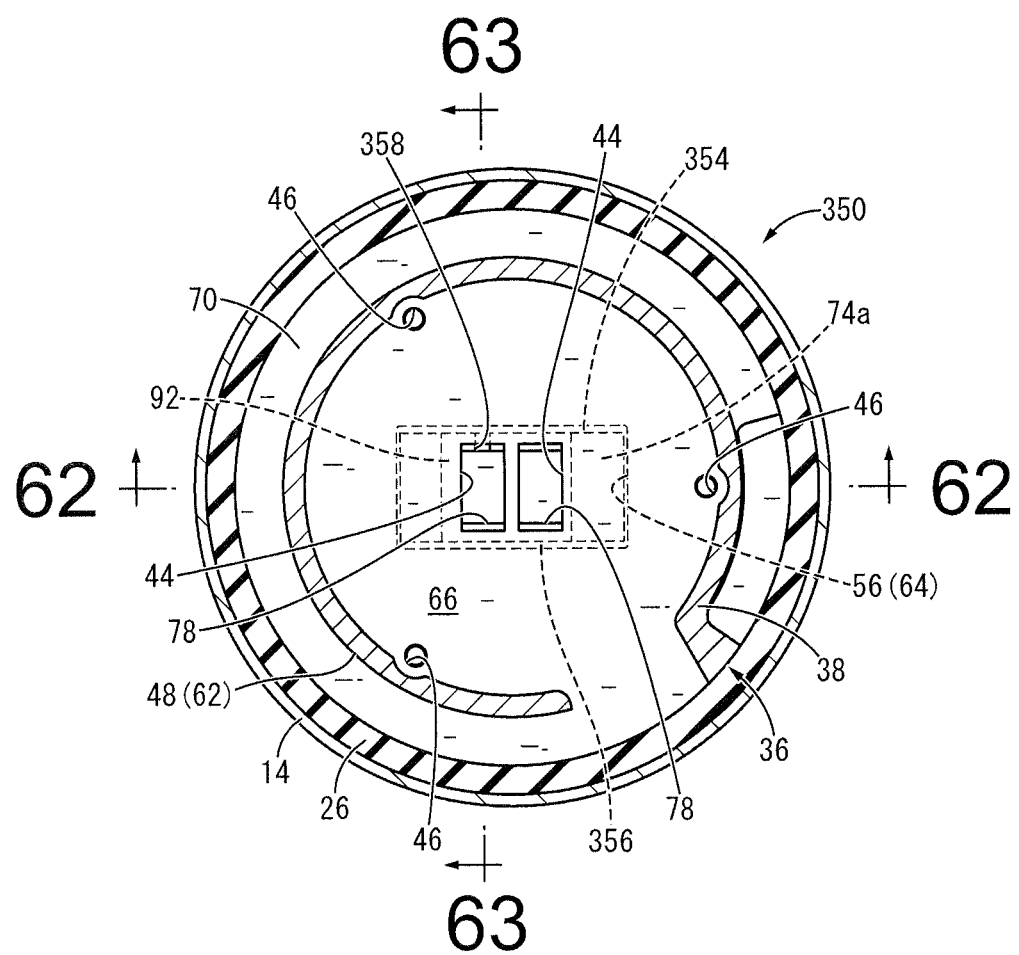
FIG. 64 is a cross-sectional view taken along line 64-64 of FIG. 62.

FIGS. 62 to 64 show an engine mount 350 for automobiles as an eighteenth embodiment of the fluid-filled vibration damping device with the structure according to the present invention. The engine mount 350 has a structure where a rubber buffer 352 is arranged as a buffer body in the housing space 64 of the partition member 36. In the partition member 36 of the present embodiment, the insertion pin 58 is provided only on one side.

The rubber buffer 352, as shown in FIGS. 65 to 68, is made to be a band-like cylindrical body provided integrally with the pair of facing plate portions 74*a*, 74*b* and the pair of side plate portions 76*a*, 76*b*, and the insertion hole 82 is formed in a shape corresponding to the insertion pin 58 around one end of the facing plate portion 74*b* in the long-side direction. Also, the movable plate 92 is housed in the inner space 88 of the rubber buffer 352 to be overlapped with the first and second window portions 78, 80 in the axial projection.

Then, the rubber buffer 352 and the movable plate 92 are arranged in the housing space 64 of the partition member 36. Also, by having the insertion pin 58 inserted into the insertion hole 82, the rubber buffer 352 is positioned against the partition member 36, while the rubber buffer 352 is prevented from being arranged upside down in the housing space 64, thereby constituting a regulating member of the present embodiment. In the present embodiment, the insertion pin 58 can be easily inserted into the insertion hole 82 by means of chamfering the edge of the protrusion tip of the insertion pin 58.

Also, the rubber buffer 352 is arranged relative to the peripheral wall inner surface of the housing space 64 at a given distance, and a gap 354 is formed continuously all the way around between the rubber buffer 352 and the peripheral wall inner surface of the housing space 64. In addition, the movable plate 92 is formed in a size equal to or smaller than that of the short-side length of the facing plate portions 74*a*, 74*b* in the short-side direction thereof, and a gap 356 is formed between the movable plate 92 and the peripheral wall inner surface of the housing space 64.

Figure 65:
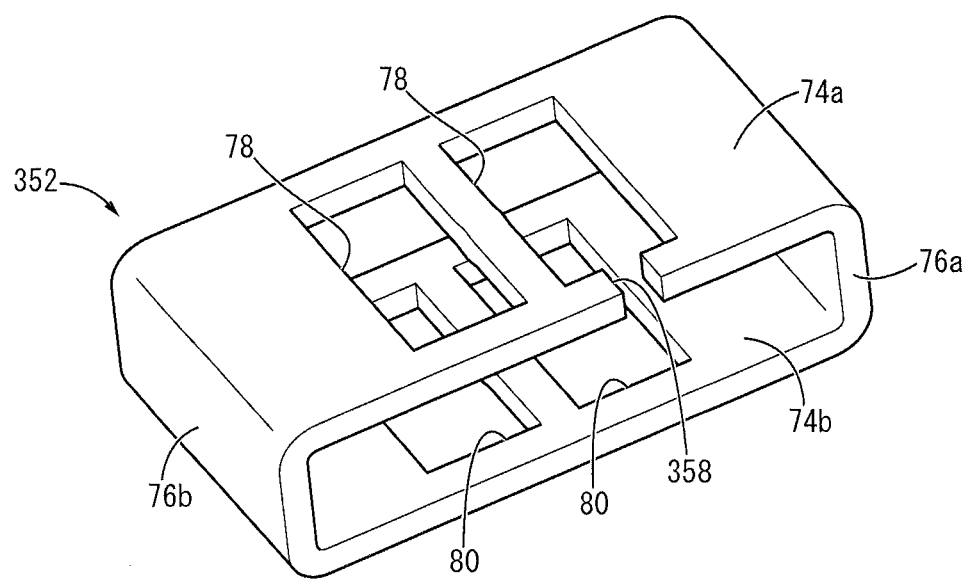
FIG. 65 is a perspective view of a rubber buffer composing the engine mount shown in FIG. 62.
Figure 66:
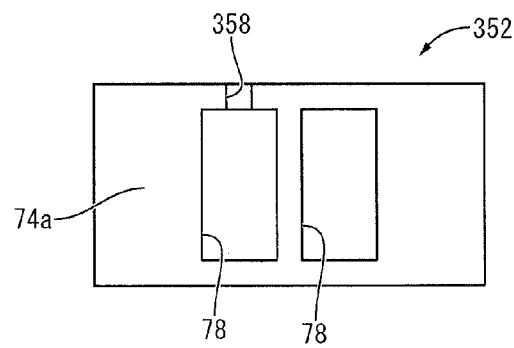
FIG. 66 is a plan view of the rubber buffer shown in FIG. 65.
Figure 67:
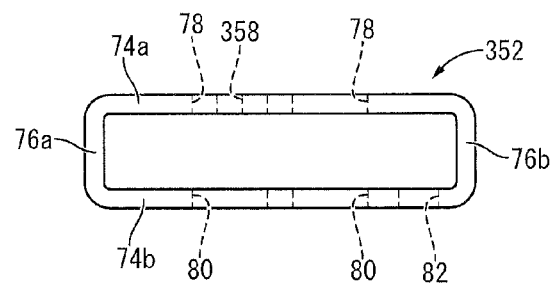
FIG. 67 is a front view of the rubber buffer shown in FIG. 65.
Figure 68:
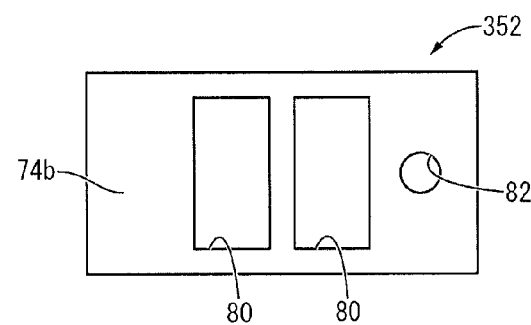
FIG. 68 is a bottom plan view of the rubber buffer shown in FIG. 65.

Also, in the engine mount 350 of the present embodiment, a communication passage 358 is formed in the rubber buffer 352. The communication passage 358, as shown in FIGS. 65, 66, is formed in the facing plate portion 74*a* of the rubber buffer 352 extending from the opening edge of the first window portion 78 in the short-side direction of the facing plate portion 74*a* (near perpendicular to the axial direction and the direction of facing of the pair of side plate portions 76*a*, 76*b*) to make a cut-out form where the frame of the first window portion 78 is partially cut. As evident from the description above, the communication passage 358 has its one end communicated with the first window portion 78, while the other end thereof opens on one of the end surfaces of the facing plate portion 74*a* in the short-side direction.

The rubber buffer 352 with the communication passage 358 described above, as shown in FIGS. 62, 63, has the facing plate portion 74*a* arranged in a state of overlap with the wall inner surface of the housing space 64 on the side of the pressure-receiving chamber 66. Then, in an arranged state of the rubber buffer 352 in the housing space 64, the communication passage 358, as shown in FIG. 63, has one end communicated with the first communication hole 44 directly or via the first window portion 78, while the other end is communicated with the housing space 64 (gap 354). This allows a first leak passage 360 to be formed for connecting the pressure-receiving chamber 66 and the housing space 64 to each other containing the communication passage 358, first window portion 78, and first communication hole 44. Since the rubber buffer 352 can be arranged in the housing space 64 in a given direction by the regulating member described above, the communication passage 358 is made to be positioned on the side of the pressure-receiving chamber 66.

Figure 69:
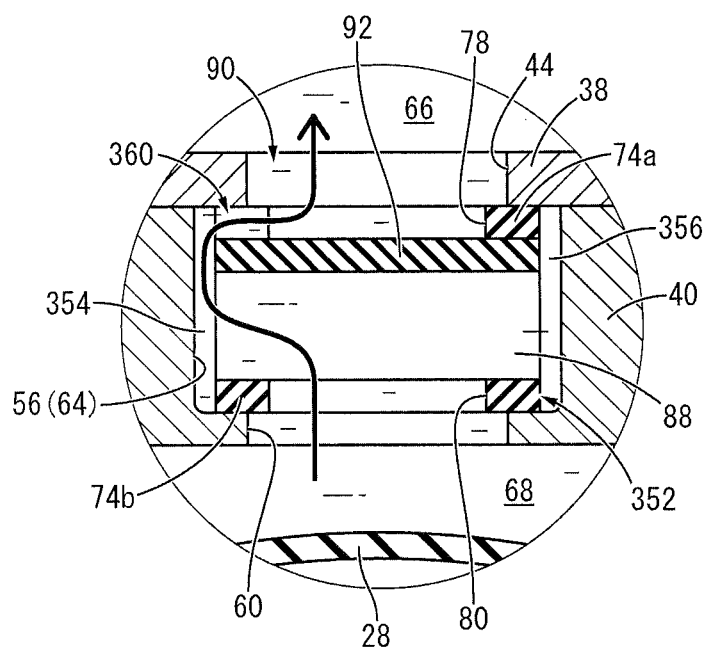
FIG. 69 is a longitudinal sectional view showing an enlarged key portion of the engine mount shown in FIG. 62 indicating a state of a pressure-receiving chamber under excessive negative pressure.

The first leak passage 360 maintains the pressure-receiving chamber 66 and the housing space 64 always communicated with each other. In other words, as shown in FIG. 69, even under a condition where the movable plate 92 is positioned at the upper end in the inner space 88 to come in contact with the facing plate portion 74*a*, the gap 356 between the movable plate 92 and the peripheral wall inner surface of the housing space 64 maintains the first leak passage 360 in a state of communication. Also, the second window portion 80 is opened up by having the movable plate 92 separated away from the facing plate portion 74*b* to cause the housing space 64 to be communicated with the equilibrium chamber 68 via the second window portion 80 and the second communication hole 60. This allows the liquid pressure within the pressure-receiving chamber 66 to drop down relative to the liquid pressure within the equilibrium chamber 68 to move the movable plate 92 away from the facing plate portion 74*b* so that the pressure-receiving chamber 66 and the equilibrium chamber 68 are communicated with each other using the first leak passage 360.

Meanwhile, when a vehicle overrides a step and the like to cause an input of a large impact load between the first mounting member 12 and the second mounting member 14 to significantly reduce the liquid pressure within the pressure-receiving chamber 66, the first window portion 78 is shut off by the movable plate 92, as shown in FIG. 69, by having the movable plate 92 displaced to the top end position within the inner space 88. In that situation, the communication passage 358 is provided in the rubber buffer 352, and the housing space 64 is communicated with the pressure-receiving chamber 66 via the first leak passage 360 by having the housing space 64, the first window portion 78 and the first communication hole 44 communicated with each other by the communication passage 358.

Furthermore, by locating the movable plate 92 at the top end position to be separated away from the facing plate portion 74*b*, the equilibrium chamber 68 is communicated with the housing space 64 via the second window portion 80 and the second communication hole 60. This allows the pressure-receiving chamber 66 and the equilibrium chamber 68 to be communicated with each other via the first leak passage 360 to let the fluid flow from the equilibrium chamber 68 toward the pressure-receiving chamber 66 as shown by an arrow in FIG. 69. As a result, the pressure drop in the pressure-receiving chamber 66 is reduced or eliminated as quickly as possible, thereby preventing generation of abnormal noise caused by cavitation.

In addition, in the engine mount 350 of the present embodiment, the pressure-receiving chamber 66 and the equilibrium chamber 68 are communicated with each other by forming the first leak passage 360 using the first communication hole 44 of the partition member 36. Therefore, there is no special need for forming a hole to connect the pressure-receiving chamber 66 and the equilibrium chamber 68 to the partition member 36 in short circuit, thus making it easier to form the engine mount 350 equipped with a short-circuit mechanism.

Also, if the pressure within the pressure-receiving chamber 66 drops down, the pressure-receiving chamber 66 and the equilibrium chamber 68 are connected to each other in short circuit via the first leak passage 360 and the second window portion 80, whereas, if the pressure within the pressure-receiving chamber 66 rises up, the movable plate 92 shuts down the second window portion 80 so that the short circuit between the pressure-receiving chamber 66 and the equilibrium chamber 68 is prevented. Therefore, under positive pressure within the pressure-receiving chamber 66 where cavitation is unlikely to be a problem, pressure fluctuations within the pressure-receiving chamber 66 are effectively caused to efficiently obtain the vibration damping effect based on the fluid flow action through the orifice passage 70.

Also, the gap 354 is provided between the rubber buffer 352 and the peripheral wall inner surface of the housing space 64, and the end portion of the communication passage 358 is communicated with the gap 354. This allows the communication passage 358 to be communicated with the inner space 88 by the gap 354 even if the gap 356 is eliminated by the movable plate 92 shifting to the side of the formation of the communication passage 358 in the short-side direction (left side in FIG. 69). Therefore, the first leak passage 360 is maintained in a state of communication regardless of the position of the movable plate 92, thereby obtaining the desired effect of reducing cavitation noise in a stable manner.

Moreover, the rubber buffer is made to be a band-like cylindrical body opening up in the short-side direction, while the communication passage 358 opens on the end surface of the facing plate portion 74a in the short-side direction. This allows the communication passage 358 to be communicated with the inner space 88 in a short distance, thereby generating a smooth flow of fluid. Therefore, the negative pressure within the pressure-receiving chamber 66 is reduced or eliminated promptly to effectively exert the desired effect of reducing abnormal noise.

Also, because of the formation of the insertion hole 82 only on the facing plate portion 74b of the rubber buffer 352, the direction of the rubber buffer 352 in the housing space 64 is specified by inserting the insertion pin 58 that protrudes from the bottom wall of the housing space 64 into the insertion hole 82, thereby positioning the communication passage 358 on the side of the pressure-receiving chamber 66. This constitutes the regulation means for preventing the rubber buffer 352 from being arranged in a wrong direction so that the rubber buffer 352 is easily arranged in a desired aspect of positioning the communication passage 358 on the side of the pressure-receiving chamber 66. In addition, since the regulation means is configured as described above in the present embodiment by using the insertion pin 58 and the insertion hole 82 that position the rubber buffer 352 within the housing space 64, the regulation means can be provided by a simple structure.

Figure 70:
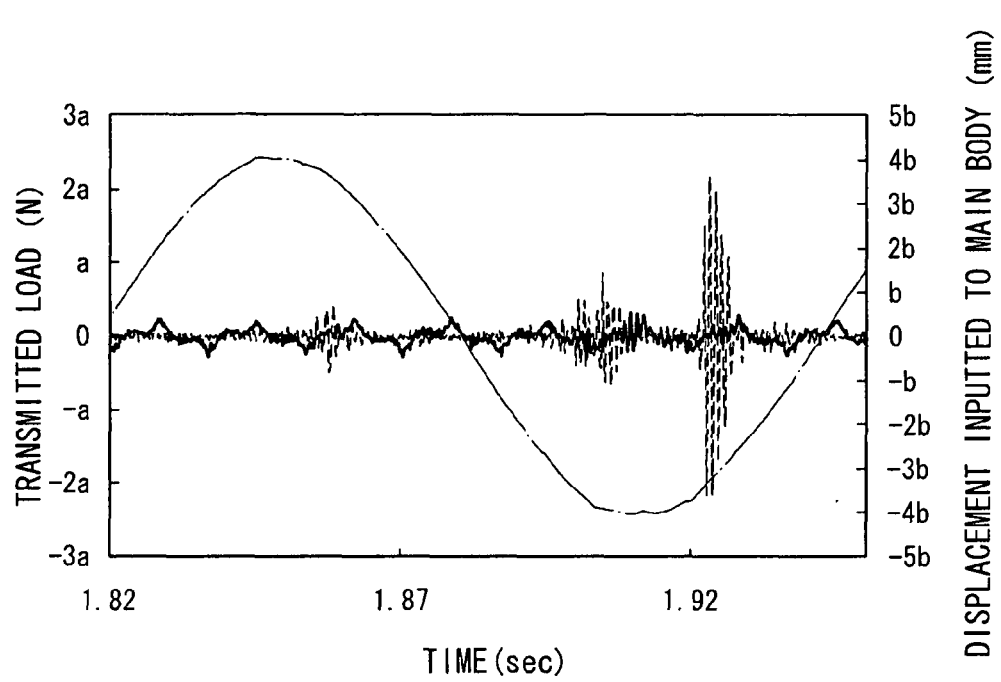
FIG. 70 is a graph showing measurement results of transfer loads exerted on the second mounting member.

Meanwhile, it is obvious from the graph of measurement results shown in FIG. 70 that the load transmitted to the second mounting member 14 is reduced in the engine mount 350 related to the present embodiment (Example) as compared to the engine mount without the communication passage 358 (Comparative Example). In FIG. 70, measurement results of the Example are shown in a solid line whereas measurement results of the Comparative Example are shown in a dashed line. In addition, FIG. 70 shows displacement inputted to the main body (relative displacement of the first mounting member 12 and the second mounting member 14 getting closer to each other) by a dashed dotted line. Also, the engine mount of the Comparative Example has the same structure as that of the Example, except that the communication passage 358 is not formed in the rubber buffer 352 in the former case.

According to FIG. 70, the Comparative Example shows that a large load is transmitted to the second mounting member 14 when the first mounting member 12 and the second mounting member 14 undergo a large relative displacement in the direction of moving away from each other and the pressure within the pressure-receiving chamber 66 drops down substantially. On the contrary, in the Example, the load transmitted to the second mounting member 14 is kept small even if the first mounting member 12 and the second mounting member 14 are displaced substantially to get closer to each other. The load transmitted to the second mounting member 14 is caused by the shock waves during the collapse of cavitation bubbles, and according to measurement results of the Example, the cavitation noise is reduced as compared to the Comparative Example.

Figure 71:
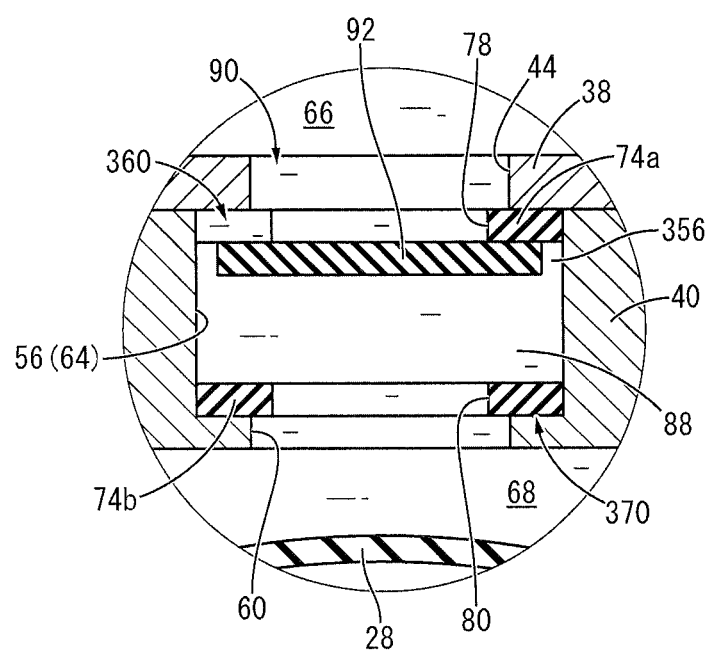
FIG. 71 is a longitudinal sectional view showing an enlarged key portion of an engine mount as a nineteenth embodiment of the present invention.

FIG. 71 shows an engine mount as a nineteenth embodiment of the fluid-filled vibration damping device related to the present invention in a longitudinal section showing an enlarged key portion. The engine mount of the present embodiment has a rubber buffer 370 arranged as a buffer body in the housing space 64 of the partition member 36. The rubber buffer 370 has approximately the same shape as the rubber buffer 352 of the eighteenth embodiment while being made larger than the rubber buffer 352 in the short-side direction. This allows the rubber buffer 370 to come in contact with the peripheral wall inner surface of the housing space 64 in the short-side direction, and the gap 354 is not provided in the present embodiment, which was formed between the rubber buffer 352 and the peripheral wall inner surface of the housing space 64 in the eighteenth embodiment.

Meanwhile, the movable plate 92 is formed in approximately the same shape and size as the eighteenth embodiment and made smaller than the rubber buffer 370 in the short-side direction. This allows the gap 356 to be formed between the outer periphery of the movable plate 92 and the peripheral wall inner surface of the housing space 64.

Even in the engine mount of the present embodiment described above, the first leak passage 360 is formed using the communication passage 358, first window portion 78 and first communication hole 44 to be communicated with the housing space 64 (inner space 88) through the gap 356. Then, under a condition where the liquid pressure within the pressure-receiving chamber 66 drops down to bring the movable plate 92 to come in contact with the facing plate portion 74b, the pressure-receiving chamber 66 and the equilibrium chamber 68 are communicated with each other by the first leak passage 360 so that the negative pressure within the pressure-receiving chamber 66 is quickly eliminated to prevent generation of abnormal noise caused by cavitation. Thus, in the present invention, formation of a gap between the buffer body and the peripheral wall inner surface of the housing space is not essential but the buffer body can rather be arranged in contact with the peripheral wall inner surface of the housing space.

Figure 72:
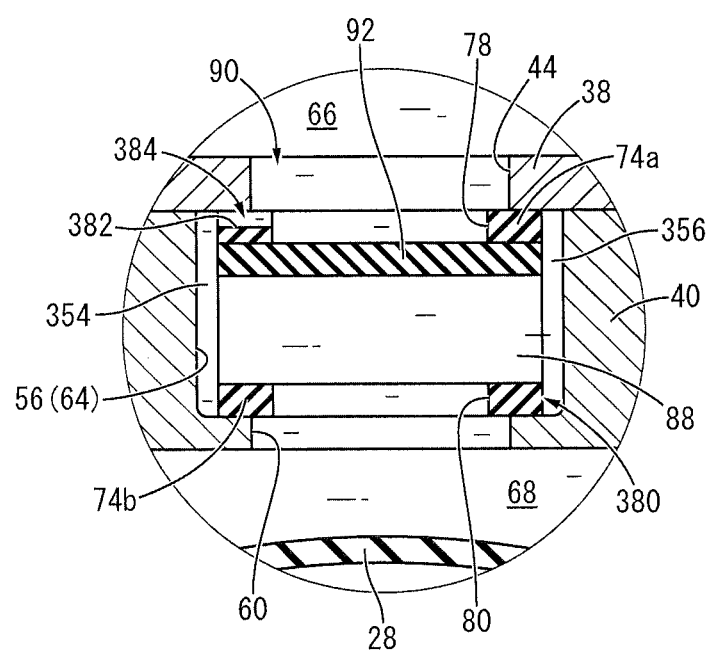
FIG. 72 is a longitudinal sectional view showing an enlarged key portion of an engine mount as a twentieth embodiment of the present invention.

FIG. 72 shows the engine mount as a twentieth embodiment of the fluid-filled vibration damping device related to the present invention as a longitudinal section of an enlarged key portion. In this engine mount, a rubber buffer 380 is housed as a buffer body within the housing space 64 of the partition member 36.

Figure 73:
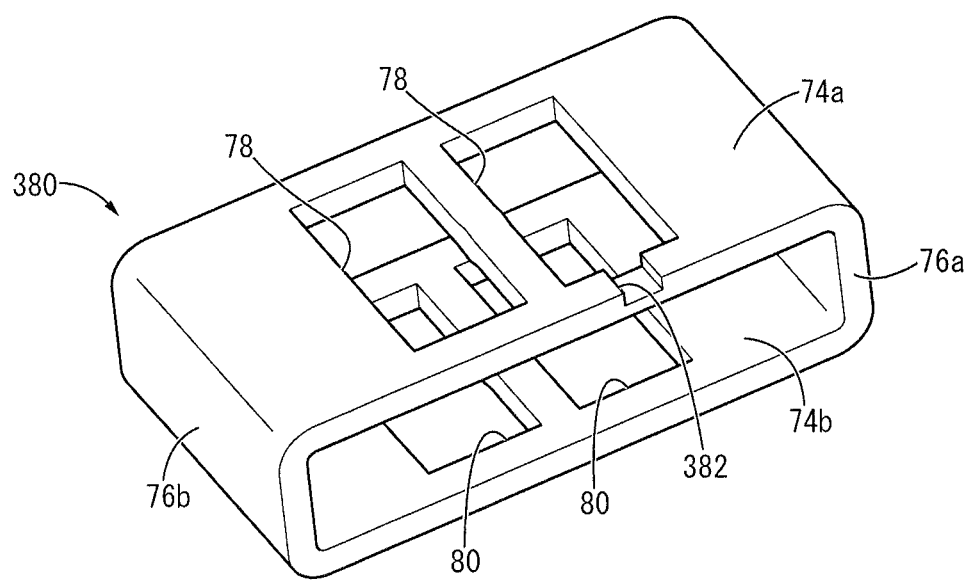
FIG. 73 is a perspective view of a rubber buffer composing the engine mount shown in FIG. 72.

The rubber buffer 380, as shown in FIG. 73, is provided with the pair of facing plate portions 74a, 74b and the pair of side plate portions 76a, 76b where the pair of first window portions 78, 78 are formed on the facing plate portion 74a, while the pair of second window portions 80, 80 are formed on the facing plate portion 74b.

Also, a communication passage 382 is formed in the rubber buffer 380. The communication passage 382 is formed at the frame of the first window portion 78 in a shape of a concave groove opening on the top face of the facing plate portion 74a and extending in the short-side direction, one end of which is communicated with the first window portion 78, while the other end opens on the outer periphery of the facing plate portion 74a.

Then, the rubber buffer 380 is arranged in the housing space 64 where the facing plate portion 74a comes in contact in a non-adhesive way with the wall inner surface of the housing space 64 on the side of the pressure-receiving chamber 66, while the facing plate portion 74b comes in contact in a non-adhesive way with the wall inner surface of the housing space 64 on the side of the equilibrium chamber 68. Also, the communication passage 382 is covered in part at the upper opening by the upper partition member 38 to make a tunnel-like channel, maintaining the first window portion 78 and the gap 354 always communicated with each other.

This allows the liquid pressure within the pressure-receiving chamber 66 to drop down substantially at an input of a large impact load to displace the movable plate 92 to the side of the pressure-receiving chamber 66 so that the first window portion 78 is shut off by the movable plate 92, while the pressure-receiving chamber 66 and the equilibrium chamber 68 are communicated with each other via a first leak passage 384 including the communication passage 382 once the second window portion 80 is released to a state of communication. As a result, the pressure drop within the pressure-receiving chamber 66 is alleviated to prevent generation of abnormal noise caused by cavitation.

Thus, the communication passage formed in the buffer body is not necessarily limited to the communication passage 358 in a cut-out form where the frame of the first window portion 78 is cut as shown in the eighteenth and nineteenth embodiments, but also the communication passage 382 in a groove form as shown in the present embodiment can be adopted. In case of adopting the communication passage in a groove form, the groove can be provided to open on the top face of the facing plate portion 74a, or can be provided to open on the bottom face of the facing plate portion 74a to be communicated with the inner space 88 via the gap 354.

Figure 74:
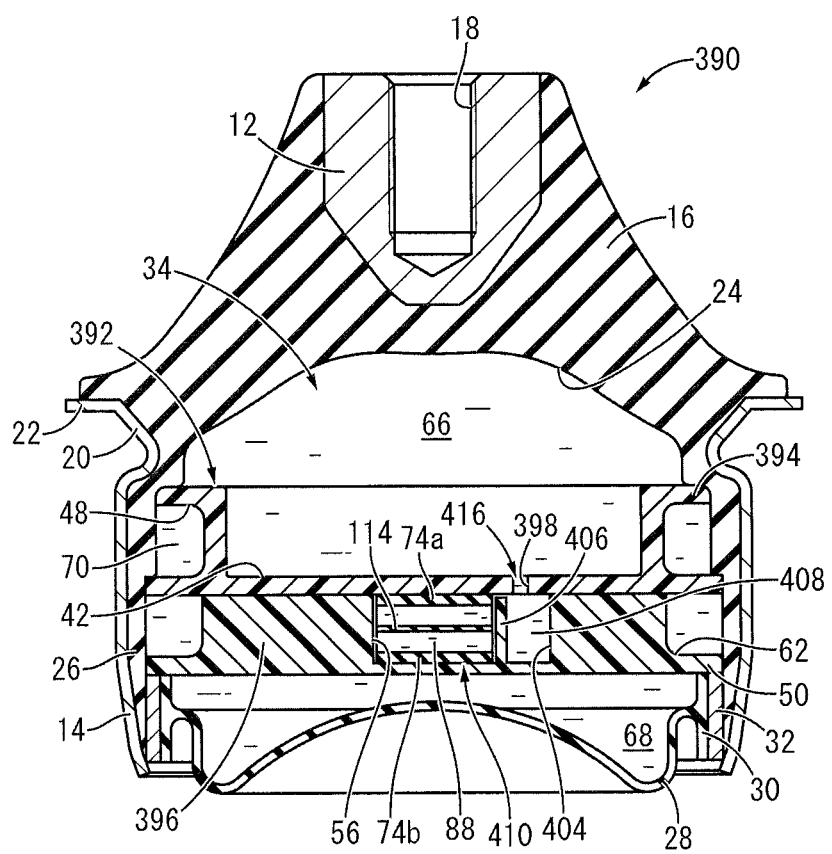
FIG. 74 is a longitudinal sectional view showing an engine mount as a twenty-first embodiment of the present invention, taken along line 74-74 of FIG. 76.
Figure 75:
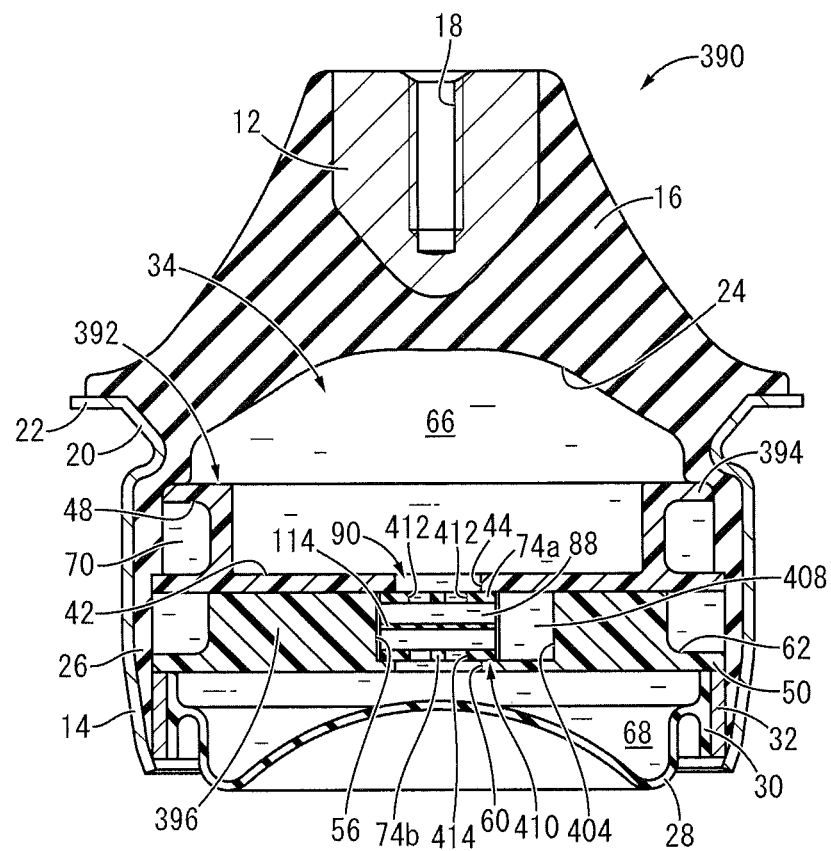
FIG. 75 is another longitudinal sectional view of the engine mount shown in FIG. 74, taken along line 75-75 of FIG. 76.

FIGS. 74 and 75 show an engine mount 390 for automobiles as a twenty-first embodiment of the fluid-filled vibration damping device with the structure according to the present invention. The engine mount 390 is provided with a partition member 392.

Figure 76:
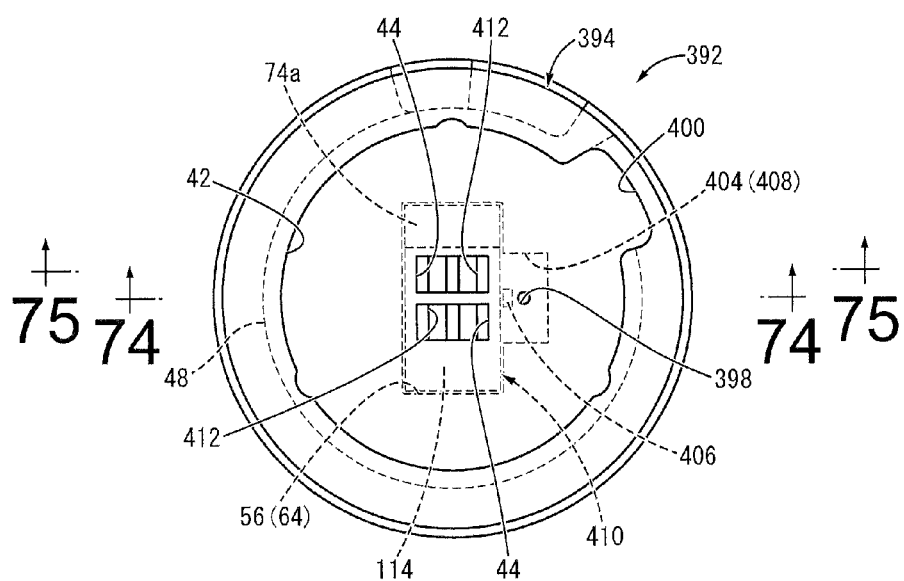
FIG. 76 is a plan view of a partition member composing the engine mount shown in FIG. 74.

Describing in more detail, the partition member 392 is configured to comprise an upper partition member 394 and a lower partition member 396. The upper partition member 394, as shown in FIGS. 74 to 76, is a member in an approximate form of a circular disc formed with metal or hard synthetic resin with a leak hole 398 formed on the bottom wall portion of the central concave 42. The leak hole 398, a small circular hole with an opening area smaller than that of the first communication hole 44, penetrates through the bottom wall portion of the central concave 42 at a location off the first communication hole 44. The leak hole 398 of the present embodiment is formed closer to an upper communication opening 400 (opening of the orifice passage 70 on the side of the pressure-receiving chamber 66) than the first communication hole 44.

Figure 77:
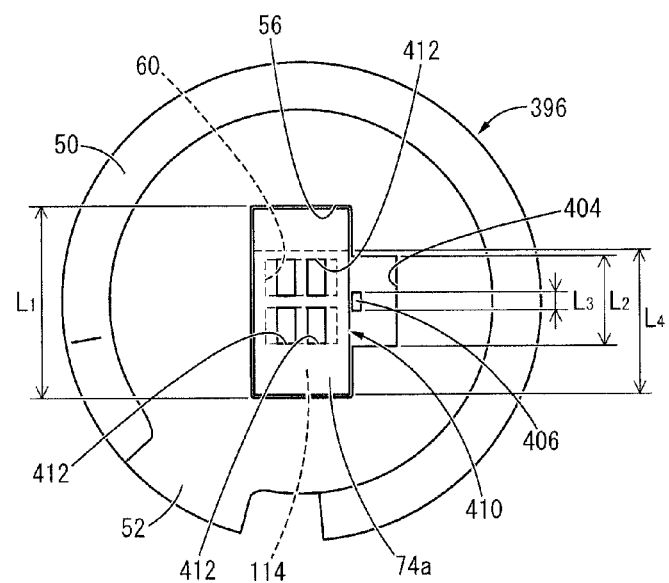
FIG. 77 is a plan view showing a state where an upper partition member is removed from the partition member shown in FIG. 76.

The lower partition member 396, as shown in FIGS. 74 and 77, has the housing concave 56 formed at the center in the radial direction opening upward. In the following descriptions, the long-side direction of the housing concave 56 (up-down direction in FIG. 76) is explained as the length direction. Also, the inner length of the housing concave 56 is assumed to be $L_1$.

Also, a leak concave 404 is provided in the lower partition member 396. The leak concave 404 is a concavity that extends outward from the housing concave 56 in the short-side direction opening on the top face of the lower partition member 396. Also, the leak concave 404 is formed at the center of the housing concave 56 in the length direction, while its inner length $L_2$ is made smaller than the inner length $L_1$ of the housing concave 56. In the present embodiment, the inner dimension of the leak concave 404 in the depth direction is made near equal to the inner dimension of the housing concave 56 in the depth direction.

In addition, a limiting protrusion 406 is provided between the leak concave 404 and the housing concave 56. The limiting protrusion 406 is formed at the connection opening of the leak concave 404 to the housing concave 56, extending linearly upward from the bottom face of the leak concave 404 with a near-constant rectangular cross-section. Also, the inner dimension $L_3$ of the limiting protrusion 406 in the length direction is made smaller than the inner dimension $L_2$ of the leak concave 404, whereas the leak concave 404 is communicated with the housing concave 56 on both sides in the length direction thereof across the limiting protrusion 406. The height dimension of the limiting protrusion 406 is made equal to or slightly smaller than the depth of the housing concave 56 or the leak concave 404. In case the height dimension of the limiting protrusion 406 is made smaller than the depth of the leak concave 404, the difference between the height dimension of the limiting protrusion 406 and any of the depth of the housing concave 56 and the leak concave 404 is made smaller than the thickness dimension of the facing plate portion 74a, which will be described later.

Then, the partition member 392 is configured by having the upper partition member 394 and the lower partition member 396 overlapped on top of each other and fixed to each other. Also, the housing space 64 is formed between the upper and lower partition members 394, 396 by means of covering the opening of the housing concave 56 of the lower partition member 396 with the upper partition member 394. The first communication hole 44 is formed through the top wall of the housing space 64, while the second communication hole 60 is formed through the bottom wall of the housing space 64.

Furthermore, a leak space 408 is formed between the upper and lower partition member 394, 396 by means of covering the opening of the leak concave 404 of the lower partition member 396 with the upper partition member 394. The leak space 408 opens on part of the peripheral wall of the housing space 64 and is communicated therewith. The leak hole 398 is formed penetrating through the portion that covers the leak concave 404 of the upper partition member 394 to be communicated with the leak space 408. Also, the leak space 408 is formed so as to locate its center closer to the upper communication opening 400 than the center of the housing space 64.

Moreover, the limiting protrusion 406 is provided between the housing space 64 and the leak space 408, which are separated from each other at the center in the length direction by the limiting protrusion 406, while the opening of the leak space 408 to the housing space 64 is divided into two sections across the limiting protrusion 406. This makes each opening of the leak space 408 to the housing space 64 equal to $(L_2-L_3)/2$ in its inner dimension in the length direction.

Figure 78:
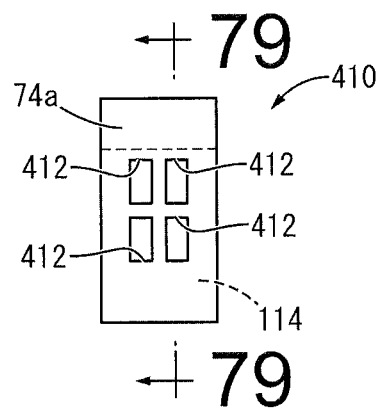
FIG. 78 is a plan view showing a rubber buffer to be mounted to the partition member shown in FIG. 76.
Figure 79:
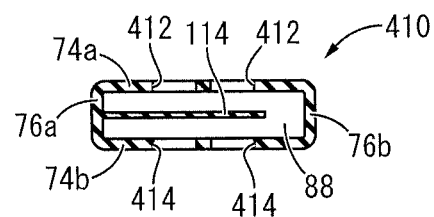
FIG. 79 is a cross-sectional view taken along line 79-79 of FIG. 78.

Also, a rubber buffer 410 is housed as a buffer body within the housing space 64. The rubber buffer 410, as shown in FIGS. 78 and 79, is formed with a rubber elastic body in a hollow form in an approximate shape of a rectangle in the axial view, while being provided with the inner space 88 that penetrates therethrough in the short-side direction.

More specifically, the rubber buffer 410, a band-like cylindrical body made by flattening a cylinder with a near-constant width as if crushing it in one direction, is provided integrally with the pair of facing plate portions 74a, 74b and the pair of side plate portions 76a, 76b that connect the pair of facing plate portions 74a, 74b to each other, while the movable film 114 is arranged within the inner space 88 surrounded by the facing plate portions 74a, 74b and side plate portions 76a, 76b.

Also, a first window portion 412 is formed in the facing plate portion 74a, while a second window portion 414 is formed in the facing plate portion 74b. The first window portion 412 penetrates up and down through the facing plate portion 74a with an approximate rectangular cross-section, and four of the first window portions 412 are arranged separated by the frame in an approximate shape of a cross in the axial view. Meanwhile, the second window portion 414 penetrates up and down through the facing plate portion 74b with approximately the same cross-section as that of the first window portion 412, and four of the second window portions 414 are arranged at locations each corresponding to each location of the first window portions 412.

The rubber buffer 410 with the structure described above, as shown in FIG. 77, is fitted into the housing concave 56 of the lower partition member 396, and by having the upper partition member 394 overlapped thereon from above, the rubber buffer 410 is housed in the housing space 64. Then, the facing plate portion 74a is overlapped with the wall inner surface of the housing space 64 on the side of the pressure-receiving chamber 66, while the facing plate portion 74b is overlapped with the wall inner surface of the housing space 64 on the side of the equilibrium chamber 68, and the rubber buffer 410 is arranged on the hitting face of the movable film 114 against the wall inner surface of the housing space 64.

Also, the rubber buffer 410 made to be a band-like cylindrical body is arranged so as to open up in the short-side direction of the housing space 64, wherein one opening of the rubber buffer 410 opens toward the leak space 408 and the inner space 88 of the rubber buffer 410 is communicated with the leak space 408. Then, the leak space 408 is always communicated with the pressure-receiving chamber 66 via the leak hole 398, while being communicated with the equilibrium chamber 68 via the inner space 88, second window portion 414, and second communication hole 60. This allows a second leak passage 416 that communicates the pressure-receiving chamber 66 and the equilibrium chamber 68 with each other to comprise the leak hole 398, leak space 408, inner space 88, second window portion 414, and second communication hole 60. Since the middle portion of the second leak passage 416 is composed of the leak space 408 and the inner space 88 directly communicated with each other as described above, the cross-section of the second leak passage 416 can easily be kept large.

Figure 80:
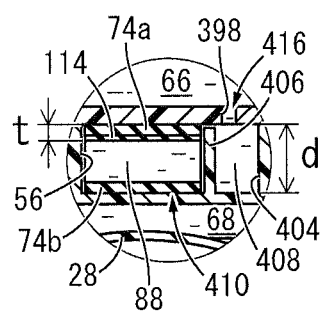
FIG. 80 is a longitudinal sectional view of a key portion of a pressure-receiving chamber under negative pressure within the engine mount shown in FIG. 74.

Then, once a negative pressure is applied to the pressure-receiving chamber 66, the movable film 114, as shown in FIG. 80, is drawn to the side of the pressure-receiving chamber 66 to shut off the first window portion 412 by the movable film 114, while the second window portion 414 is maintained in a state of communication. This causes the fluid flow channel 90 to be shut off and the second leak passage 416 to be maintained in a state of communication so that the fluid flows from the equilibrium chamber 68 to the pressure-receiving chamber 66 via the second leak passage 416. As a result, the negative pressure within the pressure-receiving chamber 66 is reduced to prevent generation of abnormal noise caused by cavitation. In addition, since the second leak passage 416 is made easier to set its cross-section area large enough, it is easy to ensure the amount of fluid flowing through the second leak passage 416 so that the negative pressure within the pressure-receiving chamber 66 is reduced quickly by the fluid flowing through the second leak passage 416, thereby effectively preventing cavitation noise.

In that situation, in the engine mount 390, the second leak passage 416 is stably maintained in a state of communication during the pressure drop in the pressure-receiving chamber 66. In other words, the depth d of the leak space 408 is made larger than the total sum t of the thickness dimensions of the movable film 114 and the facing plate portion 74a so that the leak space 408 is maintained in a state of communication with the inner space 88 regardless of the up and down position changes of the movable film 114 due to elastic deformation. In addition, the protrusion length $L_4$ of the movable film 114 is made larger than the length $(L_2-L_3)/2$ of the opening of the leak space 408 to the housing space 64 to prevent the movable film 114 from entering into the leak space 408. This prevents the opening of the leak hole 398 from being shut off with the movable film 114 even if a negative pressure is applied to the pressure-receiving chamber 66 to have the movable film 114 drawn to the side of the pressure-receiving chamber 66, thereby maintaining the second leak passage 416 in a state of communication.

Furthermore, the inner dimension $L_2$ of the leak space 408 in the length direction is made smaller than the inner dimension $L_1$ of the housing space 64 in the length direction to provide the leak space 408 in the middle of the housing space 64 in the length direction thereof, wherein the movable film 114 is provided straddling over the opening of the leak space 408 to the housing space 64 in the length direction of the opening. This prevents the movable film 114 from entering into the leak space 408 by the contact against the peripheral wall of the housing space 64 even if the tip end of the movable film 114 that tends to have large displacements due to elastic deformation is displaced as if to protrude outside the opening of the rubber buffer 410 in the axial view.

Moreover, since the limiting protrusion 406 is provided between the housing space 64 and the leak space 408 at a location in the middle along the side of the movable film 114, the movable film 114 that goes out from the inner space 88 of the rubber buffer 410 to the outside in the axial view is favorably prevented from entering into the leak space 408 due to the contact against the limiting protrusions 406. Especially in the present embodiment, since the leak hole 398 is arranged on the opposite side from the housing space 64 across the limiting protrusion 406, the leak hole 398 is prevented from being shut off by the movable film 114 more effectively.

Since the movable film 114 is prevented from entering into the leak space 408 in the way described above to always maintain the leak hole 398 in a state of communication, the fluid flow via the second leak passage 416 is allowed in a stable manner at the time of applying a negative pressure to the pressure-receiving chamber 66, thereby achieving prevention of cavitation noise caused by the reduced negative pressure. In addition, since the second leak passage 416 is ensured without restricting the elastic deformation of the movable film 114, the vibration damping effect exerted by the elastic deformation of the movable film 114 (vibration isolation effect by a low dynamic spring constant) can be obtained effectively.

Also, not only is the movable film 114 prevented from entering into the leak space 408, but also the rubber buffer 410 arranged in the housing space 64 by non-adhesive bonding is prevented from entering into the leak space 408, and therefore, positioning means such as bonding and locking for positioning the rubber buffer 410 within the housing space 64 is rendered unnecessary, thereby simplifying the structure and facilitating the work of arranging the rubber buffer 410.

Also, once a negative pressure is applied to the pressure-receiving chamber 66 to the extent of generating cavitation, the space between the facing plate portion 74b of the cylindrical rubber buffer 410 and the movable film 114 rapidly expands by the displacement of the movable film 114 to the side of the facing plate portion 74a. In that situation, if the rubber buffer 410 is arranged in the housing space 64 by non-adhesive bonding, the facing plate portion 74b is displaced by being drawn to the side of the facing plate portion 74a so as to offset the negative pressure between the facing plate portion 74b and the movable film 114. Such displacement of the facing plate portion 74b is maintained by inertia all the way to the side of the facing plate portion 74a without stopping at the neutral position where the negative pressure is eliminated. As a result, a positive pressure is applied between the facing plate portion 74b and the movable film 114 so that the fluid between the facing plate portion 74b and the movable film 114 is forced out from the opening of the rubber buffer 410 toward the leak space 408 to be supplied to the pressure-receiving chamber 66 via the leak hole 398. Thus, by making the rubber buffer 410 in a cylindrical form, further improvement is expected in the effect of reducing cavitation noise due to the pumping action that takes advantage of elastic deformation of the rubber buffer 410.

Also, in the present embodiment, the opening of the leak hole 398 on the side of the pressure-receiving chamber 66 is arranged around the upper communication opening 400 of the orifice passage 70. This allows the fluid from the equilibrium chamber 68 to be supplied to the area around the upper communication opening 400 of the orifice passage 70, which is likely a problem with generation of air bubbles caused by cavitation, so that the negative pressure therein is quickly reduced, thereby more effectively preventing generation of air bubbles due to cavitation and abnormal noise caused thereby.

Figure 81:
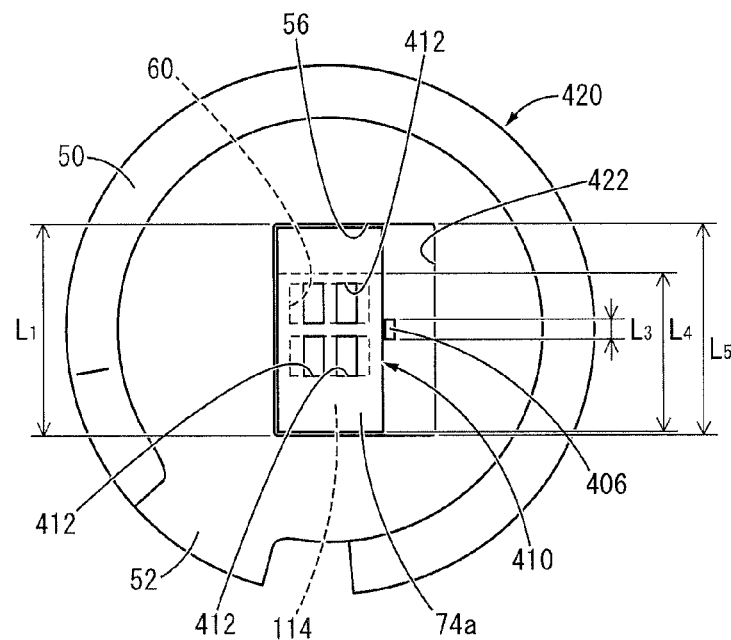
FIG. 81 is a plan view showing a state where an upper partition member is removed from a partition member composing an engine mount as a twenty-second embodiment of the present invention.

FIG. 81 shows a lower partition member 420 composing an engine mount as a twenty-second embodiment of the present invention under a condition where the rubber buffer 410 is arranged in the housing concave 56.

Describing in more detail, the lower partition member 420 has a leak concave 422. The leak concave 422 is a concavity that opens on the top center face of the lower partition member 420 and extends to the side of housing concave 56 in the short-side direction, which is formed in the same inner dimension in the depth direction as that of the housing concave 56. In addition, the leak concave 422 of the present embodiment has its inner dimension $L_5$ in the length direction made approximately equal to the inner dimension $L_1$ of the housing concave 56 in the same direction. Then, the opening of the leak concave 422 to the housing concave 56 is divided into two sections by the limiting protrusion 406 provided at near center in the length-direction to make the inner dimension $(L_5-L_3)/2$ of each opening in the length-direction smaller than the dimension $L_4$ of the movable film 114 in the length direction.

Even in the structure shown in the present embodiment, the movable film 114 and the rubber buffer 410 are prevented from entering into the leak concave 422 to always maintain the leak hole 398 in a state of communication, thereby preventing the second leak passage 416 from being shut off at the time of applying a negative pressure to the pressure-receiving chamber 66.

Also, as evident from the structure shown in the present embodiment, the leak space does not necessarily have to be made smaller than the housing space in the length direction, but the movable member, even with the same size, is prevented from entering into the leak space by making the opening thereof to the housing space smaller than the movable member.

Figure 82:
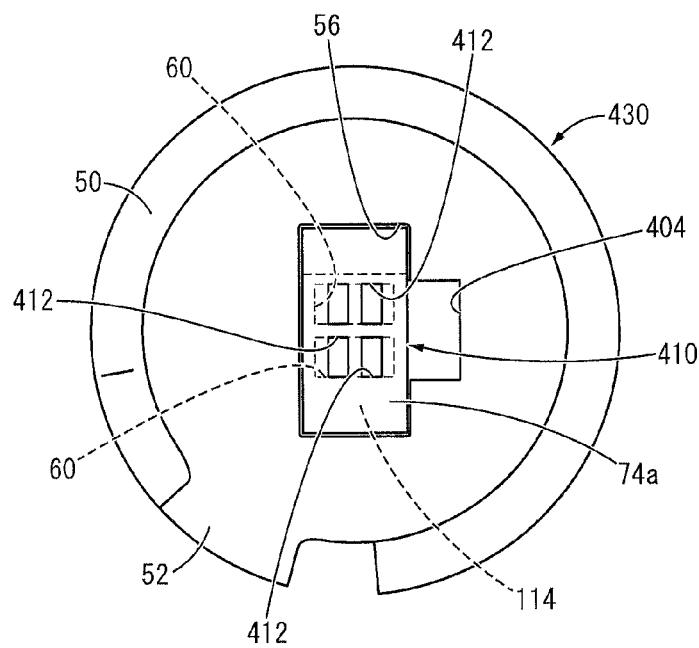
FIG. 82 is a plan view showing a state where an upper partition member is removed from a partition member composing an engine mount as a twenty-third embodiment of the present invention.

FIG. 82 shows a lower partition member 430 composing an engine mount as a twenty-third embodiment of the present invention under a condition where the rubber buffer 410 is arranged in the housing concave 56. The lower partition member 430 is made in a structure where the limiting protrusion 406 is omitted as compared to the lower partition member 396 shown in the twenty-first embodiment.

Even in the structure shown in the present embodiment, the opening of the leak space 408 to the housing space 64 is made smaller than the movable film 114 in the length direction, and the movable film 114 is arranged straddling over the opening of the movable film 114 in the length direction, thereby preventing the movable film 114 from entering into the leak space 408. As a result, the second leak passage 416 is maintained in a state of communication at the time of applying a negative pressure to the pressure-receiving chamber 66, thereby preventing cavitation noise in a stable manner.

Figure 83:
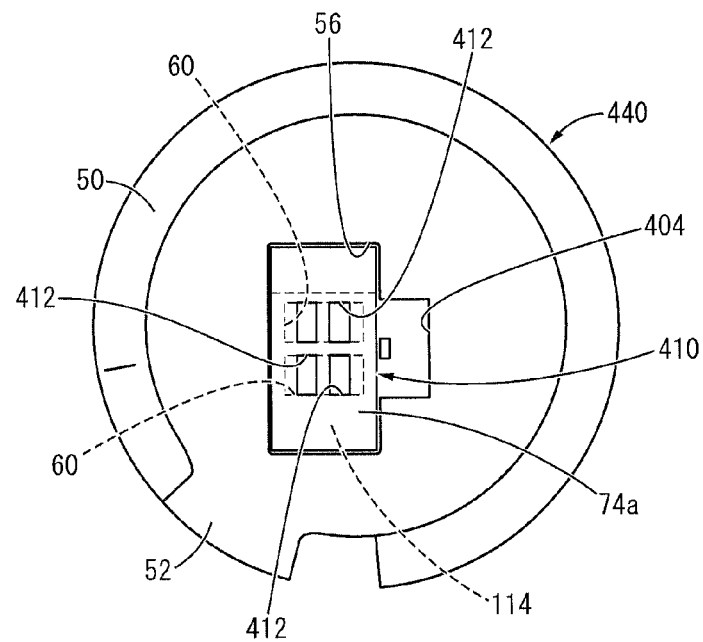
FIG. 83 is a plan view showing a state where an upper partition member is removed from a partition member composing an engine mount as another embodiment of the present invention.

The housing concave 56 and the leak concave 404 can be arranged at locations off-centered toward the outer periphery, as is the case for a lower partition member 440 shown in FIG. 83.

Figure 84:
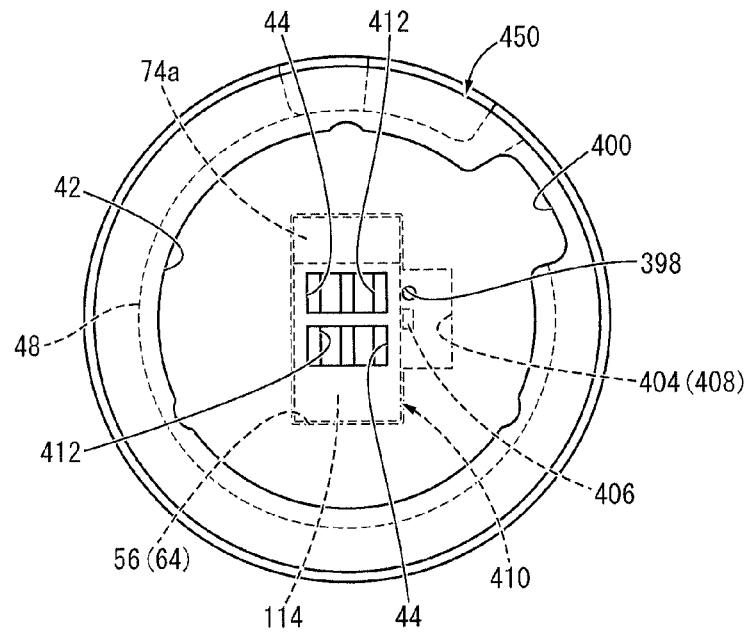
FIG. 84 is a plan view showing a partition member composing an engine mount as still another embodiment of the present invention.

Also, the leak hole 398 is not particularly limited in its formation position as long as it is arranged so as to communicate the leak space 408 and the pressure-receiving chamber 66 with each other, nor does it have to be arranged on the opposite side from the housing space 64 across the limiting protrusion 406. More specifically, as is the case for an upper partition member 450 shown in FIG. 84, the leak hole 398 can be arranged side by side with the limiting protrusion 406 in the length direction in the area around the opening of the leak space 408 to the housing space 64.

Embodiments of the present invention have been described in detail above, but the present invention is not limited by those specific descriptions. For example, in the embodiments described above, the buffer body is made to be a band-like cylindrical body, but the buffer body is not limited to a cylindrical body as long as it is made in a hollow form having an inner space where the movable member is arranged. More specifically, instead of the band-like cylindrical buffer body shown in the previous embodiments, a bag-like body having one of the openings closed or a hollow body having both openings closed can be adopted. The buffer body in a form of a bag-like body can be integrally formed in advance or can be formed by adding a separate lid later to one of the openings of the band-like cylindrical body. Also, the buffer body in a form of a hollow body can be formed by adding separate lids to both openings of the band-like cylindrical body, or by adding a separate lid to the opening of the integrally formed bag-like body.

Also, the protrusion 84 can be formed in plurality on the facing plate portions 74*a*, 74*b*, and the facing plate portions 74*a*, 74*b* can be supported in contact by the partition member 36 at multiple locations by means of bringing each of the plurality of protrusions 84 in contact with the wall inner surface of the housing space 64.

Also, in the embodiments described above, the first positioning member is constituted by having the insertion pin 58 inserted into the insertion hole 82, but none of the formation position, the number of formations and the shape of the insertion pin 58 and insertion hole 82 are particularly limited. For example, the first positioning member can be constituted by forming the insertion pin 58 at the center of the housing space 64, while forming the insertion hole 82 penetrating through the center of the buffer body to have the insertion pin 58 inserted into the insertion hole 82. In this case, the through-hole can be formed at the center of the movable plate 92, for example, and by means of inserting the insertion pin 58 thereinto, the guiding means that guides the movable plate 92 up and down can be constituted simultaneously.

Also, the shape and the number as well as the area of opening of the first and second window portions 78, 80 and the first and second communication holes 44, 60 can be changed as appropriate depending on the formation materials (hardness thereof) and so forth of the movable member and are not limited to particular ones.

Also, the movable film, when adopted as a movable member, can be integrally formed with the buffer body, as shown in the third embodiment, or can be attached later as a separate part by some bonding means. In addition, the movable film does not necessarily have to be supported by the buffer body. For example, the movable film to be arranged in the inner space of the buffer body can be realized by providing a flat rubber plate separately from the buffer body, which is inserted into the buffer body made to be a band-like cylindrical body, wherein at least one end of the rubber plate protrudes outward from the opening of the buffer body and the protrusion from the buffer body of the rubber plate is supported by a partition member.

Furthermore, the way of supporting the movable film is not particularly limited, but it can be supported at one end in a cantilever manner, as shown in the third embodiment, or can be supported at both ends or even all around the outer periphery. Or otherwise, it can be supported at the center with a mechanism of switching the fluid flow channel between a state of communication and a state of shut-off according to elastic deformation of the outer periphery.

Figure 85:
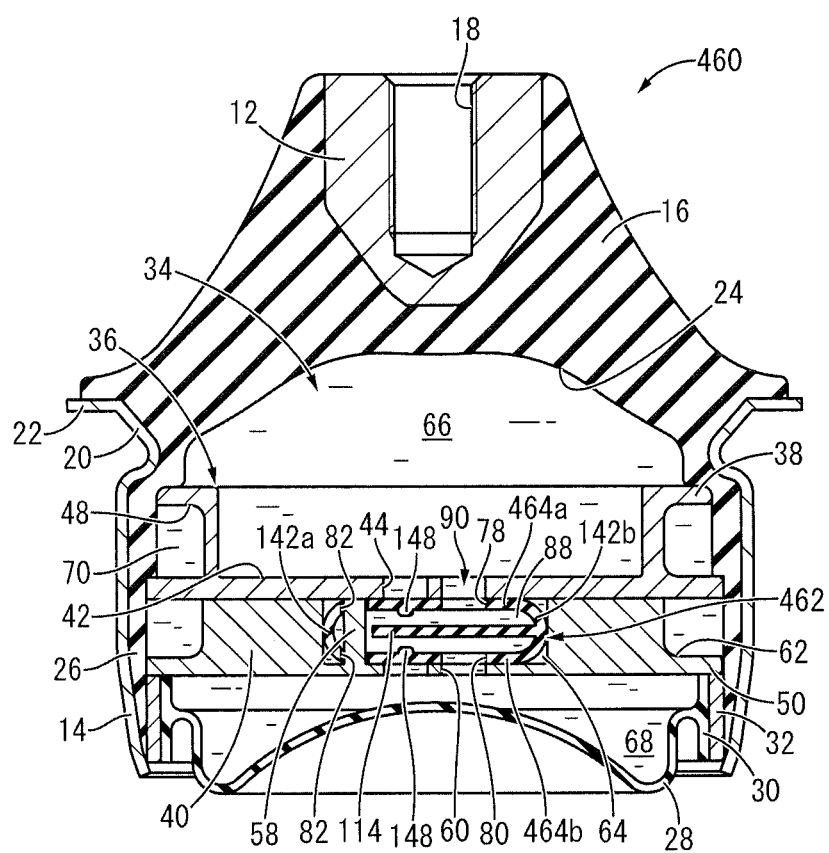
FIG. 85 is a longitudinal sectional view showing an engine mount as a further embodiment of the present invention.
Figure 86:
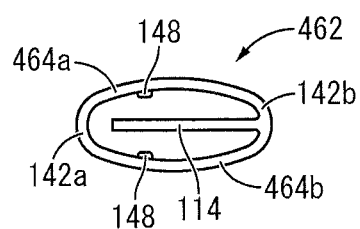
FIG. 86 is a front view showing a shape of a rubber buffer as a single unit composing the engine mount shown in FIG. 85.

Also, the buffer body can be formed in advance in a shape corresponding to the housing space, but it can also be formed in a shape different from or larger than the housing space to be deformed into a shape corresponding to the housing space by being arranged therein. In other words, the dimension of the buffer body in the direction of facing of the pair of facing plate portions can be made larger than the wall inner surface-to-surface dimension of the housing space in the same direction so that the pair of facing plate portions can be arranged in a state of being pressed against the wall inner surface of the housing space. More specifically, a rubber buffer 462 to be adopted in an engine mount 460 as a buffer body shown in FIG. 85 has a pair of facing plate portions 464*a*, 464*b* curved in convex outward in the up-down direction, as shown in FIG. 86, and the maximum distance between the facing surfaces of the facing plate portions 464*a*, 464*b* is made larger than the inner dimension of the housing space 64 in the axial direction. And the rubber buffer 462, as shown in FIG. 85, is arranged in the housing space 64 under a condition where the facing plate portions 464*a*, 464*b* of the rubber buffer 462 are pressed against the wall inner surface of the housing space 64 to be deformed into an approximate shape of a flat plate extending in the axis-perpendicular direction. According to this configuration, since the rubber buffer 462 is positioned in the housing space 64 based on its own elasticity, the rubber buffer 462 is maintained in the desired state of arrangement in a stable manner.

The inward protrusion 148 and the outward protrusion 150 do not necessarily have to be overlapped with each other in projection in the protruding direction, but can be provided at locations shifted from each other. Also, in the previous embodiments, the allowance area for deformation where the formation of the inward protrusion 148 is arranged and the positioning hole where the outward protrusion 150 is arranged are both composed of the first and second communication holes 44, 60, but neither the allowance area for deformation nor the positioning hole necessarily has to be composed of the same holes but can be provided independently from each other. In addition, the allowance area for deformation and the positioning hole can be provided separately from the first and second communication holes 44, 60.

Also, the allowance area for deformation is not particularly limited to a hole penetrating through the wall of the housing space, but, for example, can be a concave portion or a concave groove opening on the wall inner surface of the housing space, or a valley-like concavity surrounded by multiple protrusions. In summary, the allowance area for deformation is not limited to a specific structure as long as a gap is formed between the formation of the inward protrusion and the wall inner surface of the housing space in a structure that allows elastic deformation of a buffer body at the formation of the inward protrusion.

Also the buffer body provided with the inward protrusion 148 and the outward protrusion 150 is not only adopted in combination with the movable film structure but also in combination with the movable plate structure. In case the combination of the movable plate structure and the inward protrusion is adopted, it is desirable to provide a plurality of inward protrusions on the surface of the buffer body where the movable plate comes in contact in order to prevent the movable plate from tilting and hitting against the buffer body (wall inner surface of the housing space).

Also, the previous embodiments show a buffer body provided with both the inward protrusion 148 and the outward protrusion 150, but if the positioning can be well performed only by the first positioning member for locking the insertion pin 58 with the insertion hole 82, only the inward protrusion 148 can be provided without the outward protrusion 150.

Also, in the previous embodiments, the positioning portion (outward protrusion 150) is made substantially smaller than the positioning hole (first and second communication holes 44, 60) in projection in the protruding direction so that the buffer body can be positioned against the partition member by visually confirming the location of the positioning portion through the positioning hole, but the second positioning member can be constituted, for example, by forming the protruding positioning portion in a size equal to or slightly smaller than that of the positioning hole to insert the positioning portion into the positioning hole.

Also, the outward protrusion 150 is exemplified as the positioning portion, but the positioning portion is not limited to the one in a protruding form, and other structures that allow visual confirmation of locations such as concave portions or markings and the like can be adopted. In summary, the positioning portion of the present invention can be anything that can be used for positioning the arrangement location of the buffer body within the housing space, not being limited to those such as the outward protrusion 150 that are expected to exert the effect of relative positioning against the partition member by the action of engagement with the positioning hole.

Figure 87:
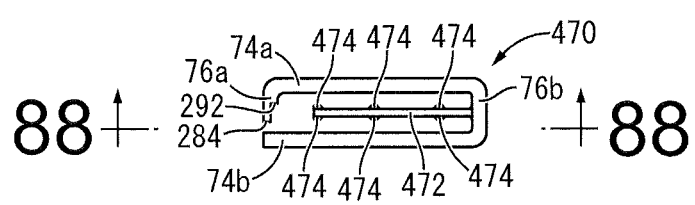
FIG. 87 is a front view showing a rubber buffer composing an engine mount as a still further embodiment of the present invention.
Figure 88:
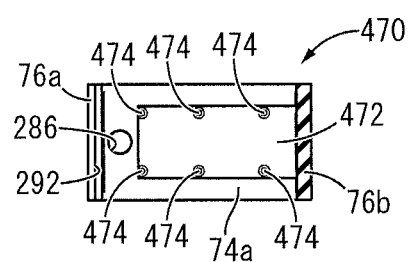
FIG. 88 is a cross-sectional view taken along line 88-88 of FIG. 87.

Also, as shown in FIG. 26, the buffer protrusion is not necessarily limited to the one that protrudes from the buffer body, but can be formed to protrude from the movable member toward the buffer body. More specifically, a structure, such as a rubber buffer 470 shown in FIGS. 87, 88 as a buffer body, where a movable film 472 as a movable member protruding from the side plate portion 76b is provided with a plurality of buffer protrusions 474 can also be adopted. The buffer protrusion 474 is a protrusion having an approximately circular cross-section, six each of which are integrally formed and provided to protrude on both sides of the movable film 472, and three each are arranged on both edges in the width direction (up-down direction near perpendicular to the protruding direction in FIG. 88) on the front and back sides of the movable film 472. Even the rubber buffer 470 provided with such buffer protrusion 474 can reduce striking noise caused by the hitting of the movable film 472.

Also, the structure for specifying the direction of the buffer body against the partition member within the housing space is not limited to the one with the second insertion pins 280, 280 and the protruded support piece 282 inserted into the second and third insertion holes 288, 288, 290 formed only on the facing plate portion 74b, as shown in the previous embodiments, but the structures such as those shown in FIGS. 89 to 94, for example, can be adopted.

Figure 89:
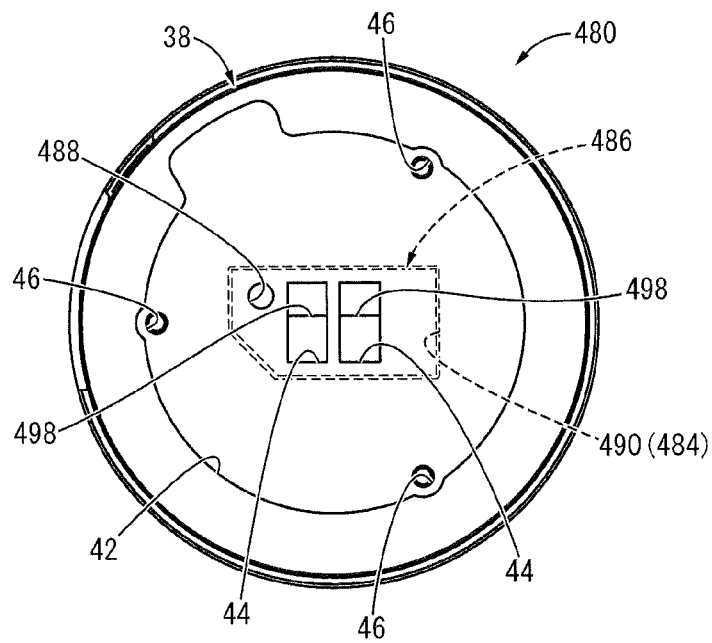
FIG. 89 is a plan view of a partition member composing an engine mount as a still yet further embodiment of the present invention.

More specifically, a partition member 480 composing an engine mount is shown in FIG. 89. The partition member 480 provided with the upper partition member 38 and a lower partition member 482 has a structure where a rubber buffer 486 is housed as a buffer body within a housing space 484 formed between the upper partition member 38 and the lower partition member 482. The upper partition member 38 of the present embodiment is penetrated by a third communication hole 488 formed therein that always communicates the pressure-receiving chamber 66 with the housing space 484 described later.

Figure 90:
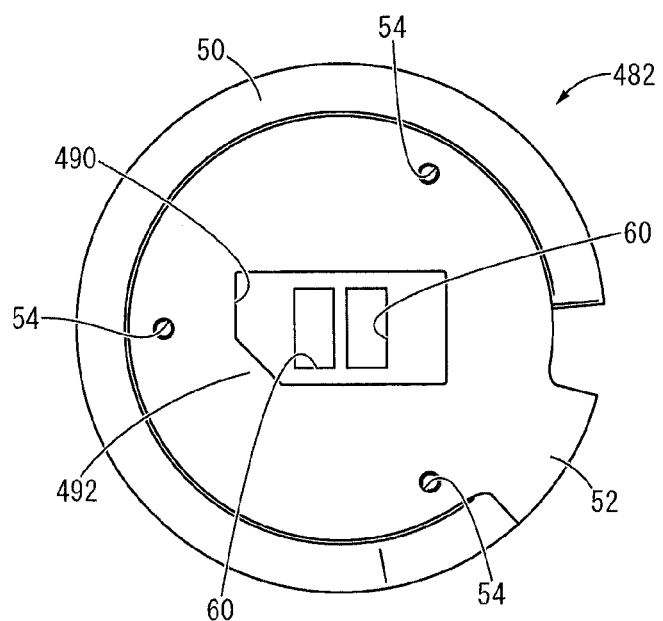
FIG. 90 is a plan view of a lower partition member composing the partition member shown in FIG. 89.

As shown in FIG. 90, the lower partition member 482 is in an approximate shape of a circular disc as a whole, and at the center in the radial direction is formed a housing concave 490. The housing concave 490, a concavity opening on the top face of the lower partition member 482, has a structure where a limiting protrusion 492 is formed at one of the corners of the housing concave 490, forming an approximate shape of a pentagon, which is like a rectangle with one of the corners cut off at an angle in the axial view.

Figure 91:
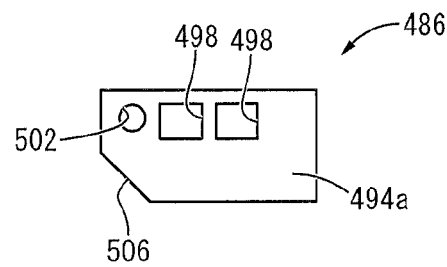
FIG. 91 is a plan view of a rubber buffer composing the partition member shown in FIG. 89.
Figure 92:
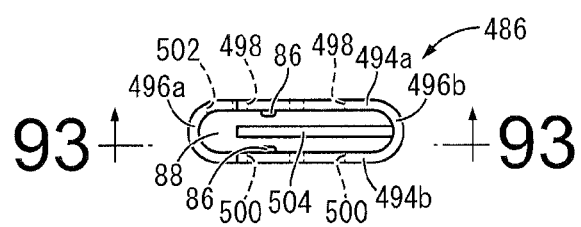
FIG. 92 is a front view of the rubber buffer shown in FIG. 91.
Figure 93:
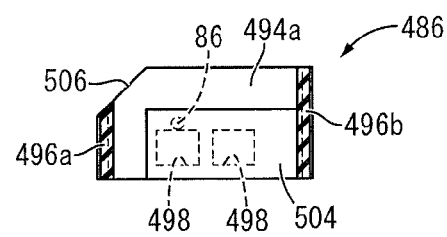
FIG. 93 is a cross-sectional view taken along line 93-93 of FIG. 92.
Figure 94:
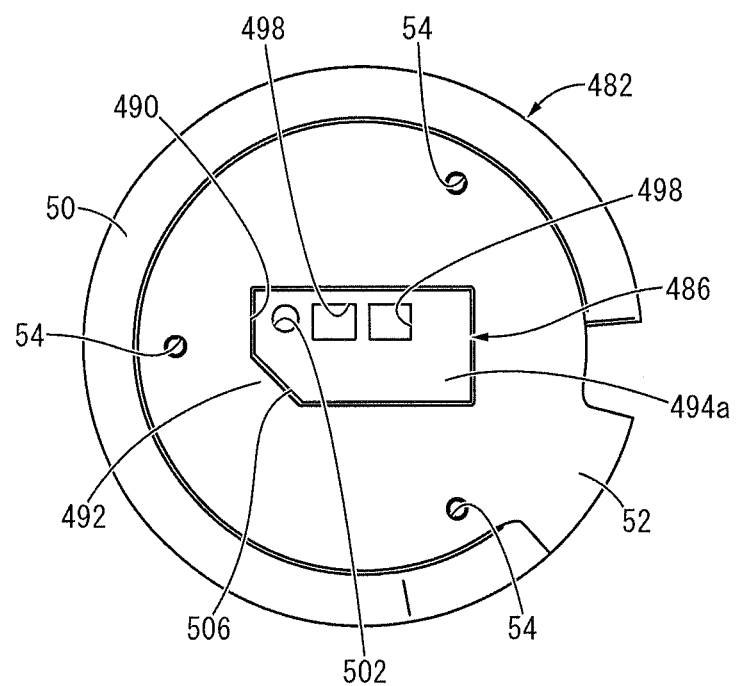
FIG. 94 is a plan view of the rubber buffer shown in FIG. 91 mounted to the lower partition member shown in FIG. 90.

In the housing concave 490, a rubber buffer 486 is arranged. The rubber buffer 486, as shown in FIGS. 91 to 93, is made to be a band-like cylindrical body as a whole, and is integrally formed with a pair of facing plate portions 494a, 494b facing each other up and down and a pair of side plate portions 496a, 496b that connect the pair of facing plate portions 494a, 494b to each other.

Both the facing plate portions 494a and 494b are in an approximate shape of a flat plate, wherein a pair of first window portions 498, 498 are formed on the facing plate portion 494a, while a pair of second window portions 500, 500 are formed on the facing plate portion 494b. The first and second window portions 498, 500 are each a through hole with almost the same rectangular cross-section and formed at a location off-centered to one side of the rubber buffer 486 in the width direction (up-and-down direction in FIG. 91). On each of the facing plate portions 494a, 494b is formed the inward protrusion 86 that protrudes to the inside in the direction of facing at a location facing to a movable film 504, described later. A third window portion 502 is formed on the facing plate portion 494a to penetrate therethrough.

Also, the side plate portions 496a, 496b are each in a shape of a curved plate convex outward in the direction of facing, the top end of which is integrally formed with the facing plate portion 494a in continuation, while the lower end is integrally formed with the facing plate portion 494b in continuation. This allows the pair of facing plate portions 494a, 494b to be connected to each other by the pair of side plate portions 496a, 496b to integrally form the rubber buffer 486 in a band-like cylindrical shape as a whole provided with the inner space 88.

Furthermore, a movable film 504 is integrally formed as a movable member with the side plate portion 496b. The movable film 504 is formed with a rubber elastic body in an approximate shape of a flat rectangle plate protruding into the inner space 88 from the side plate portion 496b toward the side plate portion 496a. With its width made smaller than that of the side plate portion 496b, the movable film 504 is arranged off-centered to one side of the movable film 504 in the width direction. As shown in FIG. 93, the movable film 504 has a larger width than that of the first and second window portions 498, 500, with the protrusion tip extending to the opposite side straddling over the first and second window portions 498, 500 to be formed in a size and location enough to cover the first and second window portions 498, 500 in the axial projection.

In that situation, the rubber buffer 486 is formed with a cut-out portion 506. The cut-out portion 506, as shown in FIG. 91, is formed in a shape of a rectangle with one of the four corners cut out at an angle in the axial view. By forming such cut-out portion 506, the lengths of one side edge of the facing plate portions 494a, 494b in the width direction are made longer than those of the other side edge thereof, while the width of the side plate portion 496a is made smaller than that of the side plate portion 496b. In summary, the rubber buffer 486 is made in an approximate shape corresponding to the housing concave 490 in the axial view by the formation of the cut-out portion 506.

The rubber buffer 486 with the structure described above, as shown in FIG. 94, is inserted and arranged in the housing concave 490 of the lower partition member 482. In that process, the rubber buffer 486 is made insertable into the housing concave 490 by positioning the cut-out portion 506 formed on the rubber buffer 486 against the limiting protrusion 492 of the housing concave 490. Meanwhile, if one tries to insert the rubber buffer 486 into the housing concave 490 in a wrong direction, the corners of the rubber buffer 486 come in contact with the limiting protrusion 492 to prevent the rubber buffer 486 from being inserted into the housing concave 490. This allows the rubber buffer 486 to be inserted and arranged in the housing concave 490 in a given direction. In the present embodiment, the cut-out portion 506 is made in a shape of a rectangle with one of the corners cut out at an angle in the axial view, making it easy to form the cut-out portion 506 and the limiting protrusion 492, but specific shapes of the cut-out portion and the limiting protrusion are not particularly limited as long as the direction of the buffer body in the housing space can be specified. Also, both the cut-out portion and the limiting protrusion can be formed in plurality.

Then, the housing space 484 is formed by having the upper partition member 38 overlapped with the lower partition member 482 to cause the upper partition member 38 to cover the opening of the housing concave 490, while the rubber buffer 486 is arranged in the housing space 484. In addition, the third communication hole 488 of the upper partition member 38 and the third window portion 502 of the rubber buffer 486 are positioned and communicated with each other, and the short-circuit hole that communicates the pressure-receiving chamber 66 with the inner space 88 is constituted by the third communication hole 488 and the third window portion 502.

Thus, the direction of the buffer body in the housing space can be specified by means of, for example, providing a limiting protrusion on the peripheral wall of the housing space as well as a cut-out (concave) portion corresponding to the limiting protrusion in the buffer body to be able to arrange the buffer body in the housing space only when the limiting protrusion and the cut-out portion are positioned against each other.

Also, as evident from the structure shown in FIGS. 89 to 94, the movable member can be provided off-centered on either side within the inner space.

Also, the communication passage can be formed singly or in plurality.

Also, the movable member is not particularly limited to the movable plate 92 in a shape roughly corresponding to the plan of the housing space 64 as shown in the previous embodiments, but a state of communication can be stably maintained between the pressure-receiving chamber 66 and the housing space 64 via the first leak passage 360 by means of forming a concave groove opening on the outer peripheral surface of the movable plate 92 extending in the thickness direction.

Also, as a regulation means other than the structure using the insertion pin 58 and the insertion hole 82 as exemplified in the previous embodiments, various structures that regulate the up-down direction of the buffer body in the process of assembly thereof in the housing space can be adopted. For example, the length of the facing plate portion 74a in the long-side direction can be made longer than the length of the facing plate portion 74b in the same direction by making at least the outer face of the side plate portions 76a, 76b in the direction of facing in a tapered form getting closer to each other toward the equilibrium chamber 68, or by providing steps in the middle between the side plate portions 76a, 76b in the height direction. In line with this, the peripheral wall on each side of the housing concave 56 in the long-side direction is made into a sloping or stepped face corresponding to the slope or steps on the outer face of the side plate portions 76a, 76b. This prevents the buffer body from being arranged upside down in the housing concave 56 so that the regulating member for determining the direction of the buffer body can be configured to position the communication passage 358 to the side of the pressure-receiving chamber 66 due to the difference in size between the facing plate portions 74a and 74b.

Also, the leak space does not necessarily have to be formed with the same depth as the housing space but can be formed with a smaller depth than the housing space as long as it is communicated with the inner space of the buffer body at the time of applying a negative pressure to the pressure-receiving chamber (under reduced pressure). A state of communication between the leak space and the inner space of the buffer body at the time of applying a negative pressure to the pressure-receiving chamber can be achieved by setting dimensions of each part to be able to position the wall inner surface of the leak space to the side of the equilibrium chamber at a location between the movable member and the facing plate portion on the side of the equilibrium chamber under a condition where the movable member is in contact with the facing plate portion on the side of the pressure-receiving chamber.

Also, the shape of the leak space in the axial projection is not necessarily limited to a rectangle but can be a semicircle and the like.

Also, if the inner dimension of the leak space in the length direction is smaller than that of the housing space, it is desirable to arrange the leak space in the middle of the housing space in the length direction but not necessarily limited thereto and can be arranged at the end portion in the length direction.

Also, the leak space can be formed in plurality each being communicated with the housing space. In addition, both the leak hole and the limiting protrusion can be provided in plurality, whether multiple leak holes or limiting protrusions be provided in one leak space, or otherwise a single leak hole or a single limiting protrusion be provided in each of multiple leak spaces to provide multiple leak holes or limiting protrusions as a whole.

Also, the buffer body is not particularly limited to the continuous one in a cylindrical form with no breaks, but can be divided, for example, at one or more locations along the circumference as long as the entire shape is cylindrical.

The present invention is not only applied to the engine mount but can also be applied favorably to various fluid-filled vibration damping devices containing a body mount, member mount or the like. Also, the applicable range of the present invention is not limited to the fluid-filled vibration damping device for automobiles, but is also applicable to the fluid-filled vibration damping device for motorcycles, railroad cars, industrial vehicles and for other uses besides automobiles.

What is claimed is:
1. A fluid-filled vibration damping device comprising:
a first mounting member;
a second mounting member;

a main rubber elastic body elastically connecting the first and second mounting members;

a partition member supported by the second mounting member, the partition member forming a housing space;

a pressure-receiving chamber whose wall portion is partially defined by the main rubber elastic body;

an equilibrium chamber whose wall portion is partially defined by a flexible film;

an orifice passage through which the pressure-receiving chamber and the equilibrium chamber communicate with each other;

a hollow buffer body housed in the housing space to come in contact with wall inner surfaces of the partition member; and a movable member housed within an inner space of the hollow buffer body such that liquid pressure of the pressure-receiving chamber is applied to a first face of the movable member and liquid pressure of the equilibrium chamber is applied to a second face of the movable member, respectively, through a first communication hole formed in the partition member on the side of the first face, and a second communication hole formed in the partition member on the side of the second face, respectively, wherein the pressure-receiving chamber and the equilibrium chamber are disposed on either side of the partition member and filled with a non-compressible fluid, the hollow buffer body is an integral band-like cylindrical body having: (i) a pair of facing plate portions placed in contact with each wall inner surface of the partition member on respective sides of the pressure-receiving chamber and the equilibrium chamber, and (ii) a pair of side plate portions that connect the pair of facing plate portions to each other, and the liquid pressure of the pressure-receiving chamber is applied to the first face of the movable member by having a first window portion formed in the hollow buffer body communicated with the first communication hole while the liquid pressure of the equilibrium chamber is applied to the second face of the movable member by having a second window portion formed in the hollow buffer body communicated with the second communication hole.

2. The fluid-filled vibration damping device according to claim 1, wherein the hollow buffer body is formed with a protrusion that protrudes toward at least one of the pressure-receiving chamber and the equilibrium chamber so that the protrusion comes in contact with an inner surface of the partition member.

3. The fluid-filled vibration damping device according to claim 2, wherein the protrusion extends continuously in an annular form, while the protrusion is provided so as to surround at least one of an opening of the first window portion on a side of the first communication hole and an opening of the second window portion on a side of the second communication hole.

4. The fluid-filled vibration damping device according to claim 1, wherein a locking protrusion is provided in the partition member to protrude therein, while a locking hole is formed in the hollow buffer body and a first positioning member for positioning the hollow buffer body relative to the partition member is configured by having the locking protrusion inserted into the locking hole and locked thereto.

5. The fluid-filled vibration damping device according to claim 4, wherein the locking protrusion protrudes in a direction towards the pressure-receiving chamber and the equilibrium chamber, while the locking hole is formed through walls of the hollow buffer body on the side of the pressure-receiving chamber and on the side of the equilibrium chamber, and the locking protrusion, when inserted through the locking hole, penetrates through the hollow buffer body.

6. The fluid-filled vibration damping device according to claim 4, wherein the locking protrusion protrudes in the direction towards the pressure-receiving chamber and the equilibrium chamber, while the locking hole is formed through the hollow buffer body on exclusively on of: the side of the pressure-receiving chamber and the side of the equilibrium chamber.

7. The fluid-filled vibration damping device according to claim 1, wherein the movable member comprises a movable plate independent from the partition member and the hollow buffer body.

8. The fluid-filled vibration damping device according to claim 1, wherein the movable member comprises a movable film supported by at least one of the partition member and the hollow buffer body.

9. The fluid-filled vibration damping device according to claim 8, wherein the movable film is integrally formed with the hollow buffer body.

10. The fluid-filled vibration damping device according to claim 1, wherein a buffer protrusion is provided in at least one of the hollow buffer body and the movable member, the buffer protrusion protruding inward in a direction of facing the hollow buffer body and the movable member.

11. The fluid-filled vibration damping device according to claim 10, wherein an allowance area for deformation is provided by the first or second communication holes, and formation of the buffer protrusion is arranged within the allowance area for deformation away from the housing space.

12. The fluid-filled vibration damping device according to claim 10, wherein the buffer protrusion extends continuously in an annular form, while one of an opening of the first window portion on the side of the inner space and an opening of the second window portion on the side of the inner space is surrounded by the buffer protrusion.

13. The fluid-filled vibration damping device according to claim 1, wherein the hollow buffer body is provided with a positioning portion, while the partition member is provided with a positioning hole through the wall of the partition member, and a second positioning member for positioning the hollow buffer body within the housing space is configured by means of arranging the positioning portion placed over the positioning hole.

14. The fluid-filled vibration damping device according to claim 1, wherein a concave/convex portion is provided on at least one of the wall inner surfaces of the partition member on the side of the pressure-receiving chamber and the side of the equilibrium chamber, and a contact area is made small between the hollow buffer body and the wall inner surface of the partition member provided with the concave/convex portion.

15. The fluid-filled vibration damping device according to claim 1, wherein a communication passage is formed on the wall of the hollow buffer body on the side of the pressure-receiving chamber for connecting to the first communication hole, and a first leak passage is formed to always maintain communication between the pressure-receiving chamber and the housing space via the first communication hole and the communication passage.

16. The fluid-filled vibration damping device according to claim 15, wherein the hollow buffer body is an integral band-like cylindrical body having: (i) a pair of facing plate portions placed in contact with each wall inner surface of the partition member on respective sides of the pressure-receiving chamber and the equilibrium chamber, and (ii) a pair of side plate portions that connect these pair of facing plate portions to each other, and the communication passage formed in the facing plate portion on the side of the pressure-receiving chamber extends in a direction perpendicular to a direction of facing of the pair of side plate portions to be communicated with the first communication hole via the first window portion.

17. The fluid-filled vibration damping device according to claim 15, wherein the hollow buffer body is arranged away from a peripheral wall inner surface of the partition member with a gap in between, while the communication passage is communicated with the gap.

18. The fluid-filled vibration damping device according to claim 15, wherein a regulating member is provided that regulates a direction of the hollow buffer body within the partition member so as to locate the communication passage formed in the hollow buffer body on the side of the pressure-receiving chamber.

19. The fluid-filled vibration damping device according to claim 18, wherein a locking protrusion is provided in the partition member that protrudes from the wall of the partition member therein on the side of the equilibrium chamber to the side of the pressure-receiving chamber, while a locking hole is formed on the wall of the hollow buffer body on the side of the equilibrium chamber, whereas the regulating member is constituted by having the locking protrusion inserted into the locking hole while the hollow buffer body is positioned relative to the partition member using the regulating member.

20. The fluid-filled vibration damping device according to claim 1, wherein the hollow buffer body is made in a cylindrical shape and a periphery wall thereof is overlapped with a hitting face of the movable member against the wall inner surface of the partition member, whereas a leak space is formed opening on a peripheral wall inner surface of the partition member that is overlapped with an opening end surface of the hollow buffer body and extending outward from the housing space while a leak hole is formed to connect the leak space to the pressure-receiving chamber in such a way that a second leak passage is formed comprising the leak space and the leak hole so as to communicate the pressure-receiving chamber and the equilibrium chamber with each other under reduced pressure within the pressure-receiving chamber, and further, an opening of the leak space to the housing space is made smaller than the movable member in a length direction perpendicular to a thickness direction of the movable member of plate shape and to an axial direction of the hollow buffer body.

21. The fluid-filled vibration damping device according to claim 20, wherein an inside dimension of the leak space in the length direction is made smaller than an inside dimension of the housing space in the length direction.

22. The fluid-filled vibration damping device according to claim 21, wherein the leak space is formed in a middle portion of the housing space in the length direction.

23. The fluid-filled vibration damping device according to claim 20, wherein a limiting protrusion is formed between the leak space and the housing space to separate them from each other, while the opening of the leak space to the housing space is divided into both sides of the limiting protrusion in the length direction, and each divided opening of the leak space to the housing space is made smaller than the movable member in the length direction.

24. The fluid-filled vibration damping device according to claim 20, wherein
the leak space is formed at a location closer to a communication opening of the orifice passage on the side of the pressure-receiving chamber than the housing space, and
an opening of the leak hole to the pressure-receiving chamber is placed around the communication opening of the orifice passage on the side of the pressure-receiving chamber.

25. A fluid-filled vibration damping device comprising:
a first mounting member;
a second mounting member;
a main rubber elastic body elastically connecting the first and second mounting members;
a partition member supported by the second mounting member, the partition member forming a housing space;
a pressure-receiving chamber whose will portion is partially defined by the main rubber elastic body;
an equilibrium chamber whose wall portion is partially defined by a flexible film;
an orifice passage through which the pressure-receiving chamber and the equilibrium chamber communicate with each other;
a hollow buffer body housed in the housing space to come in contact with wall inner surfaces of the partition member; and
a movable member housed within an inner space of the hollow buffer body such that liquid pressure of the pressure-receiving chamber is applied to a first face of the movable member and liquid pressure of the equilibrium chamber is applied to a second face of the movable member respectively through a first communication hole formed in the partition member on the side of the first face, and a second communication hole formed in the partition member on the side of the second face, respectively, wherein
the pressure-receiving chamber and the equilibrium chamber are disposed on either side of the partition member and filled with a non-compressible fluid,
the liquid pressure of the pressure-receiving chamber is applied to the first face of the movable member by having a first window portion formed in the hollow buffer body communicated with the first communication hole while the liquid pressure of the equilibrium chamber is applied to the second face of the movable member by having a second window portion formed in the hollow buffer body communicated with the second communication hole, and
the hollow buffer body is arranged away from a peripheral inner surface of the partition member.

26. A fluid-filled vibration damping device comprising:
a first mounting member;
a second mounting member;
a main rubber elastic body elastically connecting the first and second mounting members;
a partition member supported by the second mounting member, the partition member forming a housing space;
a pressure-receiving chamber whose wall portion is partially defined by the main rubber elastic body;
an equilibrium chamber whose wall portion is partially defined by a flexible film;

an orifice passage through which the pressure-receiving chamber and the equilibrium chamber communicate with each other;

a hollow buffer body housed in the housing space to come in contact with wall inner surfaces of the partition member; and a movable member housed within an inner space of the hollow buffer body such that liquid pressure of the pressure-receiving chamber is applied to a first face of the movable member and liquid pressure of the equilibrium chamber is applied to a second face of the movable member respectively through a first communication hole formed in the partition member on the side of the first face, and a second communication hole formed in the partition member on the side of the second face, respectively, wherein the pressure-receiving chamber and the equilibrium chamber are disposed on either side of the partition member and filled with a non-compressible fluid, the liquid pressure of the pressure-receiving chamber is applied to the first face of the movable member by having a first window portion formed in the hollow buffer body communicated with the first communication hole while the liquid pressure of the equilibrium chamber is applied to the second face of the movable member by having a second window portion formed in the hollow buffer body communicated with the second communication hole, and a third communication hole is formed through the wall of the partition member on the side of the pressure-receiving chamber, while a gap is provided between the hollow buffer body and a peripheral inner wall of the partition member such that a short-circuit passage is formed to always maintain communication between the pressure-receiving chamber and the inner space of the hollow buffer body by means of connecting the third communication hole and the gap to each other.

27. A fluid-filled vibration clamping device comprising:
a first mounting member;
a second mounting member;
a main rubber elastic body elastically connecting the first and second mounting members;
a partition member supported by the second mounting member, the partition member forming a housing space;
a pressure-receiving chamber whose wall portion is partially defined by the main rubber elastic body;
an equilibrium chamber whose wall portion is partially defined by a flexible film;
an orifice passage through which the pressure-receiving chamber and the equilibrium chamber communicate with each other;
a hollow buffer body housed in the housing space to come in contact with wall inner surfaces of the partition member; and
a movable member housed within an inner space of the hollow buffer body such that liquid pressure of the pressure-receiving chamber is applied to a first face of the movable member and liquid pressure of the equilibrium chamber is applied to a second face of the movable member respectively through a first communication hole formed in the partition member on the side of the first face, and a second communication hole formed in the partition member on the side of the second face, respectively, wherein the pressure-receiving chamber and the equilibrium chamber are disposed on either side of the partition member and filled with a non-compressible fluid, the liquid pressure of the pressure-receiving chamber is applied to the first face of the movable member by having a first window portion formed in the hollow buffer body communicated with the first communication hole while the liquid pressure of the equilibrium chamber is applied to the second face of the movable member by having a second window portion formed in the hollow buffer body communicated with the second communication hole, and a third communication hole is formed through the wall of the partition member on the side of the pressure-receiving chamber, while a third window portion is formed through the wall of the hollow buffer body on the side of the pressure-receiving chamber such that a short-circuit passage is formed to always maintain communication between the pressure-receiving chamber and the inner space of the hollow buffer body by means of connecting the third communication hole and the third window portion to each other.

* * * * *